US012650140B2

(12) United States Patent
Chiba et al.

(10) Patent No.: US 12,650,140 B2
(45) Date of Patent: Jun. 9, 2026

(54) DRAG REDUCTION STRUCTURE, RESIN MOLDED PRODUCT, SHAPING MOLD AND MOVING OBJECT

(71) Applicant: DAI NIPPON PRINTING CO., LTD., Tokyo-to (JP)

(72) Inventors: Tsuyoshi Chiba, Tokyo-to (JP); Fumihiro Arakawa, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 130 days.

(21) Appl. No.: 18/568,670

(22) PCT Filed: Jun. 10, 2022

(86) PCT No.: PCT/JP2022/023544
§ 371 (c)(1),
(2) Date: Dec. 8, 2023

(87) PCT Pub. No.: WO2022/260181
PCT Pub. Date: Dec. 15, 2022

(65) Prior Publication Data
US 2024/0280122 A1      Aug. 22, 2024

(30) Foreign Application Priority Data

Jun. 10, 2021 (JP) ................................. 2021-097162
Jun. 10, 2021 (JP) ................................. 2021-097164
Jun. 10, 2021 (JP) ................................. 2021-097165

(51) Int. Cl.
*F15D 1/12* (2006.01)
*B29C 33/42* (2006.01)
(Continued)

(52) U.S. Cl.
CPC ................ *F15D 1/12* (2013.01); *B29C 33/42* (2013.01); *B29C 64/112* (2017.08);
(Continued)

(58) Field of Classification Search
CPC .................................. F15D 1/12; B29C 33/42
(Continued)

(56) References Cited

U.S. PATENT DOCUMENTS

2007/0235590 A1* 10/2007 Kokoshkin ............. B64C 21/10
244/130
2010/0282909 A1* 11/2010 Rawlings ................ B32B 15/02
156/60
(Continued)

FOREIGN PATENT DOCUMENTS

JP      H10-047315 A      2/1998
JP      2001-050215 A      2/2001
(Continued)

*Primary Examiner* — Tahseen Khan
(74) *Attorney, Agent, or Firm* — Oliff PLC

(57) ABSTRACT

A drag reduction structure wherein a first portion including a plurality of convex portions and concave portions, and a second portion are placed on a first surface; a height from a bottom portion of the concave portion to a top portion of the convex portion, of the first portion, is 10 μm or more and 1000 μm or less; a length of the first portion in a second direction is 30 mm or more; and a width of the first portion and a width of the second portion, in a first direction crossing the second direction, is 0.2 mm or more and 50 mm or less.

26 Claims, 28 Drawing Sheets

(51) Int. Cl.

| | |
|---|---|
| *E21B 17/01* | (2006.01) |
| *F16L 1/12* | (2006.01) |
| *B29C 64/112* | (2017.01) |
| *B29K 27/06* | (2006.01) |
| *B29K 29/00* | (2006.01) |
| *B29K 33/00* | (2006.01) |

(52) U.S. Cl.
CPC ...... *B29K 2027/06* (2013.01); *B29K 2029/04* (2013.01); *B29K 2033/00* (2013.01)

(58) Field of Classification Search
USPC ......................................................... 428/141
See application file for complete search history.

(56) References Cited

U.S. PATENT DOCUMENTS

| | | | | |
|---|---|---|---|---|
| 2018/0180073 A1* | 6/2018 | Potts | .................... | E21B 17/012 |
| 2019/0323356 A1* | 10/2019 | Liu | ...................... | F15D 1/0035 |

FOREIGN PATENT DOCUMENTS

| | | |
|---|---|---|
| JP | 2013-057390 A | 3/2013 |
| JP | 2016-114203 A | 6/2016 |
| WO | 2010/029844 A1 | 3/2010 |

* cited by examiner

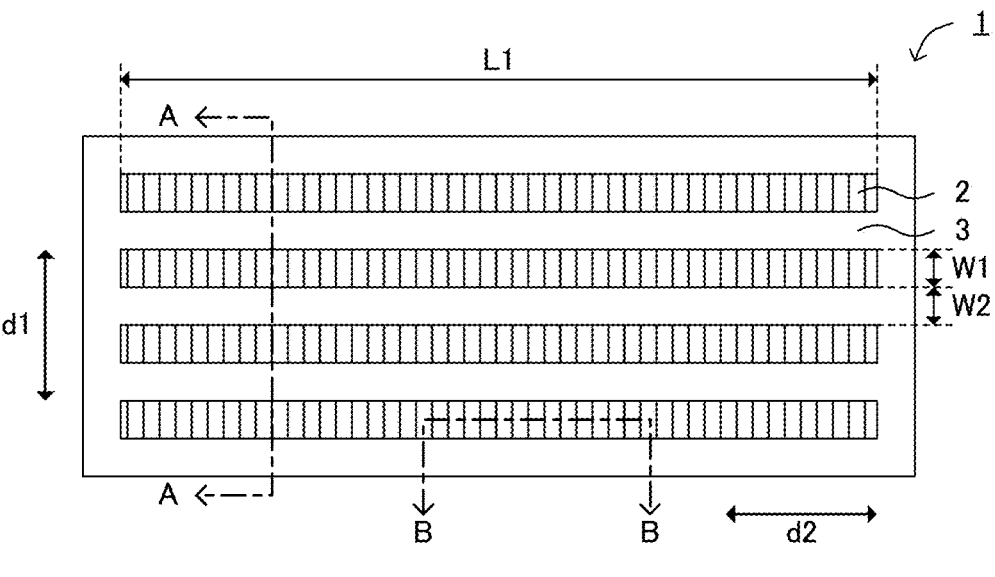
FIG. 1A
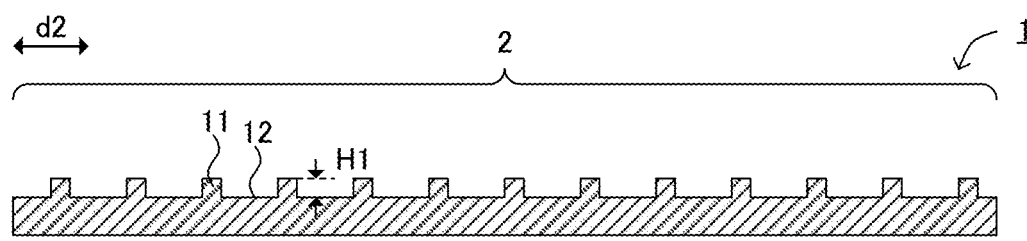
FIG. 1B
FIG. 1C

FIG. 10E

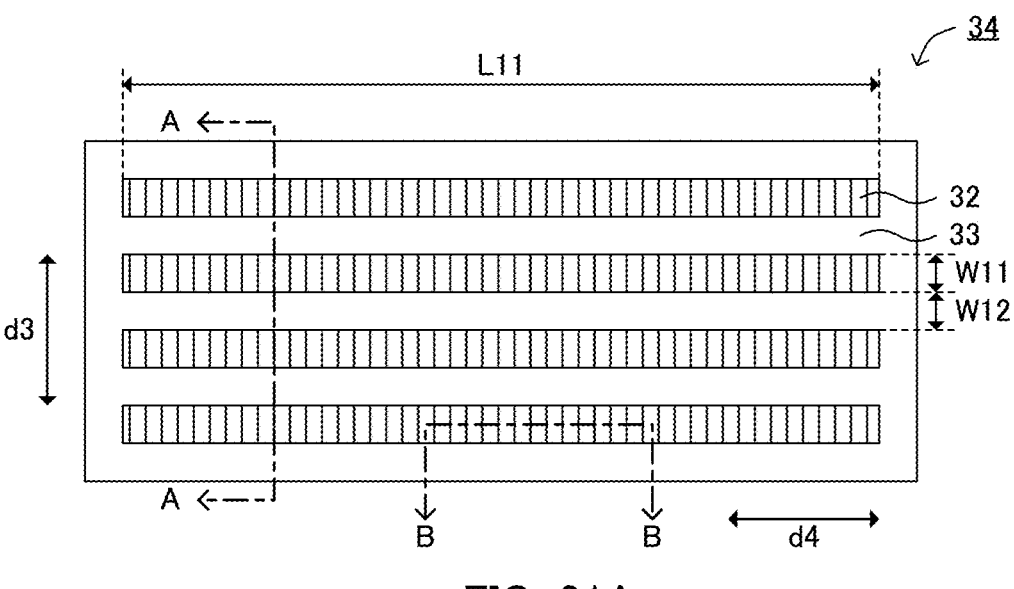
FIG. 21A
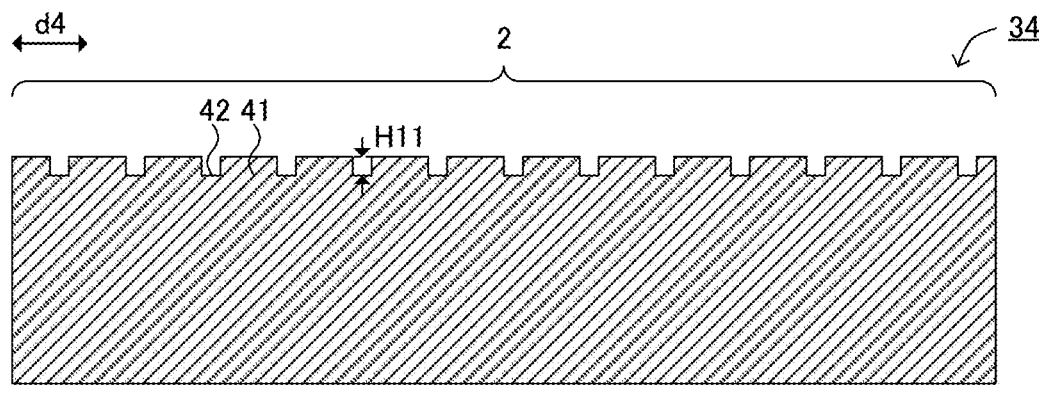
FIG. 21B
FIG. 21C

FIG. 32A
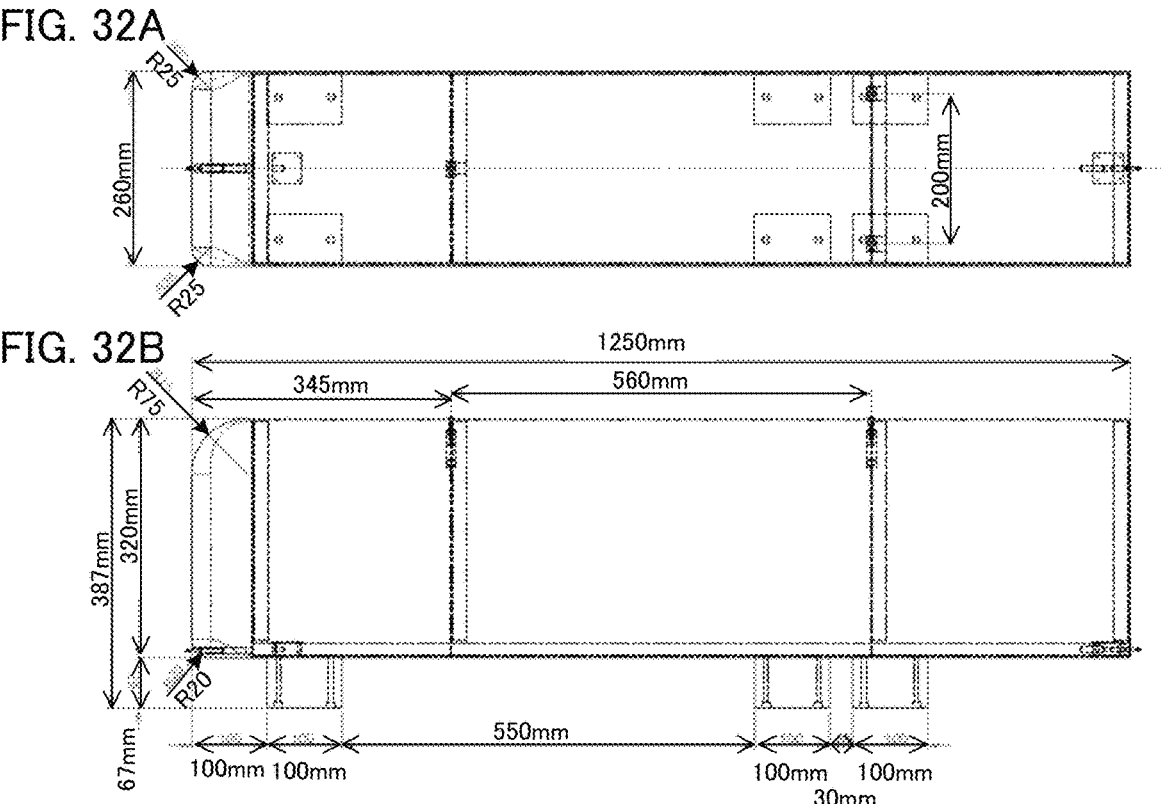
FIG. 32B
FIG. 32C
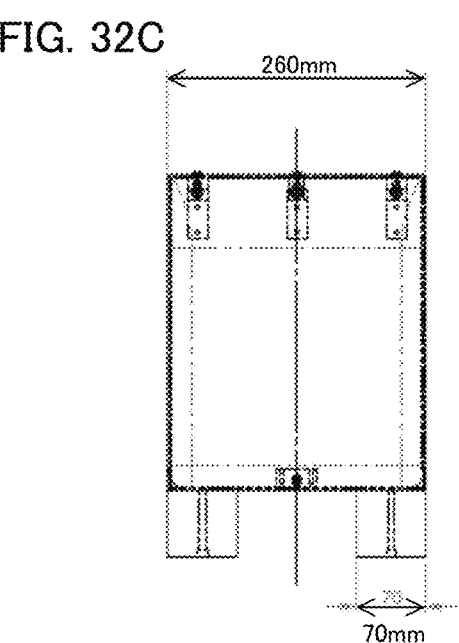

DRAG REDUCTION STRUCTURE, RESIN MOLDED PRODUCT, SHAPING MOLD AND MOVING OBJECT

TECHNICAL FIELD

The present disclosure relates to a drag reduction structure capable of reducing drag, a resin molded product capable of reducing drag, and a shaping mold used for the production thereof, and a moving object including a drag reduction structure capable of reducing drag.

BACKGROUND ART

In recent years, in the field of moving objects moving through fluid and fluid transfer, research on fluid resistance reducing technology have been actively promoted, in order to realize energy saving and reduction of carbon dioxide emission. Specifically, in recent years, in the field of moving objects such as automobiles, railway vehicles, and aircraft, research on fluid resistance reducing technology have been actively promoted, in order to realize improved fuel efficiency and reduction of carbon dioxide emission.

As the fluid resistance reducing technology, for example, a provision of a convexo-concave on the surface of an object has been conventionally known. For example, a riblet has been known as a method to reduce frictional resistance among fluid resistances, and a dimple has been known as a method to reduce pressure resistance (Patent Document 1, for example). Also, Patent Document 2 discloses a technical idea of arranging a rough surface and a smooth surface to generate a vertical vortex at the boundary between the rough surface and the smooth surface to suppress the flow separation.

CITATION LIST

Patent Documents

Patent Document 1: WO2010/29844
Patent Document 2: Japanese Patent Application Laid-Open (JP-A) No. 2013-57390

Summary of Disclosure

Technical Problem

However, when the size of the convexo-concave such as riblets and dimples are in the millimeter order, it may be difficult to form thereof depending on the form of a drag reduction structure such as a film.

Also, Patent Document 2 does not disclose details of the specific shapes and configurations of rough surface and smooth surface.

The present disclosure has been made in view of the above circumstances, and a primary object of the present disclosure is to provide a drag reduction structure capable of suppressing the flow separation and reducing drag, when used for a predetermined moving object, fluid transfer and so on, in a drag reduction structure including a convexo-concave structure.

Also, the secondary object of the present disclosure is to provide a resin molded product capable of suppressing the flow separation and reducing drag, when used for a predetermined moving object, fluid transfer and so on.

Further, the tertiary object of the present disclosure is to provide a moving object capable of suppressing the flow separation and reducing drag, in a moving object provided with a drag reduction structure including a convexo-concave structure.

Solution to Problem

The first embodiment of the present disclosure provides a drag reduction structure wherein a first portion including a plurality of convex portions and concave portions, and a second portion are placed on a first surface; a height from a bottom portion of the concave portion to a top portion of the convex portion, of the first portion, is 10 μm or more and 1000 μm or less; a length of the first portion in a second direction is 30 mm or more; and a width of the first portion and a width of the second portion, in a first direction crossing the second direction, is 0.2 mm or more and 50 mm or less.

Another embodiment of the present disclosure provides a resin molded product comprising a convexo-concave structure on its surface, wherein, in the convexo-concave structure, a first portion including a plurality of convex portions and concave portions, and a second portion are placed on a first surface; a height from a bottom portion of the concave portion to a top portion of the convex portion, of the first portion, is 10 μm or more and 1000 μm or less; a length of the first portion in a second direction is 30 mm or more; and a width of the first portion and a width of the second portion, in a first direction crossing the second direction, is 0.2 mm or more and 50 mm or less.

Another embodiment of the present disclosure provides a shaping mold comprising a convexo-concave structure on its surface, wherein, in the convexo-concave structure, a first portion including a plurality of convex portions and concave portions, and a second portion are placed on a first surface; a height from a bottom portion of the concave portion to a top portion of the convex portion, of the first portion, is 10 μm or more and 1000 μm or less; a length of the first portion in a fourth direction is 30 mm or more; and a width of the first portion and a width of the second portion, in a third direction crossing the fourth direction, is 0.2 mm or more and 50 mm or less.

Another embodiment of the present disclosure provides a moving object comprising a drag reduction structure on its surface, wherein, in the drag reduction structure, a first portion including a plurality of convex portions and concave portions, and a second portion are placed on a first surface; a height from a bottom portion of the concave portion to a top portion of the convex portion, of the first portion, is 10 μm or more and 1000 μm or less; a length of the first portion in a traveling direction of the moving object is 30 mm or more; and a width of the first portion and a width of the second portion, in a direction crossing the traveling direction of the moving object, is 0.2 mm or more and 50 mm or less.

Advantageous Effects of Disclosure

The present disclosure has an effect that it is capable of suppressing the flow separation and reducing drag, when used for a predetermined moving object, fluid transfer and so on, in a drag reduction structure including a convexo-concave structure.

Also, a resin molded product and a shaping mold in the present disclosure have an effect that it is capable of suppressing the flow separation and reducing drag, when used for a predetermined moving object, fluid transfer and so on.

The present disclosure has an effect that it is capable of suppressing the flow separation and reducing drag, in a moving object provided with a drag reduction structure including a convexo-concave structure.

BRIEF DESCRIPTION OF DRAWINGS

FIG. 1A is a schematic plan view and FIGS. 1B and 1C are schematic cross-sectional view illustrating an example of the drag reduction structure in the present disclosure.

FIGS. 10A to 10I are schematic cross-sectional views illustrating an example of the convexo-concave portion of the drag reduction structure in the present disclosure.

FIG. 21A is a schematic plan view and FIGS. 21B and 21C are cross-sectional views illustrating an example of the convexo-concave structure of the shaping mold in the present disclosure.

FIG. 32A is a schematic top view, FIG. 32B is a schematic side view and 32C is a schematic rear view illustrating a truck-shaped model.

DESCRIPTION OF EMBODIMENTS

Figure 2:
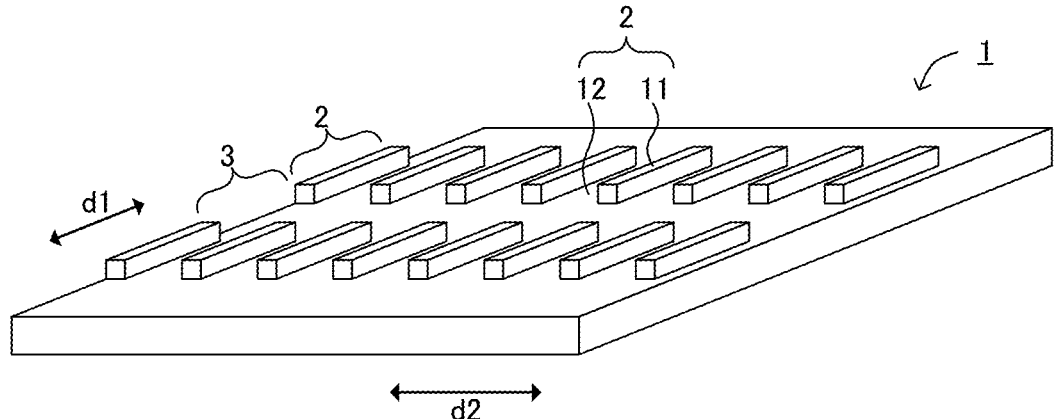
FIG. 2 is a schematic perspective view illustrating an example of the drag reduction structure in the present disclosure.

Embodiments in the present disclosure are hereinafter explained with reference to, for example, drawings. However, the present disclosure is enforceable in a variety of different forms, and thus should not be taken as is limited to the contents described in the embodiments exemplified as below. Also, the drawings may show the features of the present disclosure such as width, thickness, and shape of each part schematically comparing to the actual form in order to explain the present disclosure more clearly in some cases; however, it is merely an example, and thus does not limit the interpretation of the present disclosure. Also, in the present description and each drawing, for the factor same as that described in the figure already explained, the same reference sign is indicated and the detailed explanation thereof may be omitted.

In the present descriptions, in expressing an aspect wherein some member is placed on the other member, when described as merely "on" or "below", unless otherwise stated, it includes both of the following cases: a case wherein some member is placed directly on or directly below the other member so as to be in contact with the other member, and a case wherein some member is placed on the upper side or the lower side of the other member via yet another member. Also, in the present descriptions, on the occasion of expressing an aspect wherein some member is placed on the surface of the other member, when described as merely "on the surface", unless otherwise stated, it includes both of the following cases: a case wherein some member is placed directly on or directly below the other member so as to be in contact with the other member, and a case wherein some member is placed on the upper side or the lower side of the other member via yet another member.

Also, the terms "film", "sheet" and "plate" in the present specification are not distinguished from each other based only on the difference in naming. For example, a sheet and a plate are included in "film".

The drag reduction structure, resin molded product, shaping mold and moving object in the present disclosure will be hereinafter described in detail.

A. Drag Reduction Structure

In the drag reduction structure in the present disclosure, a first portion includes a plurality of convex portions and concave portions, and a second portion placed on a first surface; a height from a bottom portion of the concave portion to a top portion of the convex portion, of the first portion, is 10 μm or more and 1000 μm or less; a length of the first portion in a second direction is 30 mm or more; and a width of the first portion and a width of the second portion, in a first direction crossing the second direction, is 0.2 mm or more and 50 mm or less.

The present disclosure utilizes a technical idea of generating a vortex at the boundary between a rough surface and a smooth surface to suppress the flow separation. As the gas flows along the rough surface and smooth surface, the frictional resistance of the rough surface is higher than the frictional resistance of the smooth surface. Therefore, the flow velocity of the gas is fast on the smooth surface, and the flow velocity of the gas is slow on the rough surface, causing a difference in the flow velocity of the gas between the smooth surface and the rough surface. As a result, a vortex is generated at the boundary between the rough surface and smooth surface. In the present disclosure, the first portion includes a plurality of convex portions and concave portions, and is a portion where the frictional resistance of the gas is high. Meanwhile, the second portion is a portion where the frictional resistance of the gas is low. Therefore, when the gas flows along the first surface of the drag reduction structure, a vortex is generated at the boundary between the first portion and second portion.

Here, as described above, the second portion is a portion where the frictional resistance of the gas is low, compared to the first portion. The second portion, for example, does not include the convex portion and the concave portion, and includes a flat surface. Also, the second portion may include, for example, a convex portion or a concave portion, and in such a case, the height of the convex portion or the depth of the concave portion in the second portion is less than the height of the convex portion or the depth of the concave portion in the first portion.

Incidentally, in the section "A. Drag reduction structure" hereinafter, "first portion" may be referred to as "convexo-concave portion" and "second portion" may be referred to as "flat portion".

FIGS. 1A to 1C and FIG. 2 are schematic plan, cross-sectional and perspective views illustrating an example of the drag reduction structure in the present disclosure, FIG. 1B is a cross-sectional view of A-A line in FIG. 1A, 1C is a cross-sectional view of B-B line in FIG. 1A, and FIG. 2 is a perspective view of FIG. 1A. As shown in FIGS. 1A to 1C and FIG. 2, in the drag reduction structure 1, a convexo-concave portion 2 including a plurality of convex portions 11 and concave portions 12, and a flat portion 3 are placed alternately in a first direction d1. The height H1 of the convexo-concave portion 2 is in a predetermined range, the length L1 of the convexo-concave portion 2 in the second direction d2 perpendicular to the first direction d1 is a predetermined value or more, and the width W1 of the convexo-concave portion 2 and the width W2 of the flat portion 3 in the first direction d1 are in a predetermined range.

Figure 3A:
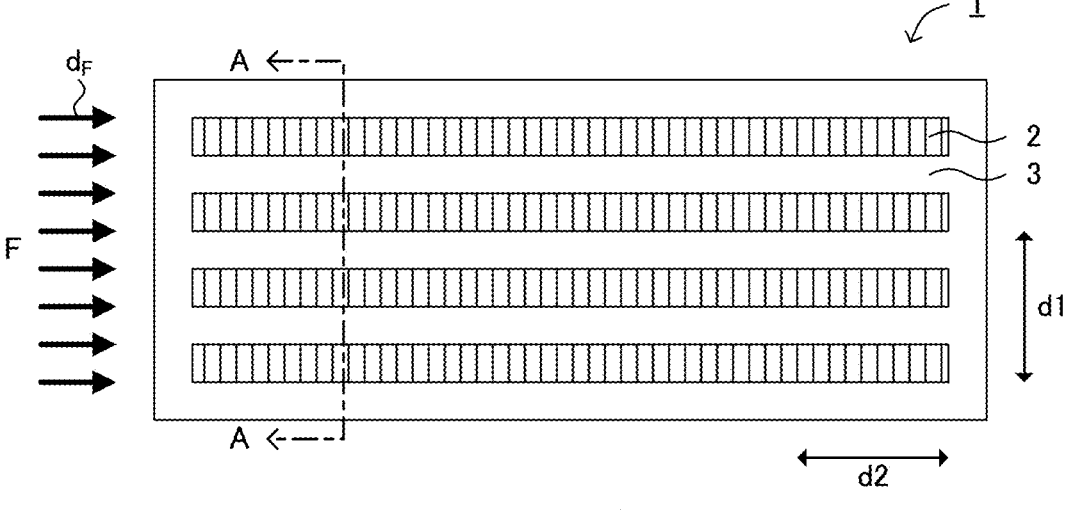
FIGS. 3A and 3B are schematic views illustrating an example of the gas flow in the drag reduction structure in the present disclosure.
Figure 3B:
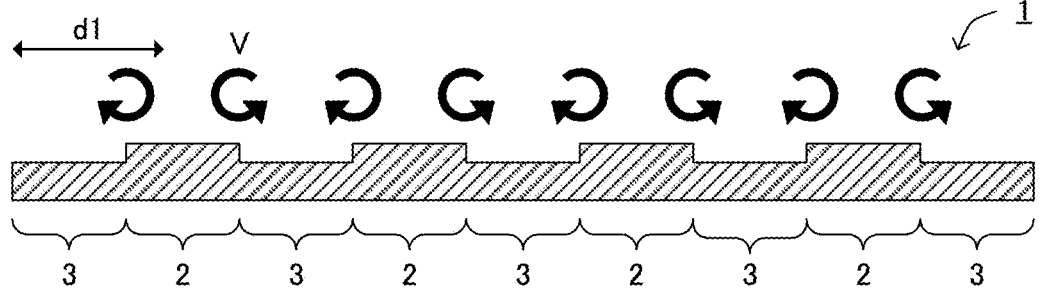

FIGS. 3A and 3B are schematic views illustrating an example of the gas flow in the drag reduction structure in the present disclosure, and FIG. 3B is a cross-sectional view of A-A line in FIG. 3A. As shown in FIG. 3A, when gas F flows along the surface of the drag reduction structure 1, a secondary flow, that is vortex V, is generated near the boundary between the convexo-concave portion 2 and the flat portion 3, parallel to the flow direction $d_F$ of gas F, as shown in FIG. 3B.

Meanwhile, when the length of the convexo-concave portion in the second direction is too short, the vortex may not be generated near the boundary between the convexo-concave portion and the flat portion. In contrast to this, in the drag reduction structure in the present disclosure, since the length L1 of the convexo-concave portion 2 in the second direction d2 is the predetermined value or more, the vortex V may be efficiently generated near the boundary between the convexo-concave portion 2 and the flat portion 3.

Here, when an object is placed in a gas flow, examples of the drag that acts on the object may include frictional resistance and pressure resistance. The frictional resistance is generated by friction between the gas and the surface. Also, the pressure resistance is generated due to the pressure difference between the forward and the rearward. In other words, the pressure resistance is generated due to the flow separation. The present disclosure focuses on the reduction of the pressure resistance, among the drags. The pressure resistance may be problematic in, for example, moving objects such as automobiles, trains and airplanes; pipes such as ducts and gas pipes; windmills; and air-conditioning equipment. The flow velocity of the gas flowing through these objects is, for example, approximately 3 m/s or more and 250 m/s or less (approximately 10 km/h or more and 900 km/h or less).

In the drag reduction structure in the present disclosure, when the flow velocity of the gas flowing through the object is in the above range, for example, by appropriately adjusting the height H1 of the convexo-concave portion 2 so as to be in the predetermined range, the vortex V may be easily generated near the boundary between the convexo-concave portion 2 and the flat portion 3. Therefore, the flow separation from the surface of the drag reduction structure may be suppressed so that the pressure resistance may be reduced. Meanwhile, when the height of the convexo-concave portion is too high, the frictional resistance may increase due to the convexo-concave portion. In this case, even when the pressure resistance decreases, the frictional resistance increases, and as the result, the drag may not decrease. In contrast to this, in the drag reduction structure in the present disclosure, since the height H1 of the convexo-concave portion 2 is in the predetermined range, the pressure resistance may be decreased while suppressing the increase in frictional resistance due to the convexo-concave portion. In other words, the margin for reducing pressure resistance may be increased more than the increase in frictional resistance due to the convexo-concave portion.

Here, the flow around the object is strongly influenced by viscosity in the very thin layer of the object surface. The layer strongly influenced by this viscosity is called a boundary layer.

Figure 4A:
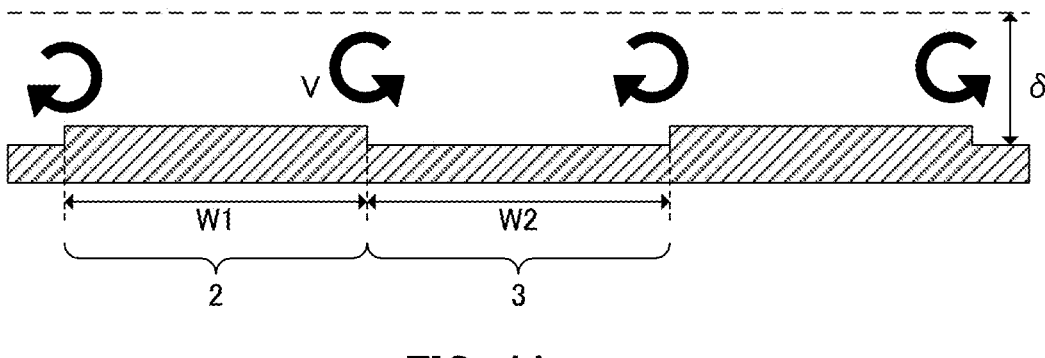
FIGS. 4A to 4C are schematic views illustrating an example of the gas flow in the drag reduction structure.
Figure 4B:
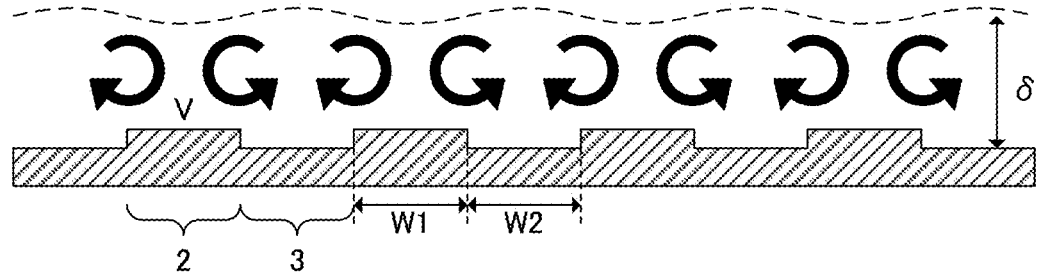
Figure 4C:
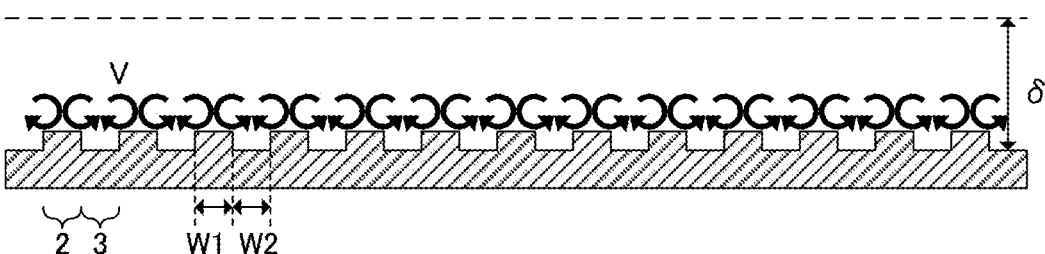

FIGS. 4A to 4C are schematic views illustrating the relationship between the width of the convexo-concave portion and the flat portion in the first direction, and the vortex generated near the boundary between the convexo-concave portion and the flat portion in the drag reduction structure. For example, as shown in FIG. 4A, when the width W1 of the convexo-concave portion 2 and the width W2 of the flat portion 3 in the first direction are too long, although a large vortex V is generated near the boundary between the convexo-concave portion 2 and the flat portion 3, the vortex V does not reach around to the middle part of the convexo-concave portion 2 and the middle part of the flat portion 3. Also, for example, as shown in FIG. 4C, when the width W1 of the convexo-concave portion 2 and the width W2 of the flat portion 3 in the first direction are too short, the vortex V generated near the boundary between the convexo-concave portion 2 and the flat portion 3 is small so that the vortex V does not reach to the outer edge of the boundary layer. In these cases, the flow separation cannot be sufficiently suppressed. Incidentally, δ in FIGS. 4A to 4C indicates the thickness of the boundary layer.

In contrast to this, in the drag reduction structure in the present disclosure, since the width W1 of the convexo-concave portion 2 and the width W2 of the flat portion 3 in the first direction d1 are in the predetermined range, a large vortex V may be generated near the boundary between the convexo-concave portion 2 and the flat portion 3 so that the vortex V may be generated overall the boundary layer, for example, as shown in FIG. 4B.

Incidentally, since the vortex is generated near the boundary between the convexo-concave portion and flat portion, the drag reduction structure have only to include at least one convexo-concave portion and at least one flat portion.

Therefore, in the drag reduction structure in the present disclosure, since the convexo-concave portion including a plurality of convex portions and concave portions, and a flat portion are placed; the length of the convexo-concave portion in the second direction is the predetermined value or more; the height of the convexo-concave portion is in the predetermined range; and the width of the convexo-concave portion and the width of the flat portion in the first direction crossing the second direction are in the predetermined range, the vortex may be efficiently generated near the boundary between the convexo-concave portion and the flat portion. Further, a vortex may be generated near the boundary between the convexo-concave portion and the flat portion, and the vortex may be enlarged in the direction that the boundary line between the convexo-concave portion and the flat portion extends. Therefore, the flow separation from the surface of the drag reduction structure may be efficiently suppressed. Therefore, by applying the drag reduction structure in the present disclosure to the surface of an object, the pressure resistance, among the drags, may be reduced. By having the configuration described above, the margin for reducing pressure resistance may be increased more than the increase in frictional resistance due to the convexo-concave portion. Therefore, the drag may be reduced. As the result, energy saving and carbon dioxide emission reduction may be realized.

Each constitution of the drag reduction structure in the present disclosure is hereinafter described.

1. Convexo-Concave Portion

In the present disclosure, the length of the convexo-concave portion in the second direction is 30 mm or more, and preferably 50 mm or more. When the length of the convexo-concave portion in the second direction is too short, the vortex may not be generated near the boundary between the convexo-concave portion and the flat portion so that the effect of suppressing the flow separation may not be obtained. Also, since the length of the convexo-concave portion in the second direction is in the predetermined range, the vortex may be efficiently generated near the boundary between the convexo-concave portion and the flat portion. Also, the length of the convexo-concave portion in the second direction is preferably, for example, 1000 mm or less, and more preferably 200 mm or less. When the length of the convexo-concave portion in the second direction is too long, even when the pressure resistance may be reduced, the frictional resistance will increase, and the drag may not be sufficiently reduced, and the production cost may be increased. Therefore, the length of the convexo-concave portion in the second direction is preferably 30 mm or more and 1000 mm or less, more preferably 50 mm or more and 1000 mm or less, and further preferably 50 mm or more and 200 mm or less.

Figure 5A:
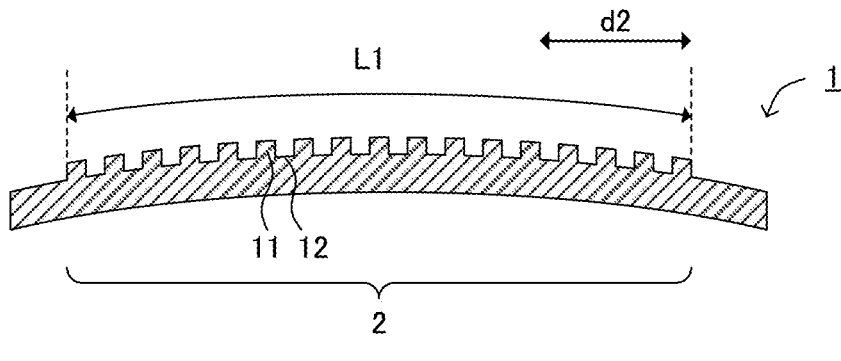
FIGS. 5A and 5B are schematic cross-sectional views illustrating an example of the drag reduction structure in the present disclosure.

Here, the length L1 of the convexo-concave portion 2 in the second direction d2 is a distance from one end portion to the other end portion of the convexo-concave portion 2 in the second direction d2, for example, as shown in FIG. 1A. Specifically, as described below, when the convex portion in the convexo-concave portion projects with respect to the surface of the flat portion, the length of the convexo-concave portion in the second direction is a distance from an end portion of the convex portion positioned at one end to an end portion of the convex portion positioned at the other end, of the convexo-concave portion in the second direction. Meanwhile, as described below, in the convexo-concave portion, when the concave portion sags with respect to the surfaced of the flat portion, the length of the convexo-concave portion in the second direction is a distance from an end portion of the concave portion positioned at one end to an end portion of the concave portion positioned at the other end, of the convexo-concave portion in the second direction. Also, when the surface of the drag reduction structure 1 is a flat surface, for example, as shown in FIG. 1C, the length of the convexo-concave portion in the second direction is the length L1 of the convexo-concave portion 2, on the flat surface, in the second direction d2, for example, as shown in FIG. 1A. Also, as shown in FIG. 5A, for example, when the surface of the drag reduction structure 1 is a curved surface, the length of the convexo-concave portion in the second direction is the length L1 of the convexo-concave portion 2, on the curved surface, in the second direction d2.

Also, in the present disclosure, the height of the convexo-concave portion is 10 μm or more, preferably 20 μm or more, and further preferably 50 μm or more. Meanwhile, the height of the convexo-concave portion is 1000 μm or less, preferably 800 μm or less, further preferably 500 μm or less, and particularly preferably 200 μm or less. Also, the height of the convexo-concave portion is 10 μm or more and 1000 μm or less, preferably 15 μm or more and 800 μm or less, more preferably 20 μm or more and 500 μm or less, further preferably 20 μm or more and 200 μm or less, and particularly preferably 50 μm or more and 200 μm or less. As described above, the flow velocity of the gas flowing through an object such as moving objects such as automobiles, trains and airplanes; pipes such as ducts and gas pipes; windmills; and air-conditioning equipment, is approximately 3 m/s or more and 250 m/s or less, that is, approximately 10 km/h or more and 900 km/h or less. When the flow velocity is in the above range, by appropriately adjusting the height of the convexo-concave portion so as to be in the above range, the vortex may be easily generated near the boundary between the convexo-concave portion and the flat portion. Also, for example, the velocity of an automobile is approximately 10 km/h or more and 120 km/h or less, and in this case, the flow velocity of air flowing through the automobile is approximately 3 m/s or more and 33 m/s or less, that is, approximately 10 km/h or more and 120 km/h or less. When the flow velocity is in the above range, by appropriately adjusting the height of the convexo-concave portion so as to be in a range of 20 μm or more and 500 μm or less, the vortex may be easily generated near the boundary between the convexo-concave portion and the flat portion. Further, since the height of the convexo-concave portion is in the above range, the margin for reducing pressure resistance may be increased more than the increase in frictional resistance due to the convexo-concave portion.

The height of the convexo-concave portion is preferably approximately 1/100 or more and 1/10 or less of the thickness of the boundary layer. Also, the faster the gas flow velocity, the thinner the thickness of the boundary layer. Therefore, as the gas flow velocity gets faster, the height of the convexo-concave portion is preferably lower in the above range.

Here, the length H1 of the convexo-concave portion 2 is a height from the bottom portion of the concave portion 12 to a top portion of the convex portion 11, of the convexo-concave portion 2, as shown in FIG. 1C for example. Specifically, when the convex portion projects with respect to the surface of the flat portion in the convexo-concave portion, the height of the convexo-concave portion is a height from the bottom portion of the concave portion positioned between two adjacent convex portions to the top portion of the convex portion. Also, in the convexo-concave portion, when the concave portion sags with respect to the surfaced of the flat portion, the height of the convexo-concave portion is a height from the bottom portion of the concave portion to the top portion of the convex portion positioned between two adjacent concave portions.

Also, in the present disclosure, the width of the convexo-concave portion in the first direction is 0.2 mm or more, and preferably 1 mm or more. Meanwhile, the width of the convexo-concave portion in the first direction is 50 mm or less, and preferably 25 mm or less. Also, the width of the convexo-concave portion in the first direction is 0.2 mm or more and 50 mm or less, and preferably 1 mm or more and 25 mm or less. Since the width of the convexo-concave portion in the first direction is in the above range, a large vortex V is generated near the boundary between the convexo-concave portion 2 and the flat portion 3 as shown in FIG. 4B for example so that the vortex V may be generated overall the boundary layer.

The width of the convexo-concave portion in the first direction is more preferably the same as the thickness of the boundary layer. Also, the faster the gas flow velocity, the thinner the thickness of the boundary layer. Therefore, as the gas flow velocity gets faster, the width of the convexo-concave portion in the first direction is preferably shorter in the above range.

The width of the convexo-concave portion in the first direction may be the same as, and may be different from the width of the flat portion in the first direction described below, as long as it is in the above range. Among them, the width of the convexo-concave portion in the first direction and the width of the flat portion in the first direction are preferably the same. In this case, the vortex may be efficiently generated near the boundary between the convexo-concave portion and the flat portion.

Figure 5B:
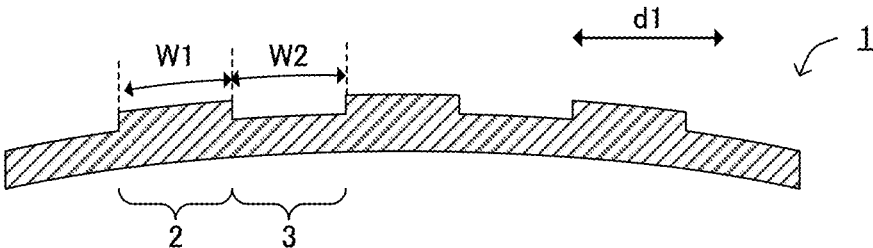

Here, the width W1 of the convexo-concave portion 2 in the first direction d1 is a distance from one end portion to the other end portion of the convexo-concave portion 2 in the first direction d1, for example, as shown in FIGS. 1A and 1B. Also, as shown in FIG. 1B, for example, when the surface of the drag reduction structure 1 is a flat surface, the width of the convexo-concave portion in the first direction is a width W1 of the convexo-concave portion 2, on the flat surface, in the first direction d1. Also, as shown in FIG. 5B, for example, when the surface of the drag reduction structure 1 is a curved surface, the width of the convexo-concave portion in the first direction is a width W1 of the convexo-concave portion 2, on the curved surface, in the first direction d1.

Also, the first direction crosses the second direction. Among them, the first direction is preferably perpendicular to the second direction. The angle between the first direction and the second direction is preferably, for example, 85° or more and 95° or less, and more preferably 90°.

Figure 6:
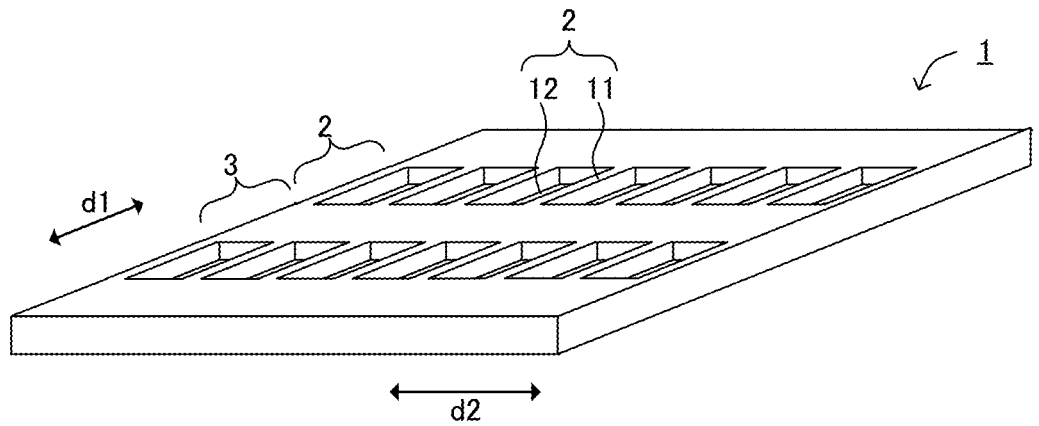
FIG. 6 is a schematic perspective view illustrating an example of the drag reduction structure in the present disclosure.
Figure 7A:
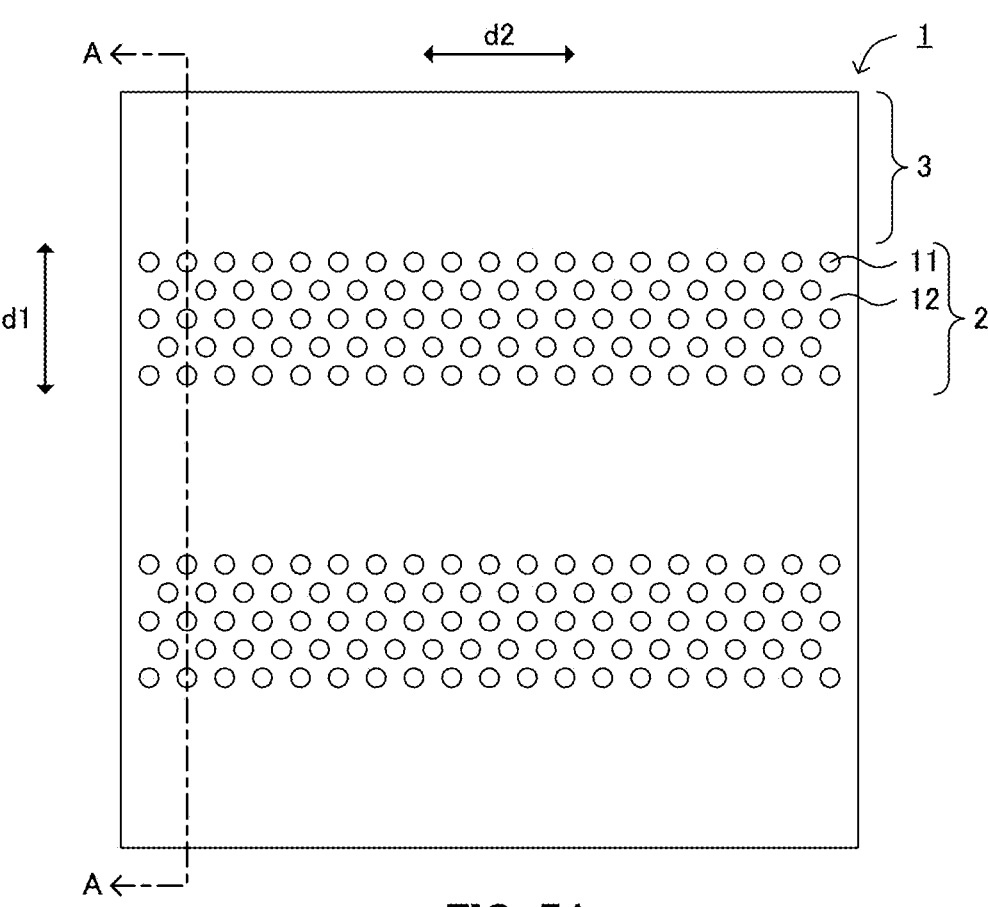
FIG. 7A is a schematic plan view and FIGS. 7B and 7C are schematic cross-sectional view illustrating an example of the drag reduction structure in the present disclosure.
Figure 7B:
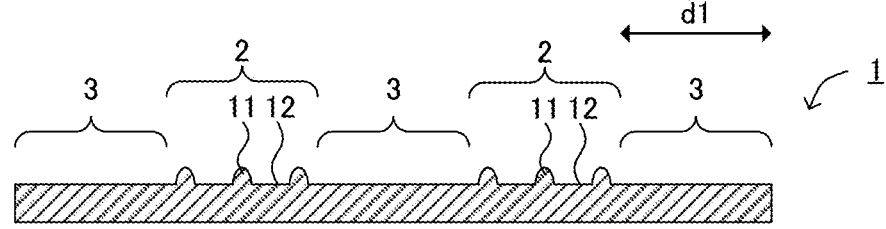
Figure 7C:
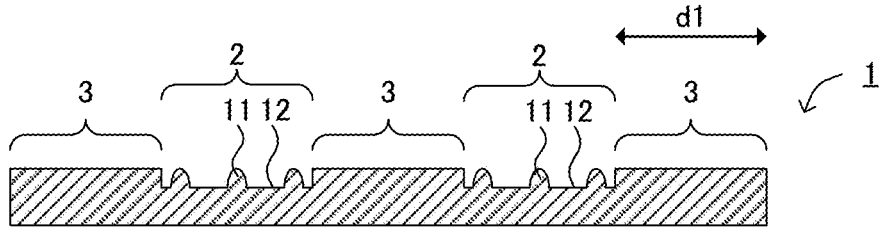
Figure 8A:
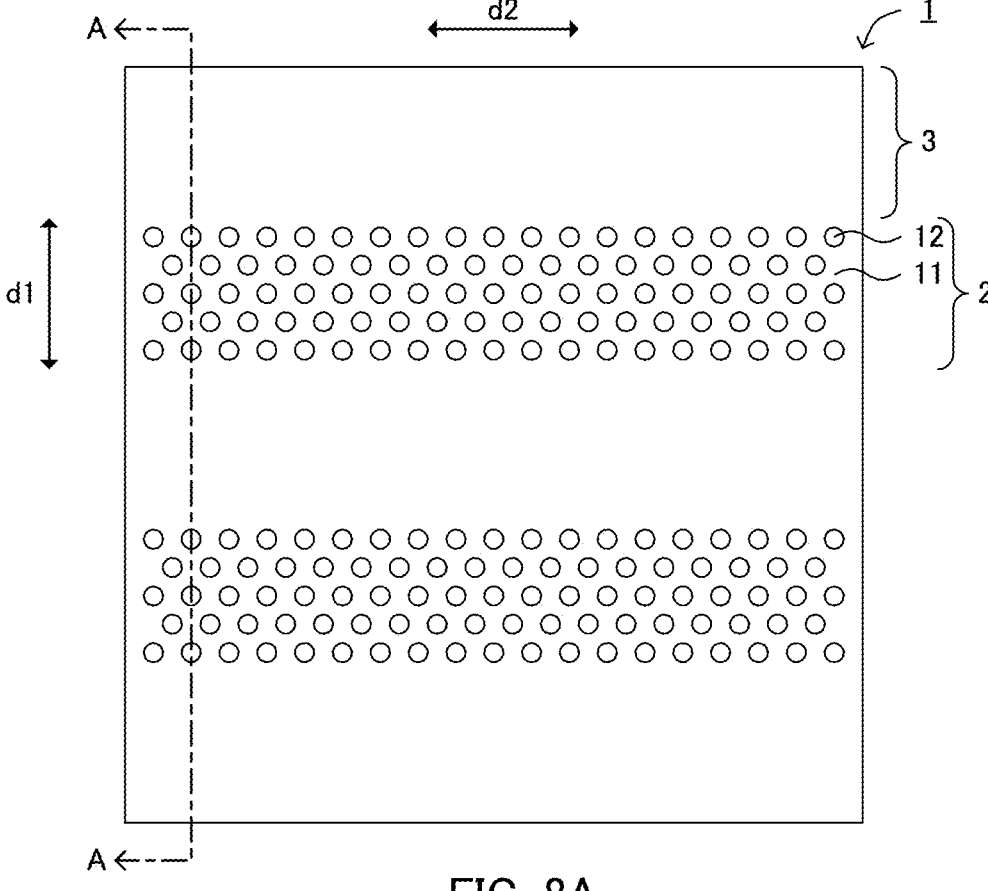
FIG. 8A is a schematic plan view and FIG. 8B is a schematic cross-sectional view illustrating an example of the drag reduction structure in the present disclosure.
Figure 8B:
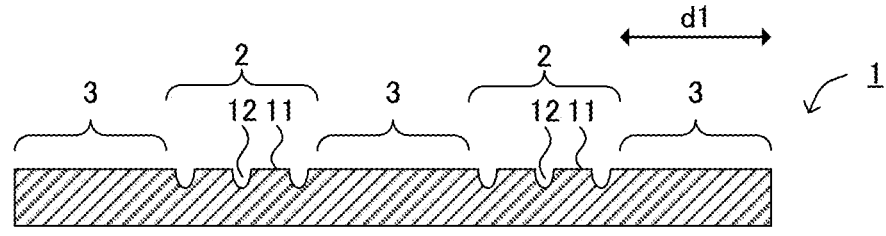

Also, in the convexo-concave portion, the convex portion may project with respect to the surface of the flat portion, and the concave portion may sag with respect to the surface of the flat portion. For example, FIG. 2 and FIG. 7B are examples where convex portion 11 of convexo-concave portion 2 projects with respect to the surface of the flat portion 3, and FIG. 6, FIG. 7C and FIG. 8B are examples where the concave portion 12 of the convexo-concave portion 2 sags with respect to the surface of the flat portion 3.

Among them, the convex portion preferably projects with respect to the surface of the flat portion. In such case, the vortex may be easily generated near the boundary between the convexo-concave portion and the flat portion.

When the convex portion projects with respect to the surface of the flat portion, the bottom portion of the concave portion 12 is usually positioned on the same flat surface as the surface of the flat portion 3, as shown in FIG. 2 for example. Also, when the concave portion sags with respect to the surface of the flat portion, the top portion of the convex portion 11 is usually positioned on the same flat surface as the surface of the flat portion 3, as shown in FIG. 6 for example.

The convexo-concave portion includes a plurality of convex portions and concave portions. In the convexo-concave portion, the plurality of convex portions and concave portions may be arranged so that they are uniformly distributed.

The pattern shape of the convex portion and the concave portion in a plan view may be, for example, a regular pattern, and may be a random pattern. In the case of a regular pattern, examples of the pattern may include a line-shaped pattern, a dot-shaped pattern and a grid-shaped pattern.

Examples of the line-shaped pattern may include a straight line-shaped pattern; and a wave-shaped pattern such as a sinusoidal wave-shaped pattern and a triangular wave-shaped pattern. Among them, the line-shaped pattern is preferably a straight line-shaped pattern.

Also, in a dot-shaped pattern, examples of the arrangement of the dots may include a square grid-arrangement, a rectangular grid-arrangement, a triangular grid-arrangement, a hexagonal grid-arrangement, a rhombic grid-arrangement, and a parallelogram grid-arrangement. Among them, when the pattern shape, in a plan view, of the convex portion or the concave portion is a dot-shaped pattern, the arrangement of the dots is preferably a triangular grid-arrangement or a rhombic grid-arrangement. In a case of such a dot-shaped arrangement, the vortex may be easily generated near the boundary between the convexo-concave portion and the flat portion.

Also, examples of the grid-shaped pattern may include patterns such as a square grid-pattern, a rectangular grid-pattern, a triangular grid-pattern, a hexagonal grid-pattern, a rhombic grid-pattern, and a parallelogram grid-pattern.

Figure 9:
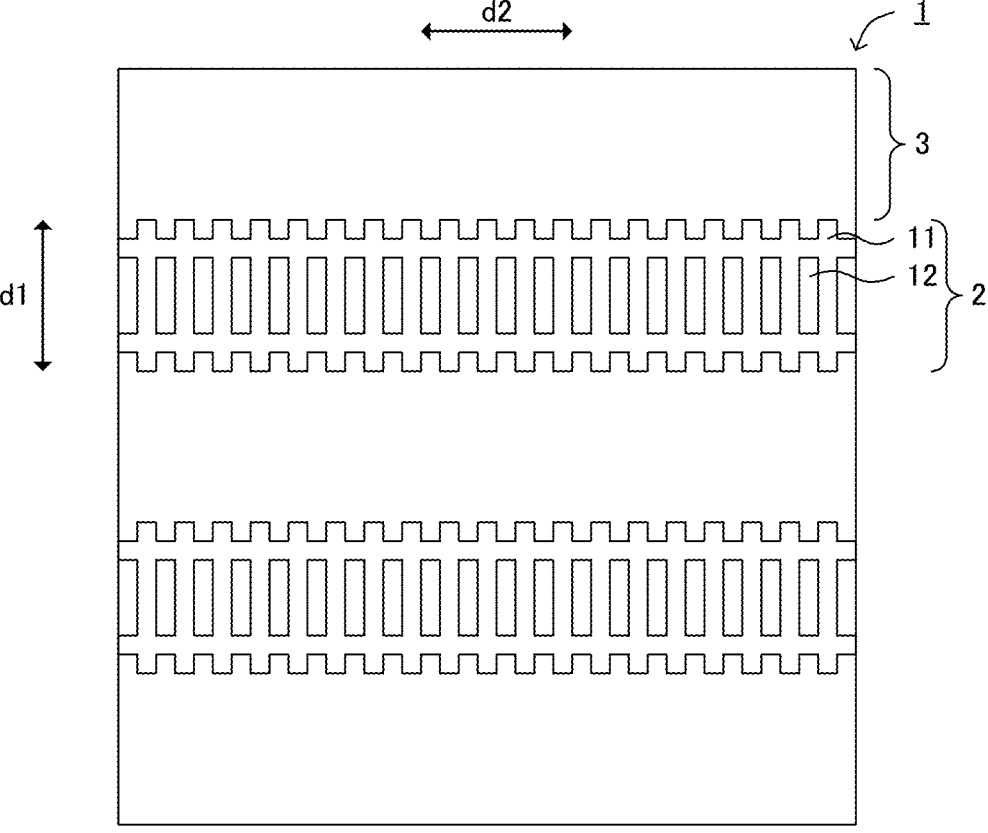
FIG. 9 is a schematic plan view illustrating an example of the drag reduction structure in the present disclosure.

For example, FIG. 2 and FIG. 6 are examples where the pattern shape, in a plan view, of the convex portion 11 and the concave portion 12 is a straight line-shaped pattern. FIGS. 7A to 7C are examples where the pattern shape, in a plan view, of the convex portion 11 is a dot-shaped pattern of a triangle grid-arrangement. FIGS. 8A to 8B are examples where the pattern shape, in a plan view, of the concave portion 12 is a dot-shaped pattern of a triangle grid-arrangement. Incidentally, FIGS. 7B and 7C are cross-sectional views of A-A line in FIG. 7A respectively, and FIG. 8B is a cross-sectional view of A-A line in FIG. 8A. Also, FIG. 9 is an example where the pattern shape, in a plan view, of the convex portion 11 is a grid-shaped pattern of a rectangular grid-arrangement.

When the pattern shape of the convex portion and the concave portion in a plan view is a line-shaped pattern, the longitudinal direction of the line-shaped pattern of the convex portion and the concave portion preferably crosses the second direction, and more preferably approximately perpendicular to the second direction, that is, approximately parallel to the first direction. Specifically, when the pattern shape of the convex portion and the concave portion is a straight line-shaped pattern, the longitudinal direction of the straight line-shaped pattern of the convex portion and the concave portion preferably crosses the second direction, and preferably approximately perpendicular to the second direction, that is, approximately parallel to the first direction, for example, as shown in FIG. 2 and FIG. 6. That is, the convexo-concave portion preferably includes a plurality of the convex portions and the concave portions extending in a straight line along the first direction. As described below, the drag reduction structure in the present disclosure is preferably placed and used in such a way that the boundary line between the convexo-concave portion 2 and flat portion 3 is approximately parallel to the flow direction d$_F$ of gas F, for example, as shown in FIG. 3A. In other words, as shown in FIG. 3A for example, the drag reduction structure in the present disclosure is preferably placed and used in such a way that the first direction d1 is approximately perpendicular to the flow direction d$_F$ of gas F, that is, in such a way that the second direction d2 is approximately parallel to the flow direction d$_F$ of gas F. Therefore, when the longitudinal direction of the line-shaped pattern of the convex portion and the concave portion crosses the second direction, the longitudinal direction of the line-shaped pattern of the convex portion and the concave portion may be crossed to the flow direction of the gas. In such case, the vortex may be easily generated near the boundary between the convexo-concave portion and the flat portion. Also, when the longitudinal direction of the line-shaped pattern of the convex portion and the concave portion is approximately perpendicular to the second direction, the longitudinal direction of the line-shaped pattern of the convex portion and the concave portion may be approximately perpendicular to the flow direction of the gas. In such case, the vortex may be further easily generated near the boundary between the convexo-concave portion and the flat portion.

Therefore, as shown in FIG. 2 for example, it is particularly preferable that the convexo-concave portion 2 includes a plurality of the convex portions 11 and the concave portions 12 extending in a straight line along the first direction d1, and the convex portion 11 projects with respect to the surface of the flat portion 3. In such case, the vortex may be efficiently generated near the boundary between the convexo-concave portion and the flat portion.

Also, when the longitudinal direction of the line-shaped pattern of the convex portion and the concave portion crosses the second direction, the angle between the longitudinal direction of the line-shaped pattern and the second direction is preferably, for example, 90°+45°, that is, 45° or more and 135° or less. Similarly, when the longitudinal direction of the straight line-shaped pattern of the convex portion and the concave portion crosses the second direction, the angle between the longitudinal direction of the straight line-shaped pattern and the second direction is preferably, for example, 90°+45°, that is, 45° or more and 135° or less.

That is, when the longitudinal direction of the line-shaped pattern of the convex portion and the concave portion crosses the flow direction of the gas, the angle between the longitudinal direction of the line-shaped pattern and the flow direction of the gas is preferably, for example, 90°+45°, that is, 45° or more and 135° or less. Similarly, when the longitudinal direction of the straight line-shaped pattern of the convex portion and the concave portion crosses the flow direction of the gas, the angle between the longitudinal direction of the straight line-shaped pattern and the flow direction of the gas is preferably, for example, 90±45°, that is, 45° or more and 135° or less.

Here, the longitudinal direction of the line-shaped pattern of the convex portion and the concave portion being approximately parallel to the first direction means that the angle between the longitudinal direction of the line-shaped pattern and the first direction is 0°+5°, that is, −5° or more and 5° or less. Similarly, the longitudinal direction of the straight line-shaped pattern of the convex portion and the concave portion being approximately parallel to the first direction means that the angle between the longitudinal direction of the straight line-shaped pattern and the first direction is 0°+5°, that is, −5° or more and 5° or less.

Also, the longitudinal direction of the line-shaped pattern of the convex portion and the concave portion being approximately perpendicular to the flow direction of the gas means that the angle between the longitudinal direction of the line-shaped pattern and the flow direction of the gas is 90°+5°, that is, 85° or more and 95° or less. Similarly, the longitudinal direction of the straight line-shaped pattern of the convex portion and the concave portion being approximately perpendicular to the flow direction of the gas means that the angle between the longitudinal direction of the straight line-shaped pattern and the flow direction of the gas is 90°+5°, that is, 85° or more and 95° or less.

Incidentally, for example, in the case of a straight line-shaped pattern, the longitudinal direction of the line-shaped pattern means the direction to which the straight line-shaped pattern extends, and in the case of a wave-shaped pattern, it means the direction to which the wave-shaped pattern extends.

Therefore, the angle between the longitudinal direction of the line-shaped pattern and the second direction is preferably, for example, 45° or more and 135° or less, more preferably 80° or more and 100° or less, and further preferably 85° or more and 95° or less. Also, when the line-shaped pattern is a straight line-shaped pattern, the angle between the longitudinal direction of the straight line-shaped pattern and the second direction is preferably, for example, 45° or more and 135° or less, more preferably 80° or more and 100° or less, and further preferably 85° or more and 95° or less.

Also, the angle between the longitudinal direction of the line-shaped pattern and the flow direction of the gas is preferably, for example, 45° or more and 135° or less, more preferably 80° or more and 100° or less, and further preferably 85° or more and 95° or less. Also, when the line-shaped pattern is a straight line-shaped pattern, the angle between the longitudinal direction of the straight line-shaped pattern and the flow direction of the gas is preferably, for example, 45° or more and 135° or less, more preferably 80° or more and 100° or less, and further preferably 85° or more and 95° or less.

When the pattern shape, in a plan view, of the convex portion and the concave portion is a line-shaped pattern, the width of the line-shaped convex portion is preferably, for example, 1 time or more and 2 times or less of the height of the convexo-concave portion. Specifically, when the pattern shape of the convex portion and the concave portion is a straight line-shaped pattern, the width of the straight line-shaped convex portion is preferably 1 time or more and 2 times or less of the height of the convexo-concave portion. When the width of the line-shaped convex portion is too small, it may be difficult to form the convexo-concave portion. Also, when the width of the line-shaped convex portion is too large, it may be difficult to sufficiently generate the vortex near the boundary between the convexo-concave portion and the flat portion.

Here, the width of the line-shaped convex portion is the width W3 of the convex portion 11, as shown in FIGS. 10A to 10I for example, and is the largest width among the widths of the convex portion 11.

Also, when the pattern shape, in a plan view, of the convex portion and the concave portion is a line-shaped pattern, the width of the line-shaped concave portion is preferably, for example, 1 time or more, and more preferably 4 times or more of the height of the convexo-concave portion. Meanwhile, the width of the line-shaped concave portion is preferably, for example, 12 times or less, and more preferably 10 times or less of the height of the convexo-concave portion. Also, the width of the line-shaped concave portion is preferably, for example, 1 time or more and 12 times or less, and more preferably 4 times or more and 10 times or less of the height of the convexo-concave portion. Specifically, when the pattern shape, in a plan view, of the convex portion and the concave portion is a straight line-shaped pattern, the width of the straight line-shaped concave portion is preferably, for example, 1 time or more, and more preferably 4 times or more of the height of the convexo-concave portion. Meanwhile, the width of the straight line-shaped concave portion is preferably, for example, 12 times or less, and more preferably 10 times or less of the height of the convexo-concave portion. Also, the width of the straight line-shaped concave portion is preferably 1 time or more and 12 times or less, and more preferably 4 times or more and 10 times or less of the height of the convexo-concave portion. When the width of the line-shaped concave portion is too small, the density of the convex portion will be high so that it may be difficult to sufficiently generate the vortex near the boundary between the convexo-concave portion and the flat portion. Also, when the width of the line-shaped concave portion is too large, the density of the convex portion will be low so that it may be difficult to sufficiently generate the vortex near the boundary between the convexo-concave portion and the flat portion. Also, when the width of the line-shaped concave portion is 4 times or more and 10 times or less of the height of the convexo-concave portion, the vortex may be generated near the boundary between the convexo-concave portion and the flat portion so that the flow separation may be efficiently suppressed.

Here, the width of the line-shaped concave portion is the width W4 of the concave portion 12, as shown in FIGS. 10A to 10I for example, and is the smallest width among the widths of the concave portion 12. For example, in FIGS. 10D, 10G to 10I, the width of the concave portion 12 is zero.

Also, when the pattern shape, in a plan view, of the convex portion and the concave portion is a line-shaped pattern, the pitch of the line-shaped convex portion is preferably, for example, 2 time or more, and more preferably 5 times or more of the height of the convexo-concave portion. Meanwhile, the pitch of the line-shaped convex portion is preferably, for example, 14 times or less, and more preferably 12 times or less of the height of the convexo-concave portion. Also, the pitch of the line-shaped convex portion is preferably, for example, 2 time or more and 14 times or less, and more preferably 5 times or more and 12 times or less of the height of the convexo-concave portion. Specifically, when the pattern shape, in a plan view, of the convex portion and the concave portion is a straight line-shaped pattern, the pitch of the straight line-shaped convex portion is preferably, for example, 2 time or more, and more preferably 5 times or more of the height of the convexo-concave portion. Meanwhile, the pitch of the straight line-shaped convex portion is preferably, for example, 14 times or less, and more preferably 12 times or less of the height of the convexo-concave portion. Also, the pitch of the straight line-shaped convex portion is preferably 2 time or more and 14 times or less, and more preferably 5 times or more and 12 times or less of the height of the convexo-concave portion. When the pitch of the line-shaped convex portion is too small, the density of the convex portion will be high so that it may be difficult to sufficiently generate the vortex near the boundary between the convexo-concave portion and the flat portion. Also, when the pitch of the line-shaped convex portion is too large, the density of the convex portion will be low so that it may be difficult to sufficiently generate the vortex near the boundary between the convexo-concave portion and the flat portion.

Here, the pitch of the line-shaped convex portion is the pitch P1 of the convex portion 11, as shown in FIGS. 10A to 10I for example, and is the distance between the adjacent convex portions 11.

Also, when the pattern shape, in a plan view, of the convex portion is a dot-shaped pattern, the size of the dot-shaped convex portion, in a plan view, is preferably, for example, 1 time or more and 2 times or less of the height of the convexo-concave portion. When the size of the dot-shaped convex portion is too small, it may be difficult to form the convexo-concave portion. Also, when the size of the dot-shaped convex portion is too large, it may be difficult to sufficiently generate the vortex near the boundary between the convexo-concave portion and the flat portion.

Also, when the pattern shape, in a plan view, of the concave portion is a dot-shaped pattern, the size of the dot-shaped concave portion, in a plan view, is preferably, for example, 1 time or more and more preferably 4 times or more of the height of the convexo-concave portion. Meanwhile, the size of the dot-shaped concave portion, in a plan view, is preferably, for example, 12 time or less, and more preferably 10 times or less of the height of the convexo-concave portion. Also, the size of the dot-shaped concave portion, in a plan view, is preferably, for example, 1 time or more and 12 time or less, and more preferably 4 time or more and 10 times or less of the height of the convexo-concave portion. When the size of the dot-shaped concave portion is too small, the density of the convex portion will be high so that it may be difficult to sufficiently generate the vortex near the boundary between the convexo-concave portion and the flat portion. Also, when the size of the dot-shaped concave portion is too large, the density of the convex portion will be low so that it may be difficult to sufficiently generate the vortex near the boundary between the convexo-concave portion and the flat portion. Also, when the size of the dot-shaped concave portion is 4 times or more and 10 times or less of the height of the convexo-concave portion, the vortex may be generated near the boundary between the convexo-concave portion and the flat portion so that the flow separation may be efficiently suppressed.

Here, the size of the dot-shaped convex portion or concave portion in a plan view is, for example, the diameter when the shape of the convex portion or concave portion in a plan view is a circular shape; the major diameter when the shape of the convex portion or concave portion in a plan view is an oval shape; and the length of the diagonal line when the shape of the convex portion or concave portion in a plan view is a rectangular shape.

Also, when the pattern shape, in a plan view, of the convex portion or the concave portion is a dot-shaped pattern, the pitch of the dot-shaped convex portion or the concave portion is preferably, for example, 2 time or more, and more preferably 5 times or more of the height of the convexo-concave portion. Meanwhile, the pitch of the dot-shaped convex portion or the concave portion is preferably, for example, 14 times or less, and more preferably 12 times or less of the height of the convexo-concave portion. Also, the pitch of the dot-shaped convex portion or the concave portion is preferably, for example, 2 time or more and 14 times or less, and more preferably 5 times or more and 12 times or less of the height of the convexo-concave portion. When the pitch of the dot-shaped the convex portion or the concave portion is too small, the density of the convex portion will be high so that it may be difficult to sufficiently generate the vortex near the boundary between the convexo-concave portion and the flat portion. Also, when the pitch of the dot-shaped convex portion or the concave portion is too large, the density of the convex portion will be low so that it may be difficult to sufficiently generate the vortex near the boundary between the convexo-concave portion and the flat portion.

Here, the pitch of the dot-shaped convex portion or the concave portion is the distance between the adjacent convex portions or concave portions.

Also, when the pattern shape, in a plan view, of the convex portion is a grid-shaped pattern, the width of the grid-shaped convex portion is preferably, for example, 1 time or more and 2 times or less of the height of the convexo-concave portion. When the width of the grid-shaped convex portion is too small, it may be difficult to form the convexo-concave portion. Also, when the width of the grid-shaped convex portion is too large, it may be difficult to sufficiently generate the vortex near the boundary between the convexo-concave portion and the flat portion.

Also, when the pattern shape, in a plan view, of the convex portion is a grid-shaped pattern, the distance between the grid-shaped convex portions is preferably, for example, 1 time or more, and more preferably 4 times or more of the height of the convexo-concave portion. Meanwhile, the distance between the grid-shaped convex portions is preferably, for example, 12 times or less, and more preferably 10 times or less of the height of the convexo-concave portion. Also, the distance between the grid-shaped convex portions is preferably, for example, 1 time or more and 12 times or less, and more preferably 4 times or more and 10 times or less of the height of the convexo-concave portion. When the distance between the grid-shaped convex portions is too small, the density of the convex portion will be high so that it may be difficult to sufficiently generate the vortex near the boundary between the convexo-concave portion and the flat portion. Also, when the distance between the grid-shaped convex portions is too large, the density of the convex portion will be low so that it may be difficult to sufficiently generate the vortex near the boundary between the convexo-concave portion and the flat portion. Also, when the distance between the grid-shaped convex portions is 4 times or more and 10 times or less of the height of the convexo-concave portion, the vortex may be generated near the boundary between the convexo-concave portion and the flat portion so that the flow separation may be efficiently suppressed.

Also, when the pattern shape, in a plan view, of the concave portion is a grid-shaped pattern, the width of the grid-shaped concave portion is preferably, for example, 1 time or more, and more preferably 4 times or more of the height of the convexo-concave portion. Meanwhile, the width of the grid-shaped concave portion is preferably, for example, 12 times or less, and more preferably 10 times or less of the height of the convexo-concave portion. Also, the width of the grid-shaped concave portions is preferably, for example, 1 time or more and 12 times or less, and more preferably 4 times or more and 10 times or less of the height of the convexo-concave portion. When the width of the grid-shaped concave portion is too small, the density of the convex portion will be high so that it may be difficult to sufficiently generate the vortex near the boundary between the convexo-concave portion and the flat portion. Also, when the width of the grid-shaped concave portion is too large, the density of the convex portion will be low so that it may be difficult to sufficiently generate the vortex near the boundary between the convexo-concave portion and the flat portion. Also, when the width of the grid-shaped concave portion is 4 times or more and 10 times or less of the height of the convexo-concave portion, the vortex may be generated near the boundary between the convexo-concave portion and the flat portion so that the flow separation may be efficiently suppressed.

Also, when the pattern shape, in a plan view, of the concave portion is a grid-shaped pattern, the distance between the grid-shaped concave portions is preferably, for example, 1 time or more and 2 times or less of the height of the convexo-concave portion. When the distance between the grid-shaped concave portions is too small, it may be difficult to form the convexo-concave portion. Also, when the distance between the grid-shaped concave portions is too large, it may be difficult to sufficiently generate the vortex near the boundary between the convexo-concave portion and the flat portion.

Also, when the pattern shape, in a plan view, of the convex portion or the concave portion is a grid-shaped pattern, the pitch of the grid-shaped convex portion or the concave portion is preferably, for example, 2 time or more, and more preferably 5 times or more of the height of the convexo-concave portion. Meanwhile, the pitch of the grid-shaped convex portion or the concave portion is preferably, for example, 14 times or less, and more preferably 12 times or less of the height of the convexo-concave portion. Also, the pitch of the grid-shaped convex portion or the concave portion is preferably, for example, 2 time or more and 14 times or less, and more preferably 5 times or more and 12 times or less of the height of the convexo-concave portion. When the pitch of the grid-shaped the convex portion or the concave portion is too small, the density of the convex portion will be high so that it may be difficult to sufficiently generate the vortex near the boundary between the convexo-concave portion and the flat portion. Also, when the pitch of the grid-shaped convex portion or the concave portion is too large, the density of the convex portion will be low so that it may be difficult to sufficiently generate the vortex near the boundary between the convexo-concave portion and the flat portion.

Incidentally the dimensions of the convexo-concave portion, concave portion and convex portion may be measured by observing the surface or the thickness direction cross-section of the drag reduction structure using a laser displacement sensor.

Figure 10A:
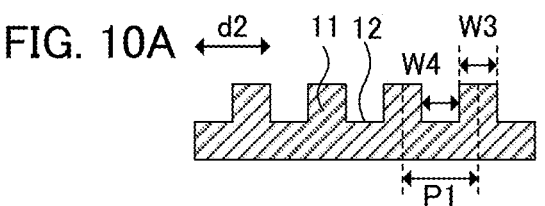
Figure 10G:
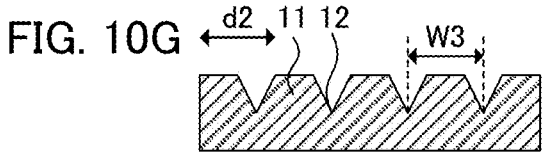
Figure 10B:
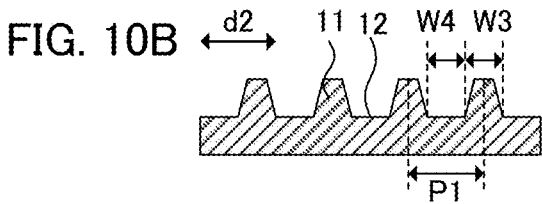
Figure 10H:
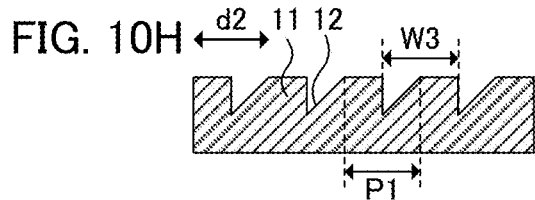
Figure 10C:
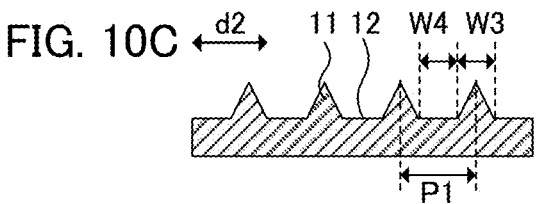
Figure 10I:
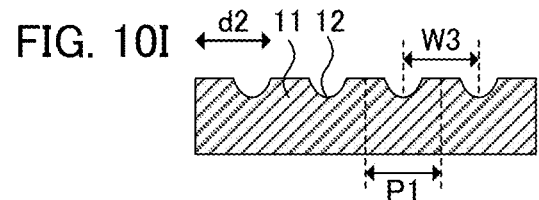
Figure 10D:
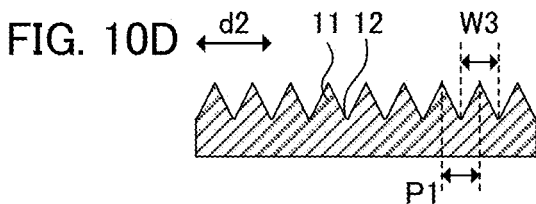
Figure 10F:
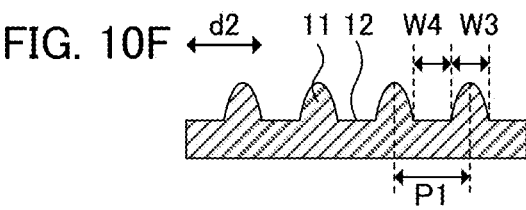

Also, the cross-sectional shape of the convex portion and the concave portion is not particularly limited, and examples thereof may include a rectangular shape, a trapezoidal shape, a triangular shape, a half circular shape and a half oval shape. For example, FIG. 10A shows an example where the cross-sectional shape of the convex portion 11 and the concave portion 12 is a rectangular shape; FIG. 10B shows an example where the cross-sectional shape of the convex portion 11 and the concave portion 12 is a trapezoidal shape; FIGS. 10C to 10E show an example where the cross-sectional shape of the convex portion 11 is a triangular shape; FIG. 10F shows an example where the cross-sectional shape of the convex portion 11 is a half oval shape; FIGS. 10G to 10H show an example where the cross-sectional shape of the concave portion 12 is a triangular shape; and FIG. 10I shows an example where the cross-sectional shape of the concave portion 12 is a half circular shape.

Among them, the cross-sectional shape of the convex portion or the concave portion is preferably a trapezoidal shape, a half circular shape and a half oval shape. In the case of these shapes, the formation of the convexo-concave portion is easy, and also the durability of the convexo-concave portion may be increased.

Also, the convex portion preferably includes a roundness, that is a curved surface, at a portion reaching from a top portion to a side portion of the convex portion that is a portion linking to the top portion.

Figure 11A:
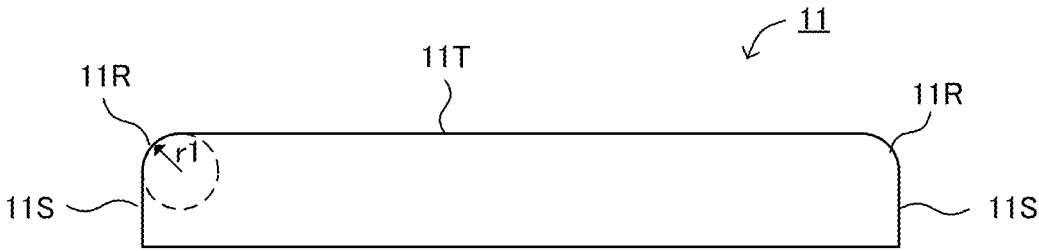
FIGS. 11A and 11B are schematic cross-sectional views illustrating an example of the convex portion of the convexo-concave portion of the drag reduction structure in the present disclosure.
Figure 11B:
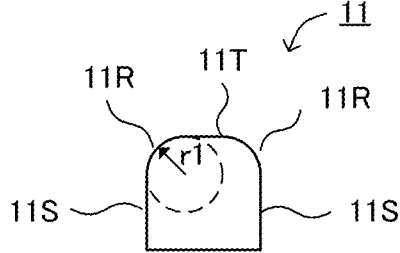

FIGS. 11A and 11B are schematic cross-sectional views illustrating an example of the convex portion of the drag reduction structure in the present disclosure.

Incidentally, FIG. 11A is a schematic cross-sectional view of the convex portion in the first direction, and FIG. 11B is a schematic cross-sectional view of the convex portion in the second direction.

As shown in FIG. 11A and FIG. 11B, the convex portion 11 includes a roundness at a portion reaching from a top portion 11T to a side portion 11S of the convex portion 11 that is a portion 11R linking to the top portion 11T. That is, the convex portion 11 includes a curved surface at the portion 11R. Thus, when the convex portion 11 includes a roundness at the portion 11R, the chafing resistance and abrasion resistance of the convex portion 11 may be improved. Also, the frictional resistance at the portion 11R on the boundary side of the convex portion 11 may be suppressed with respect to the vortex generated at the boundary between the first portion and the second portion. Therefore, it is expected that the effect of the vortex, that is, the effect of suppressing the flow separation from the surface will be further improved.

In the portion described above of the convex portion, the radius of curvature of the curved surface is preferably, for example, 10 μm or more, and more preferably 20 μm or more. Meanwhile, the radius of curvature of the curved surface is preferably, for example, 400 μm or less, and more preferably 200 μm or less. Also, the radius of curvature of the curved surface is preferably 10 μm or more and 400 μm or less, and more preferably 20 μm or more and 200 μm or less. When the radius of curvature of the curved surface is too small, it may be difficult to improve the chafing resistance and the abrasion resistance of the drag reduction structure. Also, when the radius of curvature of the curved surface is too large, the height of the convexo-concave portion is obliged to be made higher. When the height of the convexo-concave portion exceeds the appropriate size to reduce the drag, the drag reducing effect may be insufficient.

Here, the radius of curvature of the curved surface at the portion described above of the convex portion is the radius of curvature of the curve at the portion described above of the convex portion in the cross-section in the thickness direction of the drag reduction structure. For example, FIG. 11A is a cross-sectional view of the drag reduction structure in the thickness direction, and a cross-sectional view of the convex portion in the first direction. Also, for example, FIG. 11B is the cross-sectional view of the drag reduction structure in the thickness direction, and the cross-sectional view of the convex portion in the second direction. In FIG. 11A and FIG. 11B, the radius of curvature of the curved surface at the portion 11R described above of the convex portion 11 is the radius of curvature $r1$ of the curve at the portion 11R described above of the convex portion 11.

Also, in the convexo-concave portion, the number of the convex portion and the number of the concave portion are more than one, respectively, and are set appropriately so as to satisfy the dimensions of the convexo-concave portion, concave portion and convex portion described above. Specifically, the number of the convex portion and the number of the concave portion in the convexo-concave portion are 14 or more, may be 83 or more, and may be 181 or more, respectively. Meanwhile, the number of the convex portion and the number of the concave portion are, for example, 1500 or less, may be 714 or less and may be 200 or less, respectively. Also, the number of the convex portion and the number of the concave portion are, for example, 14 or more and 1500 or less, may be 83 or more and 714 or less, and may be 181 or more and 200 or less, respectively. Since the number of the convex portion and the number of the concave portion are in the above range respectively, the reduction of pressure resistance may be maximized, as well as the increase in frictional resistance may be minimized. This makes it possible to maximize the air resistance reducing effect.

Figure 12:
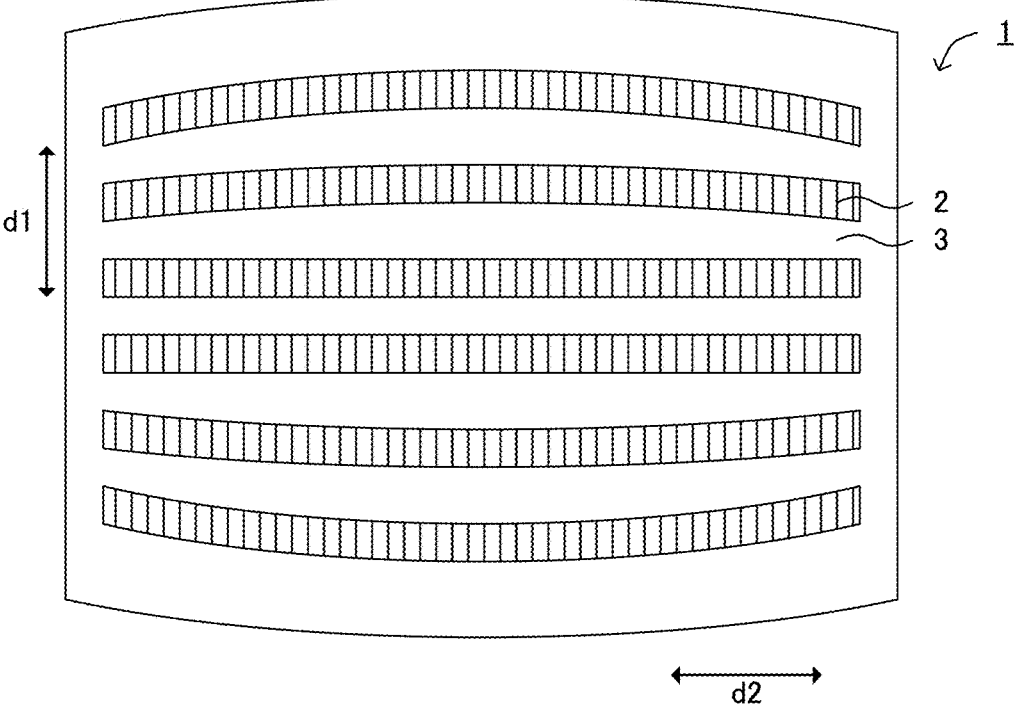
FIG. 12 is a schematic plan view illustrating an example of the drag reduction structure in the present disclosure.

The shape of the convexo-concave portion in a plan view is not particularly limited as long as it is a shape capable of generating a vortex near the boundary between the convexo-concave portion and the flat portion, and examples thereof may include a rectangular shape and an arc shape. For example, FIG. 1A is an example where the shape of the convexo-concave portion 2 in a plan view is a rectangular shape; and FIG. 12 is an example where the shape of the convexo-concave portion 2 in a plan view is a rectangular shape and an arc shape. Among them, the shape of the convexo-concave portion in a plan view is preferably a rectangular shape.

In the drag reduction structure in the present disclosure, a convexo-concave portion and a flat portion are placed. In the present disclosure, at least one convexo-concave portion and at least one flat portion may be placed. Among them, the convexo-concave portion and the flat portion are preferably placed alternately in the first direction.

When the convexo-concave portion and the flat portion are placed alternately in the first direction, for example, the convexo-concave portion and the flat portion may be placed alternately parallelly in the first direction, and may be placed alternately non-parallelly in the first direction. For example, FIG. 1A is an example where the convexo-concave portion 2 and the flat portion 3 are placed alternately parallelly in the first direction d1, and FIG. 12 is an example where the convexo-concave portion 2 and the flat portion 3 are placed alternately non-parallelly in the first direction d1. For example, when the drag reduction structure is applied to a three-dimensional curved surface of an object, the convexo-concave portion and the flat portion may be placed alternately non-parallelly in the first direction in some cases. Among them, the convexo-concave portion and the flat portion are preferably placed alternately parallelly in the first direction.

2. Flat Portion

In the present disclosure, the width of the flat portion in the first direction is 0.2 mm or more, and preferably 1 mm or more. Meanwhile, the width of the flat portion in the first direction is 50 mm or less, and preferably 25 mm or less. Also, the width of the flat portion in the first direction is 0.2 mm or more and 50 mm or less, and preferably 1 mm or more and 25 mm or less. Since the width of the flat portion in the first direction is in the above range, a large vortex V is generated near the boundary between the convexo-concave portion 2 and the flat portion 3 as shown in FIG. 4B for example so that the vortex V may be generated overall the boundary layer.

The width of the flat portion in the first direction is preferably the same as the thickness of the boundary layer. Also, as the gas flow velocity gets faster, the thickness of the boundary layer gets thinner. Therefore, as the gas flow velocity gets faster, the width of the flat portion in the first direction is preferably short in the above range.

Here, the width W2 of the flat portion 3 in the first direction d1 is, as shown in FIGS. 1A and 1B for example, a distance from one end portion to the other end portion of the flat portion 3 in the first direction d1, in the flat portion 3 positioned between the adjacent convexo-concave portions 2. Also, as shown in FIG. 1B, for example, when the surface of the drag reduction structure 1 is a flat surface, the width of the flat portion in the first direction is a width W2 of the flat portion 3, on the flat surface, in the first direction d1. Also, as shown in FIG. 5B, for example, when the surface of the drag reduction structure 1 is a curved surface, the width of the flat portion in the first direction is a width W2 of the flat portion 3, on the curved surface, in the first direction d1.

3. Method for Producing

In the drag reduction structure in the present disclosure, examples of a method for forming the convexo-concave portion may include a method wherein, using a curable resin composition such as an ionizing radiation curable resin composition such as an ultraviolet ray curable resin composition and an electron beam curable resin composition, or thermally curable resin composition, a substrate is coated with the curable resin composition in a predetermined pattern, and then cured; a so-called photopolymer method (2P method) wherein, using an ultraviolet ray curable resin composition, a substrate is coated with the ultraviolet ray curable resin composition, a mold is pressed to the coating film, the ultraviolet ray curable resin composition is cured by irradiating ultraviolet rays, and then removed from the mold; and a method wherein the surface of a substrate such as a thermoplastic resin film, a rubber sheet and a metal plate, is embossed. When a substrate is coated with a curable resin composition in a predetermined pattern, the method for applying the curable resin composition is not particularly limited as long as it is a method capable of applying in a desired pattern, and examples thereof may include an inkjet method and a screen printing method. Also, in a case of embossing, embossing may be carried out to one surface, and embossing may be carried out to the both surfaces.

Also, when the drag reduction structure in the present disclosure is applied to the surface of an object, for example, a film-shaped drag reduction structure may be placed on the surface of the object, and the drag reduction structure may be formed directly on the surface of the object.

4. Use Application

The drag reduction structure in the present disclosure is preferably placed and used so that the angle between the boundary line between the convexo-concave portion and the flat portion and the gas flow direction is, for example, $0°\pm15°$, that is, $-15°$ or more and $15°$ or less. In other words, the drag reduction structure in the present disclosure is preferably placed and used so that the angle between the second direction and the gas flow direction is, for example, $0°+15°$, that is, $-15°$ or more and $15°$ or less. Further, in other words, the drag reduction structure in the present disclosure is preferably placed and used so that the angle between the first direction and the gas flow direction is, for example, $90°+15°$, that is, $75°$ or more and $105°$ or less.

Among them, the drag reduction structure in the present disclosure is preferably placed and used in such a way that the boundary line between the convexo-concave portion 2 and flat portion 3 is approximately parallel to the flow direction $d_F$ of gas F, for example, as shown in FIG. 3A. In other words, as shown in FIG. 3A for example, the drag reduction structure in the present disclosure is preferably placed and used in such a way that second direction d2 is approximately parallel to the flow direction $d_F$ of gas F, that is, in such a way that the first direction d1 is approximately perpendicular. Thereby, the vortex may be easily generated near the boundary between the convexo-concave portion and the flat portion so that the flow separation may be suppressed.

Here, the boundary line between the convexo-concave portion and the flat portion being approximately parallel to the gas flow direction means that the angle between the boundary line between the convexo-concave portion and the flat portion and the gas flow direction is $0°+5°$, that is, $-5°$ or more and $5°$ or less. Also, the second direction being approximately parallel to the gas flow direction means that the angle between the second direction and the gas flow direction is $0°+5°$, that is, $-5°$ or more and $5°$ or less. Also, the first direction being approximately perpendicular to the gas flow direction means that the angle between the first direction and the gas flow direction is $90°+5°$, that is, $85°$ or more and $95°$ or less.

Therefore, the drag reduction structure in the present disclosure is preferably placed and used so that the angle between the second direction and the gas flow direction is, for example, $-15°$ or more and $15°$ or less, preferably $-10°$ or more and $10°$ or less, and particularly $-5°$ or more and $5°$ or less.

In other words, the drag reduction structure in the present disclosure is preferably placed and used so that the angle between the first direction and the gas flow direction is, for example, $75°$ or more and $105°$ or less, preferably $80°$ or more and $100°$ or less, and particularly $85°$ or more and $95°$ or less.

The drag reduction structure in the present disclosure may be applied to the surface of an object. Specifically, the drag reduction structure in the present disclosure may be applied to the surface of a housing or a part of a moving object moving through gas such as automobiles such as passenger cars, trucks, and buses; railroad vehicles such as trains, bullet trains, and locomotives; aircrafts such as airplanes, helicopters and drones; and bicycles. Also, the drag reduction structure in the present disclosure may be applied to, for example, the inner surface of pipes such as ducts and gas pipes; the surface of the vanes of windmills; and the surface of a vent or a louver of air-conditioning equipment such as air-conditioners. Among them, the drag reduction structure in the present disclosure is preferably applied to the surface of a housing or a part of a moving object, and preferably applied to the surface of a moving object that is a non-streamline formed object, specifically a bluff body. This is because pressure resistance, among drags, contributes significantly to the bluff body, and the effect of the present disclosure is noticeably exhibited. Examples of a moving object that is a bluff body may include a truck and a bus, preferably.

Also, when applying the drag reduction structure in the present disclosure to the surface of an object, the surface of the object may be flat surface, and may be a curved surface.

Also, although the drag reduction structure in the present disclosure may reduce the drag, the gas is not particularly limited. The density of a gas is preferably, for example, 0.08 kg/m$^3$ or more and 10 kg/m$^3$ or less. Among the above, the gas is preferably air.

5. Film-Shaped Drag Reduction Structure

When the drag reduction structure in the present disclosure is a film as described above, in the film-shaped drag reduction structure, the stretch of the first surface in the first direction is preferably less than the stretch of the first surface in the second direction. In other words, in the film-shaped drag reduction structure, the stretch of the first surface in the first direction is preferably less than the stretch of the first surface in any other direction.

When a film-shaped drag reduction structure has such physical property, the convexo-concave structure constituting the drag reduction structure may be suppressed from being damaged, even when the film is stretched in the second direction conforming along the surface of the object. Therefore, by applying the film-shaped drag reduction structure to the surface of an object, particularly the surface of an object including a curved surface, the drag may be reduced efficiently.

For example, as shown in FIGS. 1A to 1C and FIG. 2, when the convex portion 11 has an aspect extending in a straight line along the first direction d1, the stretch of the film-shaped drag reduction structure in the first direction d1 is preferably low. When the convex portion 11 is formed with material having no flexibility to the stretch, if the film-shaped drag reduction structure is stretched in the first direction d1, the convex portion 11 cannot withstand the stretch and may be collapsed or peeled off.

Meanwhile, for a direction that crosses the first direction d1, for example, for the second direction d2, since the concave portion 12 arranged between the plurality of convex portions 11 stretches even when the film-shaped drag reduction structure is stretched in the second direction d2, the convex portion 11 is less likely to be collapsed or peeled off, compared to a case wherein the film is stretched in the first direction d1.

Therefore, in the film-shaped drag reduction structure, the stretch of the first surface in the first direction is preferably less than the stretch of the first surface in the second direction.

Figure 13:
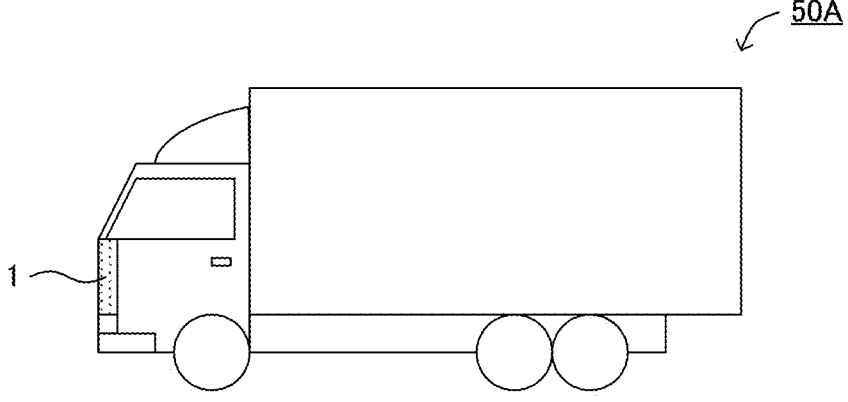
FIG. 13 is a schematic side view illustrating an application example of the drag reduction structure in the present disclosure.

Also, for example, many trucks, buses, trains and so on have a corner portion that leads from a planar front surface portion approximately perpendicular to the ground to a planar side surface portion similarly approximately perpendicular to the ground, and this corner portion usually has a small radius of curvature. In such a portion including the corner portion, air, which is gaseous, flows from the front surface portion to the side surface portion. Therefore, as described above, the film-shaped drag reduction structure is preferably adhered so that the second direction and the gas flow direction are approximately parallel. For example, a film-shaped drag reduction structure is adhered so that the second direction is the direction from the front surface portion to the side surface portion, along a curved surface with a small radius of curvature at the corner portion. For example, FIG. 13 shows an example where the film-shaped drag reduction structure 1 is applied to the portion described above of a truck 50A.

In this case, the film-shaped drag reduction structure may be stretched in the second direction along a curved surface with a small radius of curvature at the corner portion. Therefore, in view of making the adhesion easier, the film-shaped drag reduction structure preferably has a stretch to an extent in the second direction.

Meanwhile, in the above case, for the first direction, since a film-shaped drag reduction structure is not stretched in the first direction, a particularly large stretch is not required.

Therefore, when the film-shaped drag reduction structure is applied to the surface of an object with a curved surface, the drag may be reduced effectively by the stretch of the first surface in the first direction being less than the stretch of the first surface in the second direction.

Also, in the method for producing a film-shaped drag reduction structure, a cylindrical plate may be used to form the convexo-concave portion. For example, a cylindrical plate may be used for the photopolymer method or the embossing method described above. Using the cylindrical plate is preferable for mass production.

In particular, when the convex portion 11 has an aspect extending in a straight line along the first direction d1, as shown in FIGS. 1A to 1C and FIG. 2, the convex portion 11 is preferably formed using the cylindrical plate rotating along the first direction d1. By setting the direction of rotation of the cylindrical plate in the same direction as the longitudinal direction of the convex portion 11, that is, in the same direction as the first direction, the destruction of the convex portion 11, when the formed convex portion 11 is released from the cylindrical plate, may be suppressed. That is, the formation of defective convex portions 11 may be reduced.

Figure 14:
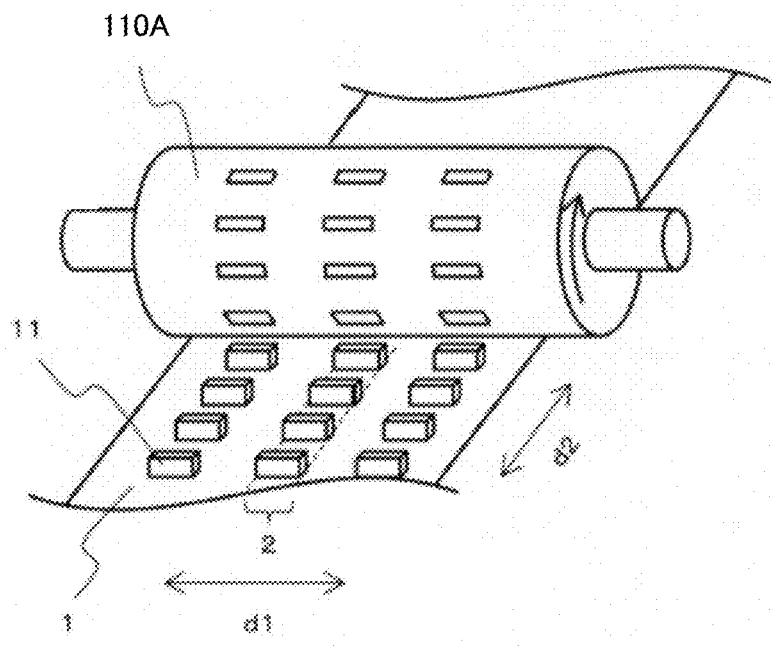
FIG. 14 is a schematic view illustrating an example of a method for producing a film-shaped drag reduction structure in the present disclosure.

For example, when the convex portion 11 having an aspect extending in a straight line along the first direction d1, as shown in FIG. 14, is formed using a cylindrical plate 110A rotating along the second direction d2, the direction in which the film flows due to the rotation of the cylindrical plate 110A (the second direction d2) differs from the longitudinal direction of the convex portion 11 (the first direction d1). Therefore, when the formed convex portion 11 is peeled off from the cylindrical plate 110A, the resistance applied from the cylindrical plate 110A is large. Therefore, the convex portion 11 may be destroyed by the cylindrical plate 110A. Incidentally, in the example shown in FIG. 14, the film-shaped drag reduction structure 1 has a long form along the second direction d2.

Figure 15:
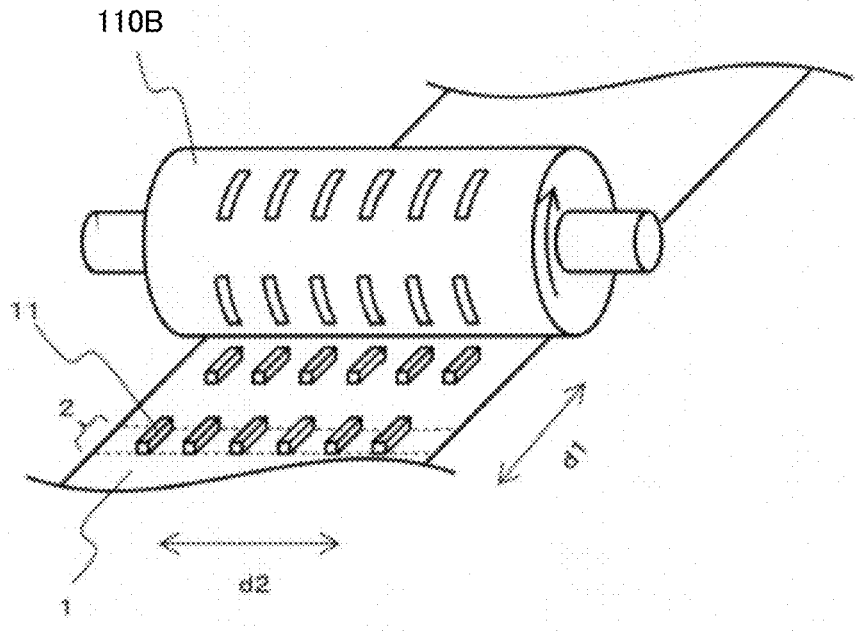
FIG. 15 is a schematic view illustrating another example of a method for producing a film-shaped drag reduction structure.

Meanwhile, when the convex portion 11 having an aspect extending in a straight line along the first direction d1, as shown in FIG. 15, is formed using a cylindrical plate 110B rotating along the first direction d1, the direction in which the film flows due to the rotation of the cylindrical plate 110B and the longitudinal direction of the convex portion 11 (the first direction d1) are the same. Therefore, when the formed convex portion 11 is peeled off from the cylindrical plate 110B, the resistance applied from the cylindrical plate 110B is small. Therefore, the convex portion 11 is suppressed from being destroyed by the cylindrical plate 110B. Incidentally, in the example shown in FIG. 15, the film-shaped drag reduction structure 1 has a long form along the first direction d1.

Therefore, the film-shaped drag reduction structure has a long form along the first direction, and the formation of defective convex portion may be suppressed by forming the convex portion using the cylindrical plate rotating along the first direction.

When the convex portion is formed using such the cylindrical plate rotating along the first direction, the film-shaped drag reduction structure has a long form along the first direction as described above. In general, for mass production of films, the film is preferably produced by a roll-to-roll production. For this reason, the film-shaped drag reduction structure is preferably wound up as a roll, during production and transportation. And the winding direction is preferably a direction coincided with the properties of the film-shaped drag reduction structure. As for the winding direction, the stretch in the winding direction of the film-shaped drag reduction structure is preferably small so that film-shaped drag reduction structure is not adversely affected even when a tensile force is applied.

Figure 16:
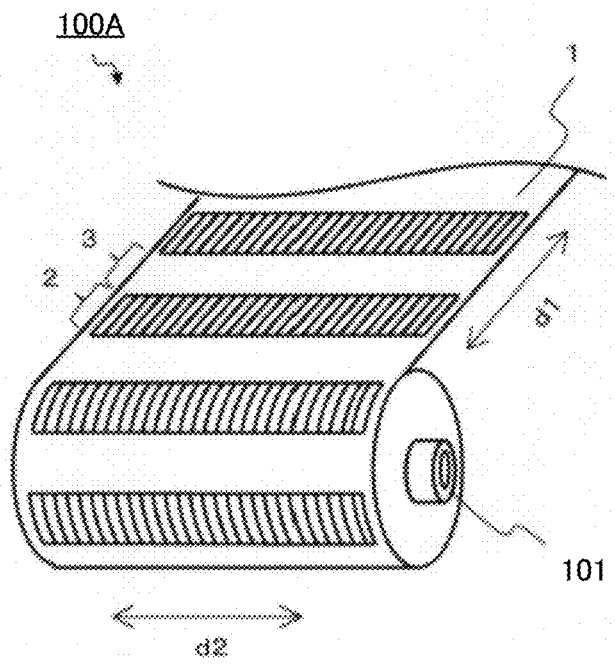
FIG. 16 is a schematic perspective view illustrating an example of the film-shaped drag reduction structure in the present disclosure.

For example, the roll body 100A shown in FIG. 16 is a roll body wherein a film-shaped drag reduction structure 1 is wound around the winding core 101. In the roll body 100A, the film-shaped drag reduction structure 1 is wound up along the first direction d1. In the film-shaped drag reduction structure, when the stretch of the first surface in the first direction d1 is less than the stretch of the first surface in the direction crossing the first direction d1, for example, the second direction d2, by winding the film-shaped drag reduction structure 1 up into a roll body 100A along the first direction d1, the film-shaped drag reduction structure 1 may be suppressed from being over stretched. Incidentally, in the example shown in FIG. 16, the film-shaped drag reduction structure 1 has a long form along the first direction d1.

Figure 17:
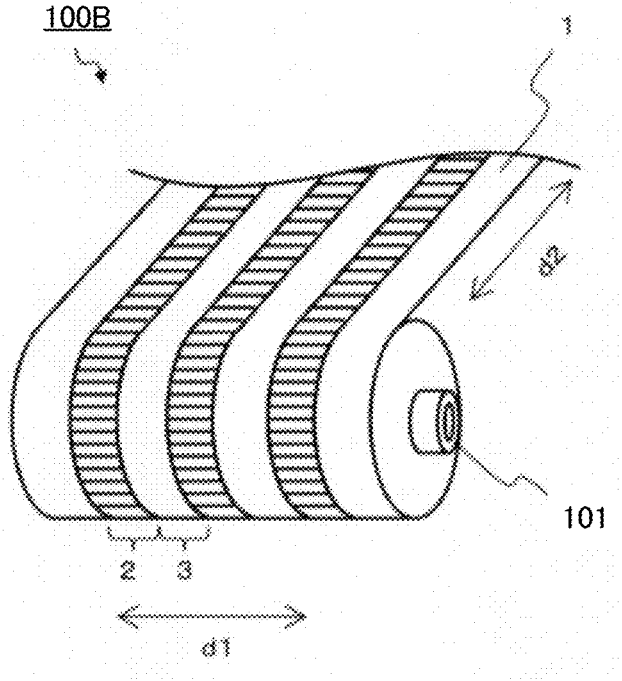
FIG. 17 is a schematic perspective view illustrating another example of the film-shaped drag reduction structure.

Meanwhile, the roll body 100B shown in FIG. 17 for example is a roll body wherein the film-shaped drag reduction structure 1 is wound up along the second direction d2. In the film-shaped drag reduction structure, when the stretch of the first surface in the first direction d1 is less than the stretch of the first surface in the direction crossing the first direction d1, for example, the second direction d2, if the film-shaped drag reduction structure 1 is wound up along the second direction d2, the film-shaped drag reduction structure 1 may be over stretched. Incidentally, in the example shown in FIG. 17, the film-shaped drag reduction structure 1 has a long form along the second direction d2.

Further, by the film-shaped drag reduction structure 1 being held in the form of the roll body 100B, that is, by the film-shaped drag reduction structure 1 being held in an over stretched condition in the second direction d2, the stretch, in the second direction d2, of the film-shaped drag reduction structure 1 unwound from the roll body 100B may already be reduced. And in the film-shaped drag reduction structure 1 wherein the stretch in the second direction d2 has been reduced, the effect when it is applied to a corner portion reaching from the front surface portion to the side surface portion of the truck, bus, train and so on described above, is reduced.

Therefore, when the film-shaped drag reduction structure is wound into a roll body, when the stretch of the first surface in the first direction is less than the stretch of the first surface in the second direction, by winding the film-shaped drag reduction structure along the first direction, the film-shaped drag reduction structure may be suppressed from being over stretched during winding.

Therefore, the film-shaped drag reduction structure preferably has a long form along the first direction, and the stretch of the first surface in the first direction is preferably less than the stretch of the first surface in the second direction. Thereby, the formation of defective convex portion, when the convex portion is formed using the cylindrical plate, may be reduced, as well as the film may be suppressed from being over stretched during winding.

Here, the "stretch" refers to the deformation amount when a tensile force is applied to the material. Specifically, when the original length is regarded as L, and the stretched deformation amount is regarded as $\Delta L$, this $\Delta L$ is referred to as "stretch".

For example, the comparison of the "stretch" of a film-shaped drag reduction structure in each direction may be obtained by carrying out a tensile test at the same tensile force and the same speed in each direction using a tensile tester, for example, and comparing the stretched deformation amount. In this comparison of the "stretch", it is not necessary to fracture the sample (film-shaped drag reduction structure), and it is sufficient to compare the deformation amount, due to the stretch, before fracture.

Also, the comparison of the "stretch" of the film-shaped drag reduction structure in each direction may be evaluated by tensile elastic modulus. The tensile elastic modulus is measured in accordance with JIS K7161-1:2014 (Plastics-methods for determining tensile properties—Part 1: General rules) and JIS K7127:1999 (Plastics—methods for testing tensile properties—Part 3: Measurement conditions for films and sheets). In this case, the tensile elastic modulus in each direction is measured by carrying out a tensile test for the sample (film-shaped drag reduction structure) in each direction using a tensile tester for example. The conditions for the tensile test and the details of the tensile test are described in the section of Examples below.

Incidentally, the tensile elastic modulus is the slope between two points of strain 0.05% and 0.25% in the stress/strain curve.

In order to obtain such a film-shaped drag reduction structure, also in the substrate, thermoplastic resin film, or resin substrate constituting the film-shaped drag reduction structure, the stretch in a specific direction is preferably less than the stretch in the direction of crossing the specific direction. Examples of such substrate, thermoplastic film and resin substrate may include an uniaxially oriented resin substrate. For example, in the uniaxially oriented resin substrate, the stretch in the oriented direction is less than the stretch in the direction crossing the oriented direction.

Also, although it depends on the material of the resin substrate, the stretch in the MD (Machine Direction) direction is usually less than the stretch in the TD (Transverse Direction) direction, in a production process, not only for the uniaxially oriented but also for the biaxially oriented. Examples of such resin substrate may include a biaxially oriented PET (polyethylene terephthalate) substrate. Therefore, even a biaxially oriented resin substrate may be used if it is a resin substrate wherein the stretch in one direction is less than the stretch in another direction crossing the direction, for example, if the stretch in the MD direction is less than the stretch in the TD direction.

6. Another Embodiment of Film-Shaped Drag Reduction Structure.

In another embodiment of the film-shaped drag reduction structure in the present disclosure, a first portion including a plurality of convex portions and concave portions, and a second portion are placed on a first surface; the first portion and the second portion extend in a second direction in a belt-shape; a stretch of the first surface in the first direction crossing the second portion is less than a stretch of the first surface in the second direction.

The effect of the stretch of the first surface in the first direction being less than the stretch of the first surface in the second direction is described in detail in the section "5. Film-shaped drag reduction structure" above so that descriptions herein are omitted.

In the film-shaped drag reduction structure in the present embodiment, the convexo-concave portion (first portion), flat portion (second portion), method for producing and use application are similar to the convexo-concave portion, flat portion, method for producing and use application of the drag reduction structure described above.

Also, in the film-shaped drag reduction structure in the present embodiment, the members constituting the film-shaped drag reduction structure, material and thickness of each member, and method for producing a film-shaped drag reduction structure are similar to the members constituting the convexo-concave resin film, material and thickness of each member, and method for producing a convexo-concave resin film of the moving object described below.

B. Resin Molded Product

The resin molded product in the present disclosure comprises a convexo-concave structure on its surface, wherein, in the convexo-concave structure, a first portion including a plurality of convex portions and concave portions, and a second portion are placed on a first surface; a height from a bottom portion of the concave portion to a top portion of the convex portion, of the first portion, is 10 μm or more and 1000 μm or less; a length of the convexo-concave portion in a second direction is 30 mm or more; and a width of the first portion and a width of the second portion, in a first direction crossing the second direction, is 0.2 mm or more and 50 mm or less.

Incidentally, in the section "B. Resin molded product" hereinafter, "first portion" is referred to as "convexo-concave portion" and "second portion" is referred to as "flat portion" in some cases.

Figure 18A:
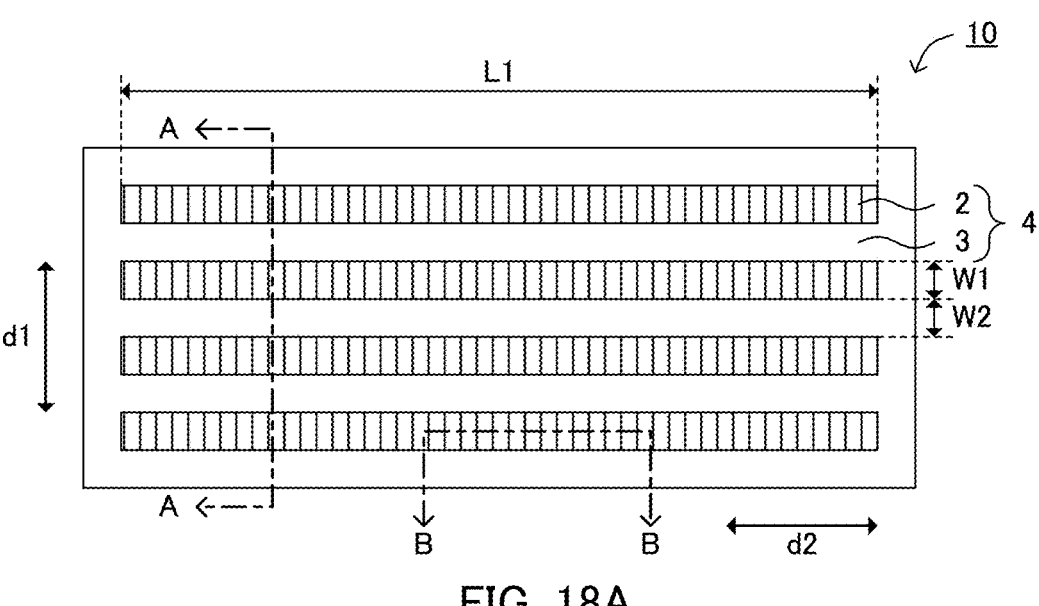
FIG. 18A is a schematic plan view and FIGS. 18B and 18C are schematic cross-sectional views illustrating an example of the resin molded product in the present disclosure.
Figure 18B:
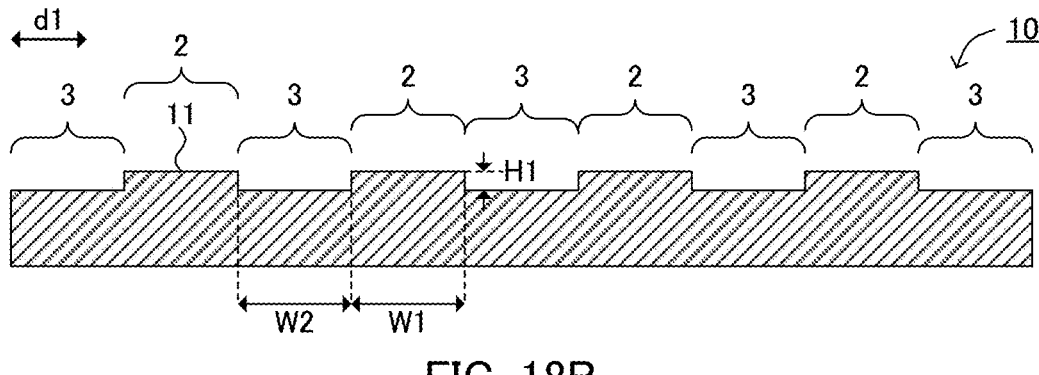
Figure 18C:
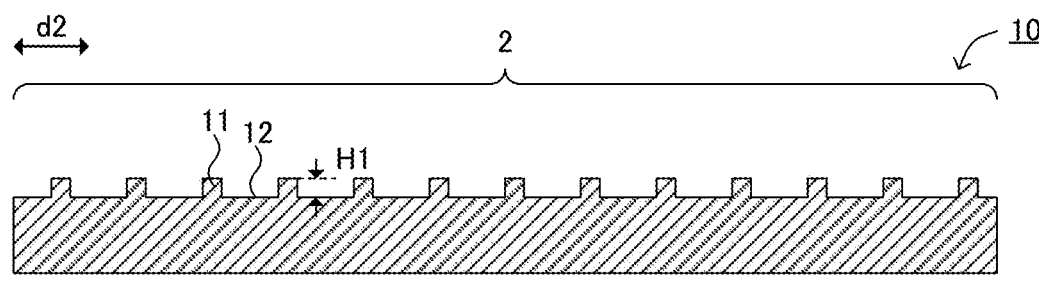
Figure 19:
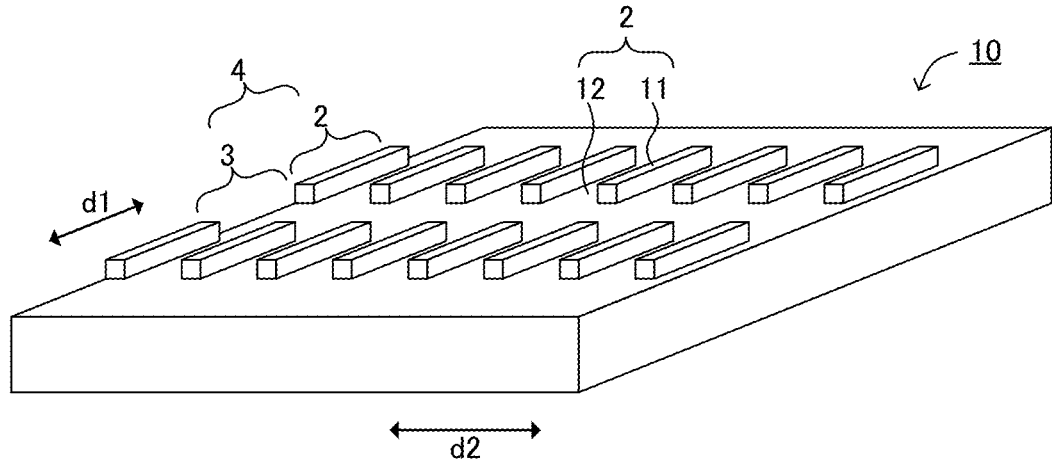
FIG. 19 is a schematic perspective view illustrating an example of the resin molded product in the present disclosure.

FIGS. 18A to 18C and FIG. 19 are schematic plan, cross-sectional and perspective views illustrating an example of the resin molded product in the present disclosure. FIG. 18B is a cross-sectional view of A-A line in FIG. 18A; FIG. 18C is a cross-sectional view of B-B line in FIG. 18A; and FIG. 19 is a perspective view of FIG. 18A. As shown in FIGS. 18A to 18C and FIG. 19, the resin molded product 10 includes a convexo-concave structure 4 on its surface, and in the convexo-concave structure 4, a convexo-concave portion 2 including a plurality of convex portions 11 and concave portions 12, and a flat portion 3 are placed alternately in a first direction d1. The height H1 of the convexo-concave portion 2 is in a predetermined range, the length L1 of the convexo-concave portion 2 in the second direction d2 perpendicular to the first direction d1 is a predetermined value or more, and the width W1 of the convexo-concave portion 2 and the width W2 of the flat portion 3 in the first direction d1 are in a predetermined range.

The resin molded product in the present disclosure has the same effect as the drag reduction structure described above. That is, in the resin molded product in the present disclosure, since the convexo-concave structure is included on its surface; the convexo-concave portion including a plurality of convex portions and concave portions, and a flat portion are placed in the convexo-concave structure; the length of the convexo-concave portion in the second direction is the predetermined value or more; the height of the convexo-concave portion is in the predetermined range; and the width of the convexo-concave portion and the width of the flat portion in the first direction crossing the second direction are in the predetermined range, the vortex may be efficiently generated near the boundary between the convexo-concave portion and the flat portion. Further, a vertical vortex whose axis is in the gas flow direction may be generated and enlarged near the boundary between the convexo-concave portion and the flat portion. Therefore, the flow separation from the surface of the drag reduction structure may be efficiently suppressed. Therefore, by using the resin molded product in the present disclosure, the pressure resistance, among the drags, may be reduced. By having the configuration described above, the margin for reducing pressure resistance may be increased more than the increase in frictional resistance due to the convexo-concave portion. Therefore, the drag may be reduced. As the result, energy saving and carbon dioxide emission reduction may be realized.

Each constitution of the resin molded product in the present disclosure is hereinafter described.

1. Convexo-Concave Structure

In the convexo-concave structure in the resin molded product in the present disclosure, a convexo-concave portion including a plurality of convex portions and concave portions, and a flat portion are placed.

The convexo-concave portion and flat portion are similar to the convexo-concave portion and flat portion of the drag reduction structure described above, respectively.

Also, the relationship between the first direction and the second direction is similar to the relationship between the first direction and the second direction in the drag reduction structure described above.

2. Composition of Resin Molded Product

Thermoplastic resins may be used as the material for the resin molded product, and for example, general-purpose plastics or engineering plastics may be appropriately selected and used. Among them, acrylic resin and polycarbonate are preferable in terms of weather resistance and scratch resistance.

Also, the resin molded product may include an additive such as ultraviolet ray absorbers, antioxidants, plasticizers, stabilizers, lubricants, fillers, colorants, processing aids, antistatic agents, and flame retardants, if necessary. When the resin molded product includes an ultraviolet ray absorber, the weather resistance may be improved.

The resin molded product may be transparent, and may be opaque.

The shape of the resin molded product may be any shape capable of molding, and the shape may be a variety of shapes, from simple to complex.

The thickness of the resin molded product may be any thickness capable of molding, and is preferably, for example, 0.35 mm or more and 100 mm or less, more preferably 0.40 mm or more and 75 mm or less, and further preferably 0.50 mm or more and 50 mm or less.

3. Method for Producing Resin Molded Product

The method for producing a resin molded product is not particularly limited as long as it is a shaping method capable of producing a resin molded product including a convexo-concave structure on its surface, and examples thereof may include an injection molding method and an extrusion molding method.

4. Use Application

In the resin molded product in the present disclosure, the relationship between the boundary line between the convexo-concave portion and flat portion and the gas flow direction, the relationship between the second direction and the gas flow direction, and the relationship between the first direction and the gas flow direction are respectively similar to the relationship between the boundary line between the convexo-concave portion and flat portion and the gas flow direction, the relationship between the second direction and the gas flow direction, and the relationship between the first direction and the gas flow direction in the drag reduction structure described above.

The resin molded product in the present disclosure may be applied to the surface of an object, or the resin molded product itself may be used as a part. Specifically, the resin molded product in the present disclosure may be applied to the surface of a housing or a part of a moving object, and may be used as a part of a moving object. The moving object is similar to the moving object described in the section of the use application of the drag reduction structure described above. Also, the resin molded product in the present disclosure may be applied to, for example, the inner surface of pipes such as ducts and gas pipes; the surface of the vanes of windmills; and the surface of a vent or a louver of air-conditioning equipment such as air-conditioners, and may be used as, for example, pipes such as ducts and gas pipes; and a vent or a louver of air-conditioning equipment such as air-conditioners. Among them, the resin molded product in the present disclosure is preferably applied to the surface of a housing or a part of a moving object, or used as a part of a moving object, and preferably applied to the surface of a moving object that is a non-streamline formed object, specifically a bluff body, or used as a part of a moving object that is a bluff body.

When applying the resin molded product in the present disclosure to the surface of an object, the surface of the object may be a flat surface, and may be a curved surface.

Examples of the method for placing a resin molded product on the surface of an object may include a method of adhering using a pressure-sensitive adhesive or an adhesive; a swaging process; and screwing.

Also, the gas is similar to the gas described in the section of the use application of the drag reduction structure described above.

C. Shaping Mold

The shaping mold in the present disclosure comprises a convexo-concave structure on its surface, wherein, in the convexo-concave structure, a first portion including a plurality of convex portions and concave portions, and a second portion are placed on a first surface; a height from a bottom portion of the concave portion to a top portion of the convex portion, of the first portion, is 10 μm or more and 1000 μm or less; a length of the first portion in a fourth direction is 30 mm or more; and a width of the first portion and a width of the second portion, in a third direction crossing the fourth direction, is 0.2 mm or more and 50 mm or less.

Incidentally, in the section "C. Shaping mold" hereinafter, "first portion" is referred to as "convexo-concave portion" and "second portion" is referred to as "flat portion" in some cases.

Figure 20A:
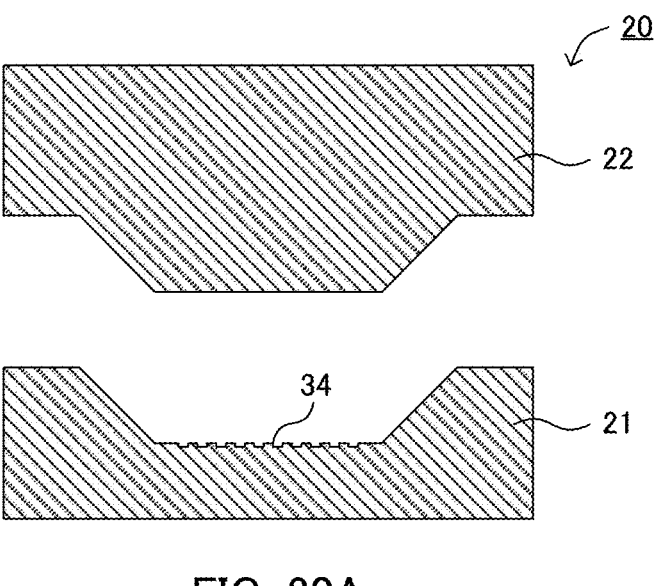
FIGS. 20A and 20B are schematic cross-sectional views illustrating an example of the shaping mold in the present disclosure.
Figure 20B:
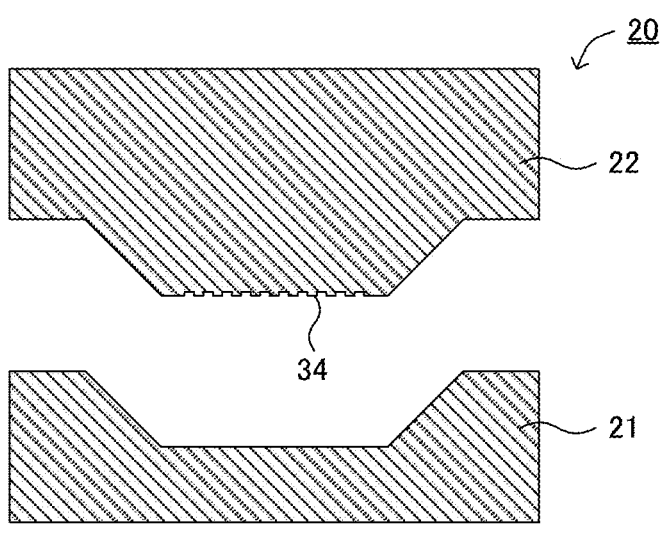

FIGS. 20A and 20B are schematic cross-sectional views illustrating an example of the shaping mold in the present disclosure, and is an example of a mold for injection molding. In FIGS. 20A and 20B, the mold for injection molding 20 has a cavity mold 21 and a core mold 22. In the case of the mold for injection molding 20, the cavity mold 21 may include a convexo-concave structure 34 on the surface as shown in FIG. 20A, and the core mold 22 may include a convexo-concave structure 34 on the surface, as shown in FIG. 20B.

Figure 22:
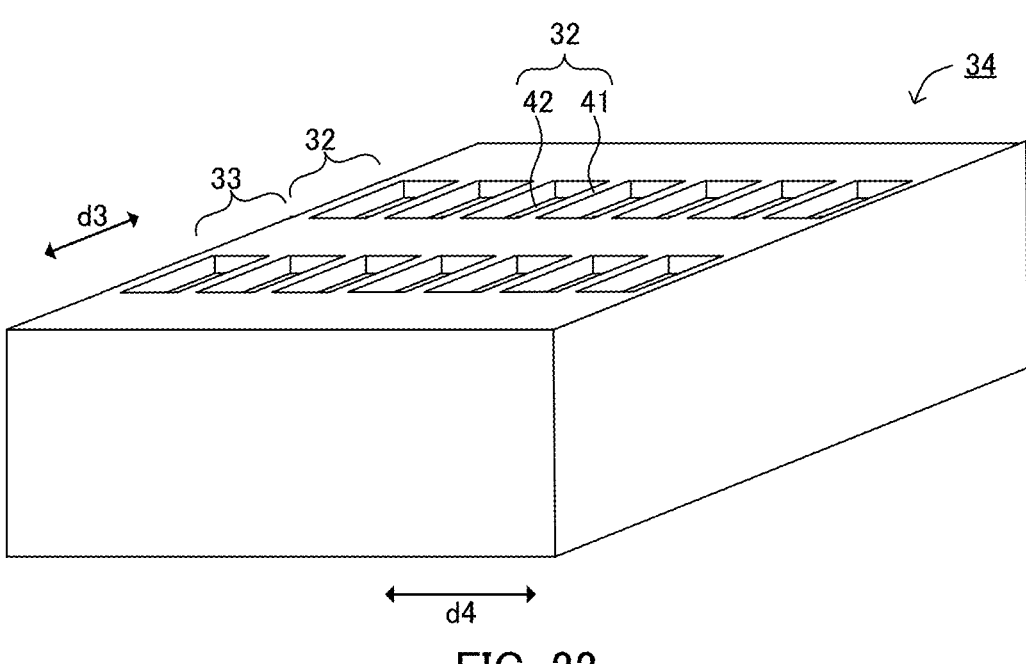
FIG. 22 is a schematic perspective view illustrating an example of the convexo-concave structure of the shaping mold in the present disclosure.

FIGS. 21A to 21C and FIG. 22 are schematic plan, cross-sectional and perspective views illustrating an example of the convexo-concave structure of the shaping mold in the present disclosure, FIG. 21B is a cross-sectional view of A-A line in FIG. 21A, FIG. 21C is a cross-sectional view of B-B line in FIG. 21A, and FIG. 22 is a perspective view of FIG. 21A. As shown in FIGS. 21A to 21C and FIG. 22, in the convexo-concave structure 34, a convexo-concave portion 32 including a plurality of convex portions 41 and concave portions 42, and a flat portion 33 are placed alternately in a third direction d3. The height H11 of the convexo-concave portion 32 is in a predetermined range, the length L11 of the convexo-concave portion 32 in the fourth direction d4 perpendicular to the third direction d3 is a predetermined value or more, and the width W11 of the convexo-concave portion 32 and the width W12 of the flat portion 33 in the third direction d3 are in a predetermined range.

By using the shaping mold in the present disclosure, the resin molded product described above may be produced, and a resin molded product, capable of suppressing the flow separation and reducing drag, may be obtained.

Each constitution of the shaping mold in the present disclosure is hereinafter described.

1. Convexo-Concave Structure

In the convexo-concave structure in the shaping mold in the present disclosure, a convexo-concave portion including a plurality of convex portions and concave portions, and a flat portion are placed.

(1) Convexo-Concave Portion

In the convexo-concave structure of the shaping mold in the present disclosure, the length of the convexo-concave portion in the fourth direction is similar to the length of the convexo-concave portion, in the second direction, in the convexo-concave structure of the resin molded product described above.

Here, the length L11 of the convexo-concave portion 32 in the fourth direction d4 is a distance from one end portion to the other end portion of the convexo-concave portion 32 in the fourth direction d4, for example, as shown in FIG. 21A. Specifically, as described below, when the convex portion projects with respect to the surface of the flat portion in the convexo-concave portion, the length of the convexo-concave portion in the fourth direction is a distance from an end portion of the convex portion positioned at one end to an end portion of the convex portion positioned at the other end, of the convexo-concave portion in the fourth direction. Meanwhile, as described below, in the convexo-concave portion, when the concave portion sags with respect to the surfaced of the flat portion, the length of the convexo-concave portion in the fourth direction is a distance from an end portion of the concave portion positioned at one end to an end portion of the concave portion positioned at the other end, of the convexo-concave portion in the fourth direction. Also, when the surface of the shaping mold is a flat surface, the length of the convexo-concave portion in the fourth direction is the length L11 of the convexo-concave portion 32, on the flat surface, in the fourth direction d4, for example, as shown in FIG. 21A. Also, when the surface of the shaping mold is a curved surface, the length of the convexo-concave portion in the fourth direction is the length of the convexo-concave portion, on the curved surface, in the fourth direction.

Also, in the convexo-concave structure of the shaping mold in the present disclosure, the height of the convexo-concave portion is similar to the height of the convexo-concave portion in the convexo-concave structure of the resin molded product described above.

Here, the height H11 of the convexo-concave portion 32 is a height from the bottom portion of the concave portion 42 to a top portion of the convex portion 41, of the convexo-concave portion 32, for example, as shown in FIG. 21C. Specifically, when the convex portion projects with respect to the surface of the flat portion in the convexo-concave portion, the height of the convexo-concave portion is a height from the bottom portion of the concave portion positioned between two adjacent convex portions to the top portion of the convex portion. Also, in the convexo-concave portion, when the concave portion sags with respect to the surfaced of the flat portion, the height of the convexo-concave portion is a height from the bottom portion of the concave portion to the top portion of the convex portion positioned between two adjacent concave portions.

Also, in the convexo-concave structure of the shaping mold in the present disclosure, the width of the convexo-concave portion in the third direction is similar to the width of the convexo-concave portion in the first direction in the convexo-concave structure of the resin molded product described above.

Here, the width W11 of the convexo-concave portion 32 in the third direction d3 is a distance from one end portion to the other end portion of the convexo-concave portion 32 in the third direction d3, for example, as shown in FIGS. 21A and 21B. Also, when the surface of the shaping mold is a flat surface, the width of the convexo-concave portion in the third direction is the width W11 of the convexo-concave portion 32, on the flat surface, in the third direction d3, for example, as shown in FIG. 21B. Also, when the surface of the shaping mold is a curved surface, the width of the convexo-concave portion in the third direction is the width of the convexo-concave portion, on the curved surface, in the third direction.

Figure 23:
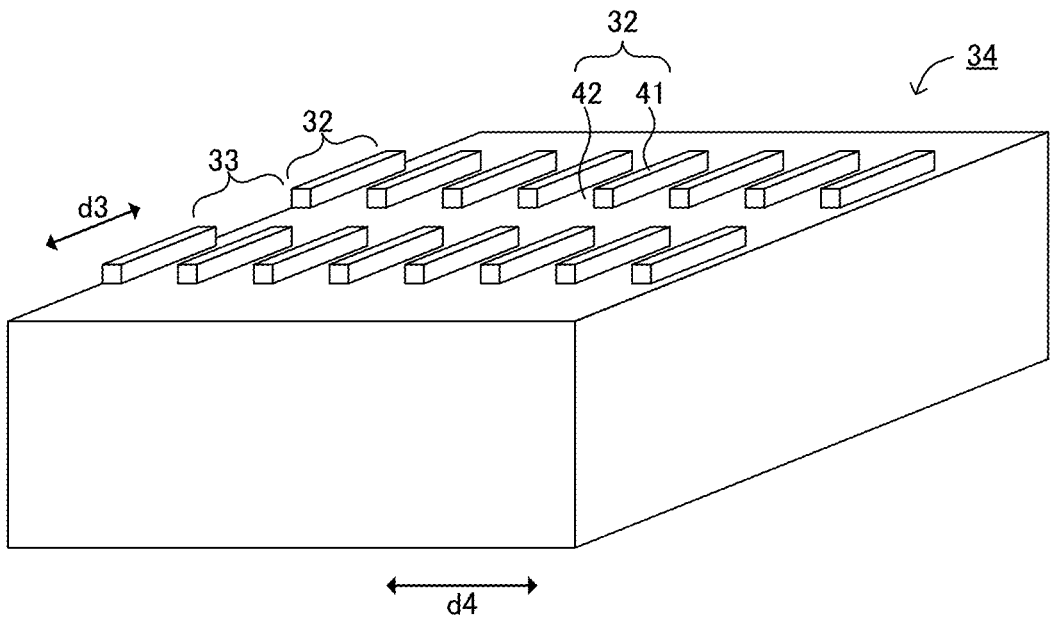
FIG. 23 is a schematic perspective view illustrating an example of the convexo-concave structure of the shaping mold in the present disclosure.

Also, in the convexo-concave portion, the convex portion may project with respect to the surface of the flat portion, and the concave portion may sag with respect to the surface of the flat portion. For example, FIG. 23 is an example where convex portion 41 of convexo-concave portion 32 projects with respect to the surface of the flat portion 33, and FIG. 22 is an example where the concave portion 42 of the convexo-concave portion 32 sags with respect to the surface of the flat portion 3.

Among them, the concave portion preferably sags with respect to the surface of the flat portion. By using such a shaping mold, a resin molded product wherein the convex portion projects with respect to the surface of the flat portion may be produced, and in the obtained resin molded product, the vortex may be easily generated near the boundary between the convexo-concave portion and the flat portion.

The convexo-concave portion includes a plurality of convex portions and concave portions. The arrangement of the convex portion and concave portion, the pattern shape of the convex portion and concave portion in a plan view are similar to the arrangement of the convex portion and concave portion, the pattern shape of the convex portion and concave portion in a plan view in the convexo-concave portion of the resin molded product described above.

Therefore, as shown in FIG. 22 for example, it is particularly preferable that the convexo-concave portion 32 includes a plurality of the convex portions 41 and the concave portions 42 extending in a straight line along the third direction d3, and the concave portion 42 sags with respect to the surface of the flat portion 33. In the resin molded product produced using such a shaping mold, the vortex may be efficiently generated near the boundary between the convexo-concave portion and the flat portion.

When the pattern shape, in a plan view, of the convex portion and the concave portion is a line-shaped pattern, the width of the line-shaped convex portion and the width of the line-shaped concave portion are similar to the width of the line-shaped convex portion and the width of the line-shaped concave portion in the convexo-concave structure of the resin molded product.

Also, when the pattern shape, in a plan view, of the convex portion and the concave portion is a line-shaped pattern, the pitch of the line-shaped concave portion is similar to the pitch of the line-shaped convex portion in the convexo-concave structure of the resin molded product.

Also, when the pattern shape, in a plan view, of the convex portion is a dot-shaped pattern, the size of the dot-shaped convex portion in a plan view is similar to the size of the dot-shaped concave portion, in a plan view, in the convexo-concave structure of the resin molded product.

Also, when the pattern shape, in a plan view, of the concave portion is a dot-shaped pattern, the size of the dot-shaped concave portion in a plan view is similar to the size of the dot-shaped convex portion, in a plan view, in the convexo-concave structure of the resin molded product.

Here, the size of the dot-shaped convex portion or concave portion in a plan view is, for example, the diameter when the shape of the convex portion or concave portion in a plan view is a circular shape; the major diameter when the shape of the convex portion or concave portion in a plan view is an oval shape; and the length of the diagonal line when the shape of the convex portion or concave portion in a plan view is a rectangular shape.

Also, when the pattern shape, in a plan view, of the convex portion or the concave portion is a dot-shaped pattern, the pitch of the dot-shaped convex portion or the concave portion is similar to the pitch of the dot-shaped convex portion or the concave portion in the convexo-concave structure of the resin molded product.

Here, the pitch of the dot-shaped convex portion or the concave portion is the distance between the adjacent convex portions or concave portions.

Also, when the pattern shape, in a plan view, of the convex portion is a grid-shaped pattern, the width of the grid-shaped convex portion is similar to the width of the grid-shaped concave portion in the convexo-concave structure of the resin molded product.

Also, when the pattern shape, in a plan view, of the convex portion is a grid-shaped pattern, the distance between the grid-shaped convex portions is similar to the distance between the grid-shaped concave portions in the convexo-concave structure of the resin molded product.

Also, when the pattern shape, in a plan view, of the concave portion is a grid-shaped pattern, the width of the grid-shaped concave portion is similar to the width of the grid-shaped convex portion in the convexo-concave structure of the resin molded product.

Also, when the pattern shape, in a plan view, of the concave portion is a grid-shaped pattern, the distance between the grid-shaped concave portions is similar to the distance between the grid-shaped convex portions in the convexo-concave structure of the resin molded product.

Also, when the pattern shape, in a plan view, of the convex portion or the concave portion is a grid-shaped pattern, the pitch of the grid-shaped convex portion or the concave portion is similar to the pitch of the grid-shaped convex portion or the concave portion in the convexo-concave structure of the resin molded product.

Incidentally the dimensions of the convexo-concave portion, concave portion and convex portion may be measured by observing the surface or the thickness direction cross-section of the shaping mold using a laser displacement sensor.

The cross-sectional shape of the convex portion and concave portion is similar to the cross-sectional shape of the convex portion and concave portion in the convexo-concave portion of the resin molded product described above.

Also, the concave portion preferably includes a roundness, that is a curved surface, at a portion reaching from a bottom portion to a side portion of the concave portion that is a portion linking to the bottom portion.

Figures 24A, 24B:
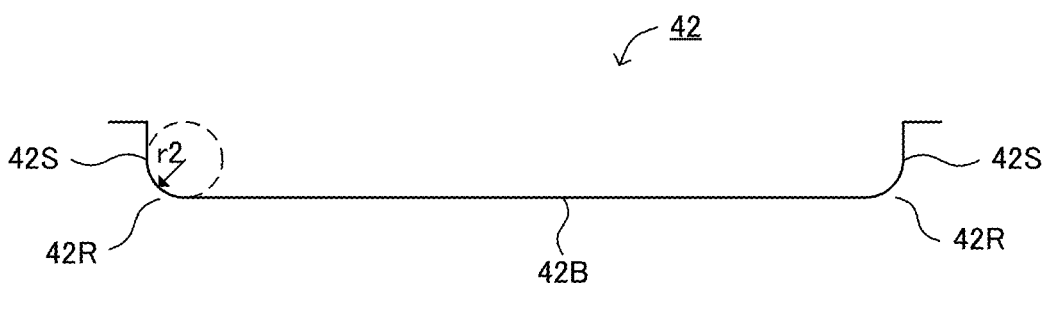
FIGS. 24A and 24B are schematic cross-sectional views illustrating an example of the concave portion of the convexo-concave portion of the shaping mold in the present disclosure.

FIGS. 24A and 24B are schematic cross-sectional views illustrating an example of the concave portion of the convexo-concave structure of the shaping mold in the present disclosure. Incidentally, FIG. 24A is a schematic cross-sectional view of the concave portion in the third direction, and FIG. 24B is a schematic cross-sectional view of the concave portion in the fourth direction.

As shown in FIG. 24A and FIG. 24B, the concave portion 42 includes a roundness at a portion reaching from a bottom portion 42B to a side portion 42S of the concave portion 42 that is a portion 42R linking to the bottom portion 42B. That is, the concave portion 42 includes a curved surface at the portion 42R. Thus, when the concave portion 42 includes a roundness at the portion 42R, the chafing resistance and abrasion resistance of the concave portion 42 may be improved. Also, when a resin molded product is produced using such a shaping mold, the convex portion may be formed so that the convex portion 11 includes a roundness at the portion 11R, as shown in FIG. 11A and FIG. 11B. Thus, the chafing resistance and abrasion resistance of the convex portion 11 may be improved in the resin molded product. Further, in the resin molded product, the frictional resistance at the portion 11R on the boundary side of the convex portion 11 may be suppressed with respect to the vortex generated at the boundary between the first portion and the second portion. Therefore, it is expected that the effect of the vortex, that is, the effect of suppressing the flow separation from the surface will be further improved.

In the portion described above of the concave portion, the radius of curvature of the curved surface is preferably, for example, 10 μm or more, and more preferably 20 μm or more. Meanwhile, the radius of curvature of the curved surface is preferably, for example, 400 μm or less, and more preferably 200 μm or less. Also, the radius of curvature of the curved surface is preferably 10 μm or more and 400 μm or less, and more preferably 20 μm or more and 200 μm or less. When the radius of curvature of the curved surface is too small, it may be difficult to improve the chafing resistance and the abrasion resistance of the shaping mold. Also, it may be difficult to improve the chafing resistance and the abrasion resistance of the resin molded product produced using the shaping mold. Meanwhile, when the radius of curvature of the curved surface is too large, the height of the convexo-concave portion is obliged to be made higher. When the height of the convexo-concave portion exceeds the appropriate size to reduce the drag, the effect of reducing the drag, of the resin molded product produced using the shaping mold, may be insufficient.

Here, the radius of curvature of the curved surface at the portion described above of the concave portion is the radius of curvature of the curve at the portion described above of the concave portion in the cross-section in the thickness direction of the drag reduction structure. For example, FIG. 24A is a cross-sectional view of the shaping mold in the thickness direction, and a cross-sectional view of the concave portion in the third direction. Also, for example, FIG. 24B is the cross-sectional view of the shaping mold in the thickness direction, and the cross-sectional view of the concave portion in the furth direction. In FIG. 24A and FIG. 24B, the radius of curvature of the curved surface at the portion 42R described above of the concave portion 42 is the radius of curvature r2 of the curve at the portion 42R described above of the concave portion 42.

Also, in the convexo-concave portion, the number of the convex portions and the number of the concave portions may be more than one, respectively. The number of the convex portion and the number of the concave portion are respectively similar to the number of the convex portion and the number of the concave portion in the drag reduction structure described above.

The shape, in a plan view, of the convexo-concave portion is similar to the shape, in a plan view, of the convexo-concave portion in the convexo-concave structure of the resin molded product.

In the convexo-concave structure of the shaping mold in the present disclosure, the arrangement of the convexo-concave portion and flat portion is similar to the arrangement of the convexo-concave portion and flat portion in the convexo-concave structure of the resin molded product described above.

(2) Flat Portion

In the convexo-concave structure of the shaping mold in the present disclosure, the width of the flat portion in the third direction is similar to the width of the flat portion in the first direction in the convexo-concave structure of the resin molded product described above.

Here, the width W12 of the flat portion 33 in the third direction d3 is, as shown in FIGS. 21A and 21B for example, a distance from one end portion to the other end portion of the flat portion 33 in the third direction d3, in the flat portion 33 positioned between the adjacent convexo-concave portions 32. Also, when the surface of the shaping mold is a flat surface, the width of the flat portion in the third direction is the width W12 of the flat portion 33, on the flat surface, in the third direction d3, for example, as shown in FIG. 21B. Also, when the surface of the shaping mold is a curved surface, the width of the flat portion in the third direction is the width of the flat portion, on the curved surface, in the third direction.

2. Constitution of Shaping Mold

The shaping mold in the present disclosure is not particularly limited as long as it is a shaping mold capable of shaping a convexo-concave structure, and examples thereof may include a mold such as a mold for injection molding and a mold for extrusion molding (die); and shaping rolls.

The mold for injection molding may include, for example, a cavity mold and a core mold. In the mold for injection molding, the cavity mold may include a convexo-concave structure on the surface, and the core mold may include a convexo-concave structure on the surface. Among them, in practice, it is preferable that the cavity mold includes a convexo-concave structure on the surface. This is because, when the resin molded product produced using a mold for injection molding is used, it is placed so that the surface of the resin molded product in contact with the cavity mold is a contact surface with air, in many cases.

Examples of the mold for extrusion molding (die) may include a T die, a straight die, a cross-head die, a flat die, a die for a solid, a die for a film, a die for a pipe and a die for a coating.

Examples of the shaping roll may include an embossing roll. Also, the shaping roll may be a cooling roll, for example, used for an extrusion molding.

The material for the shaping mold is appropriately selected according to the type and so on of the shaping mold, and for example, metal materials such as steel; resin materials; ceramic materials; and rubber materials may be used.

3. Method for Producing Shaping Mold

The method for producing a shaping mold is not particularly limited as long as it is a method for producing capable of producing a shaping mold including a convexo-concave structure on its surface. For example, when the shaping mold is a metal mold, examples of the method may include a method wherein, after producing a metal mold according to a general method, a convexo-concave structure is formed on the surface of the metal mold. The method for forming a convexo-concave structure on the surface of a metal mold may include a stamping (embossing), a laser processing, an end milling, and a lithography method. Also, a mold including a convexo-concave structure on its surface may be produced by shaping with a metal 3D printer.

4. Use Application

The shaping mold in the present disclosure may be used, for example, for the production of the resin molded product described above; for shaping a convexo-concave shape to a resin film, a metal sheet and so on. Among them, the shaping mold in the present disclosure is preferably used for the production of the resin molded product described above.

D. Moving Object

The moving object in the present disclosure comprises a drag reduction structure on its surface, wherein, in the drag reduction structure, a first portion including a plurality of convex portions and concave portions, and a second portion are placed on a first surface; a height from a bottom portion of the concave portion to a top portion of the convex portion, of the first portion, is 10 µm or more and 1000 µm or less; a length of the first portion in a traveling direction of the moving object is 30 mm or more; and a width of the first portion and a width of the second portion, in a direction crossing the traveling direction of the moving object, is 0.2 mm or more and 50 mm or less.

Incidentally, in the section "D. Moving object" hereinafter, "first portion" is referred to as "convexo-concave portion" and "second portion" is referred to as "flat portion" in some cases.

Figure 25A:
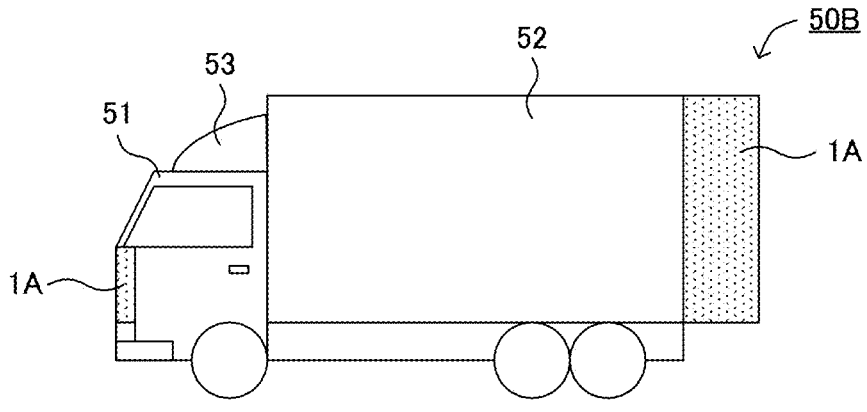
FIG. 25A is a schematic side view and FIG. 25B is a schematic front view illustrating an example of the moving object in the present disclosure.
Figure 25B:
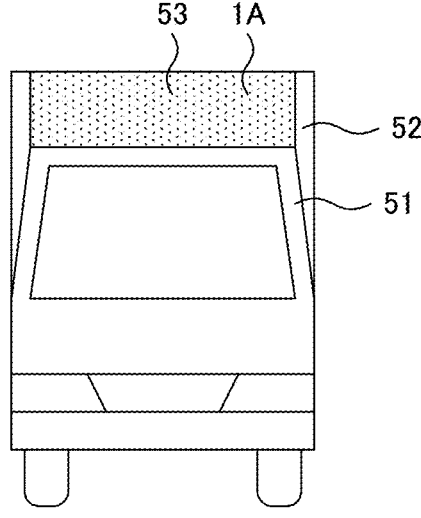

FIGS. 25A and 25B are respectively a schematic side view and a schematic front view illustrating an example of the moving object in the present disclosure, and are examples where the moving object is a truck. As shown in FIGS. 25A and 25B, track 50B as a moving object includes a drag reduction structure 1A on its surface, and specifically, the drag reduction structures 1A are placed on the surface of the front side of cabin 51, on the rear side of cargo bed 52, and on the air deflector 53 placed above the cabin 51.

Incidentally, the arrangement of the drag reduction structure in a moving object is not limited thereto.

Figure 26A:
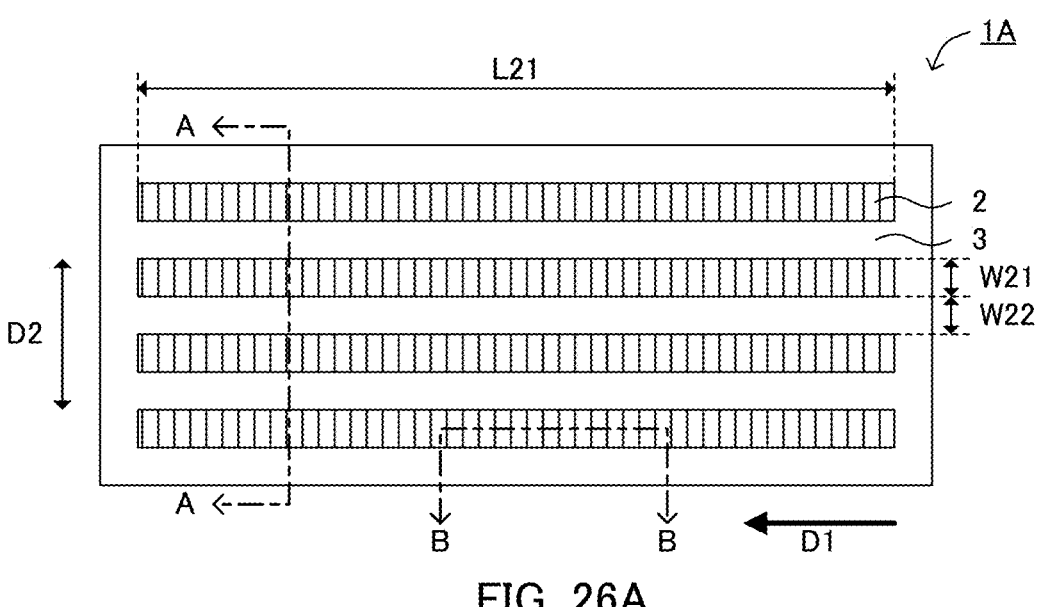
FIG. 26A is a schematic plan view and FIGS. 26B and 26C are schematic cross-sectional views illustrating an example of the drag reduction structure in the moving object in the present disclosure.
Figure 26B:
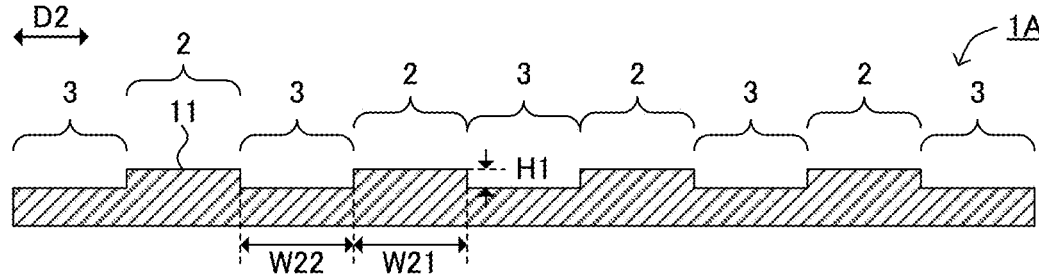
Figure 26C:
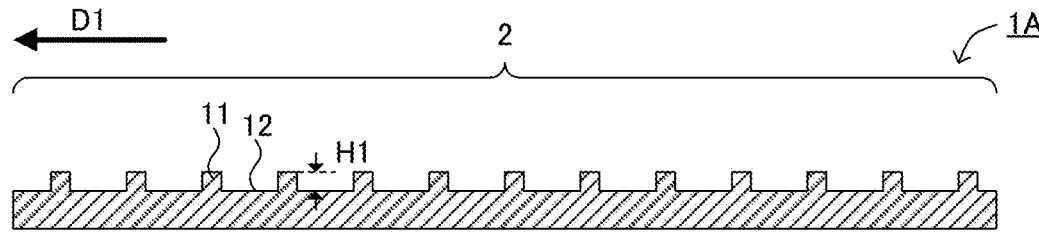
Figure 27:
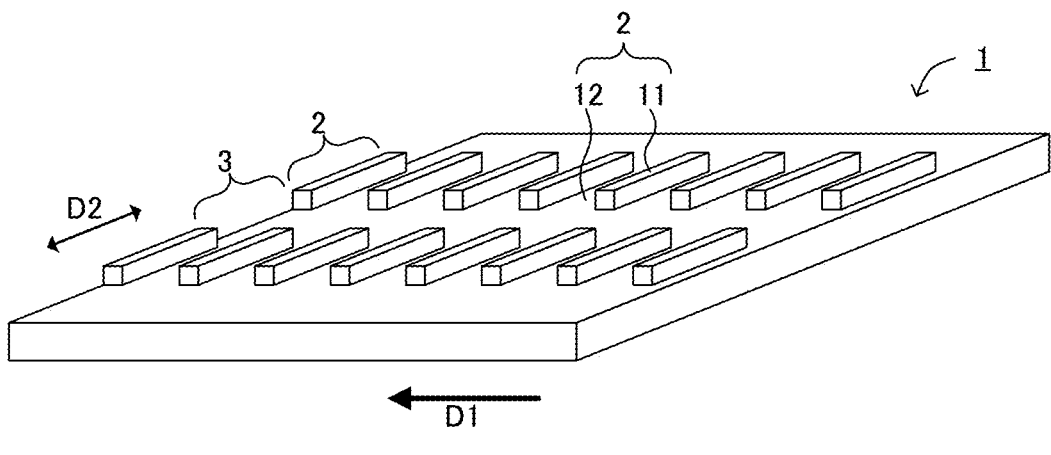
FIG. 27 is a schematic perspective view illustrating an example of the drag reduction structure of the moving object in the present disclosure.

FIGS. 26A to 26C and FIG. 27 are schematic plan, cross-sectional and perspective views illustrating an example of the drag reduction structure in the present disclosure, FIG. 26B is a cross-sectional view of A-A line in FIG. 26A, 26C is a cross-sectional view of B-B line in FIG. 26A, and FIG. 27 is a perspective view of FIG. 26A. As shown in FIGS. 26A to 26C and FIG. 27, in the drag reduction structure 1A, a convexo-concave portion 2 including a plurality of convex portions 11 and concave portions 12, and a flat portion 3 are placed alternately in the direction D2 perpendicular to the traveling direction D1 of the moving object. The height H1 of the convexo-concave portion 2 is in a predetermined range, the length L1 of the convexo-concave portion 2 in the traveling direction D1 of the moving object is a predetermined value or more, and the width W1 of the convexo-concave portion 2 in the direction D2 perpendicular to the traveling direction D1 of the moving object and the width W2 of the flat portion 3 are in a predetermined range.

Figure 28A:
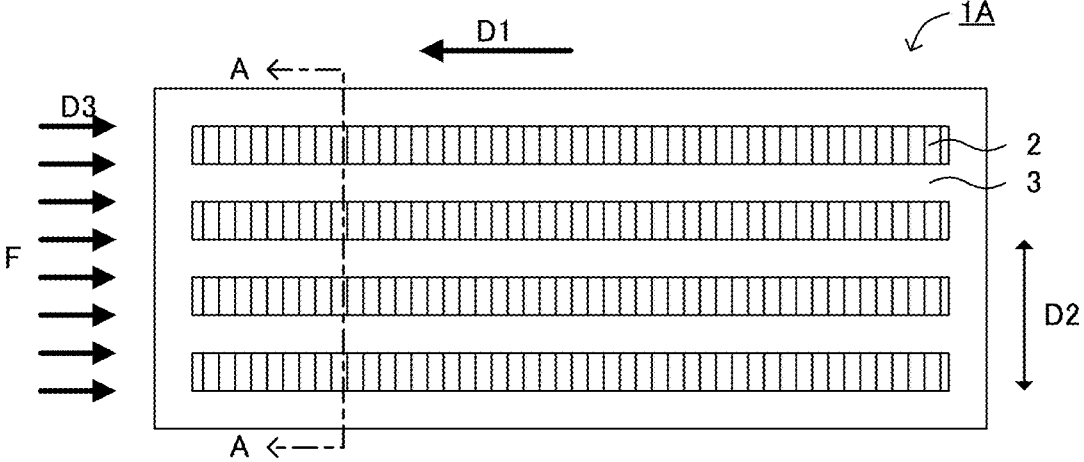
FIGS. 28A and 28B are schematic views illustrating an example of the gas flow in the drag reduction structure of the moving object in the present disclosure.
Figure 28B:
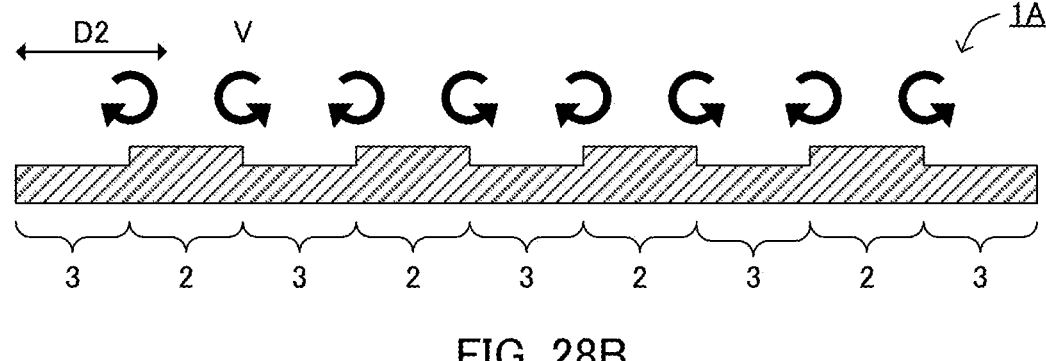

FIGS. 28A and 28B are schematic views illustrating an example of the gas flow in the drag reduction structure of the moving object in the present disclosure, and FIG. 28B is a cross-sectional view of A-A line in FIG. 28A. As shown in FIG. 28A, when the moving object moves in the traveling direction D1, gas F flows on the surface of the drag reduction structure 1A of the moving object in the direction of arrow D3. Then, ss shown in FIG. 28B, a secondary flow, that is vortex V, is generated near the boundary, between the convexo-concave portion 2 and the flat portion 3, parallel to the flow direction D3 of gas F.

Since the moving object in the present disclosure includes the drag reduction structure, it has the same effect as the drag reduction structure described above. That is, in the drag reduction structure of the moving object in the present disclosure, since the convexo-concave portion including a plurality of convex portions and concave portions, and a flat portion are placed; the length of the convexo-concave portion in the traveling direction of the moving object is the predetermined value or more; the height of the convexo-concave portion is in the predetermined range; and the width of the convexo-concave portion and the width of the flat portion in the direction crossing the traveling direction of the moving object are in the predetermined range, the vortex may be efficiently generated near the boundary between the convexo-concave portion and the flat portion. Further, a vertical vortex whose axis is in the gas flow direction may be generated and enlarged near the boundary between the convexo-concave portion and the flat portion. Therefore, the flow separation from the surface of the drag reduction structure may be efficiently suppressed. Therefore, in the moving object in the present disclosure, the pressure resistance, among the drags, may be reduced. By having the configuration described above, the margin for reducing pressure resistance may be increased more than the increase in frictional resistance due to the convexo-concave portion. Therefore, the drag may be reduced. As the result, fuel consumption improvement and carbon dioxide emission reduction may be realized.

Here, the traveling direction of the moving object refers to the direction in which the gas moves along the surface of the moving object as the moving object progresses. For example, when the moving object is a car, railway vehicle, bicycle, and so on, it can move forward, move backward, make a right turn, or make a left turn; the traveling direction of the moving object in this case refers to the direction in which the moving object travels forward. Also, for example, when the moving object is an aircraft, the traveling direction of the moving object refers to the direction in which the moving object travels during flight.

Each constitution of the moving object in the present disclosure is hereinafter described.

1. Drag Reduction Structure

In the drag reduction structure in the present disclosure, a convexo-concave portion including a plurality of convex portions and concave portions, and a flat portion are placed.

(1) Convexo-Concave Portion

The convexo-concave portion is similar to the convexo-concave portion of the drag reduction structure described above. Incidentally, the second direction in the drag reduction structure described above is read as the traveling direction of the moving object in the present disclosure. Also, the first direction in the drag reduction structure described above is read as the direction crossing the traveling direction of the moving object in the present disclosure.

(2) Flat Portion

The flat portion is similar to the flat portion of the drag reduction structure described above. Incidentally, the second direction in the drag reduction structure described above is read as the traveling direction of the moving object in the present disclosure. Also, the first direction in the drag reduction structure described above is read as the direction crossing the traveling direction of the moving object in the present disclosure.

(3) Constitution of Drag Reduction Structure

The moving object in the present disclosure have only to include the drag reduction structure on its surface, and for example, the drag reduction structure may be configured separately from the moving object, and alternatively, it may be configured as one with the moving object.

Hereinafter, the respective following cases are described separately; a case where the drag reduction structure is configured separately from the moving object, and a case where the drag reduction structure is configured as one with the moving object.

(a) Case where Drag Reduction Structure is Configured Separately from Moving Object When the drag reduction structure is configured separately from the moving object, for example, a member including the drag reduction structure on its surface may be used, and the member may be placed on the surface of the moving object.

Examples of the member including the drag reduction structure on its surface may include a resin member including the drag reduction structure on its surface; a metal member including the drag reduction structure on its surface; and a ceramic member including the drag reduction structure on its surface.

As described below, when the resin member is a resin film, and when the metal member is a metal sheet, these members are usually adhered on the surface of the moving object. In this case, the moving object will be a moving object including the drag reduction structure adhered thereon.

Also, as described below, when the resin member is a resin molded product, when the metal member is a metal part, and when the ceramic member is a ceramic molded product, these members are usually adhered, or they are mechanically joined by swaging, screwing, and so on, to the surface of the moving object. In these cases, the moving object will be a moving object provided with the drag reduction structure.

(i) Resin Member

Examples of the resin member including the drag reduction structure on its surface may include a resin film including the drag reduction structure on its surface; and a resin molded product including the drag reduction structure on its surface.

(i-1) Resin Film

The resin film includes the drag reduction structure on its surface.

(i-1-1) Convexo-Concave Resin Film

The resin film may include at least a convexo-concave resin film including the drag reduction structure on its surface.

Figures 29A, 29B, 29C, 29D, 29E, 29F:
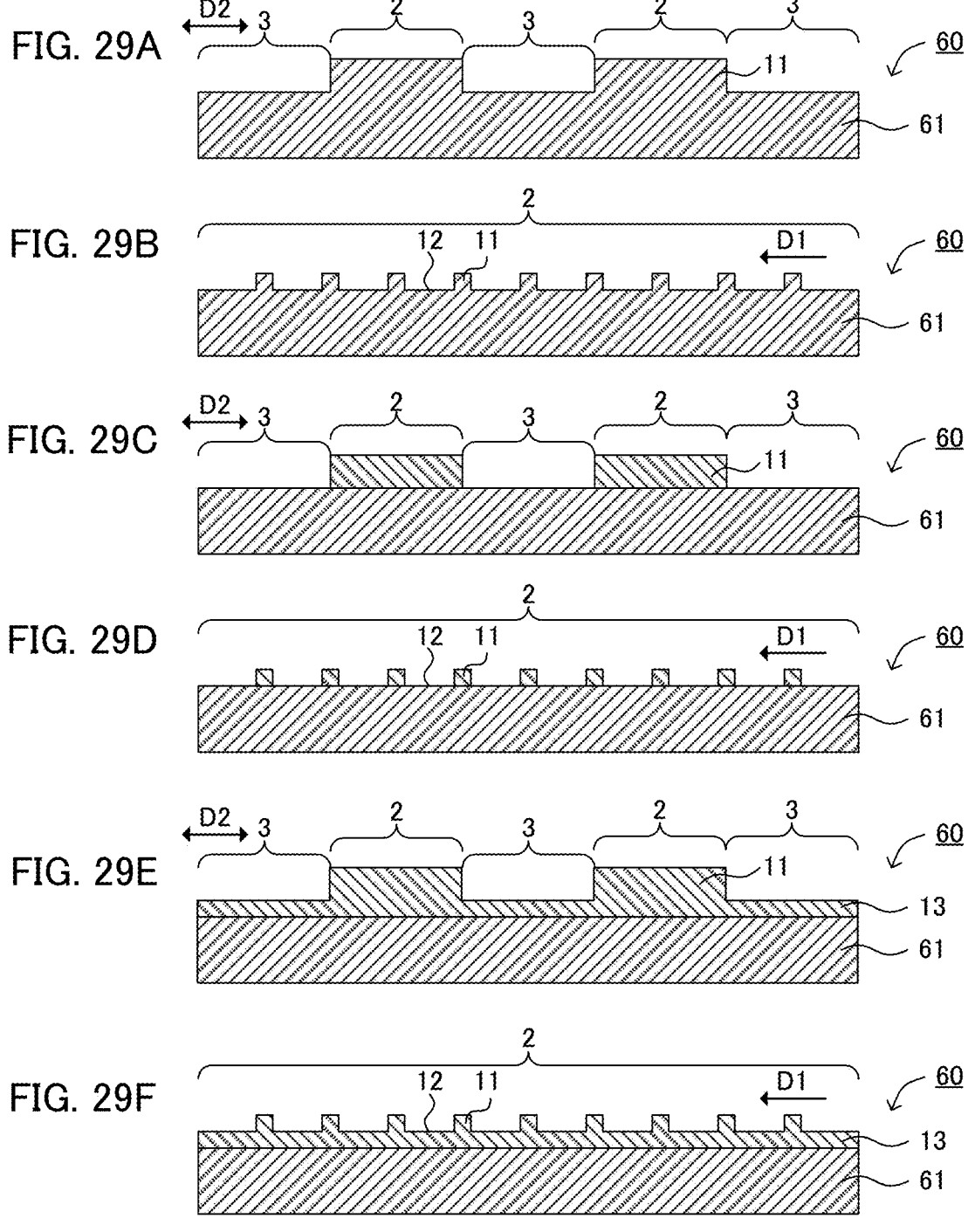
FIGS. 29A to 29F are schematic cross-sectional views illustrating an example of the convexo-concave resin film including the drag reduction structure of the moving object in the present disclosure.

The convexo-concave resin film may include at least a resin substrate. The convexo-concave resin film have only to include the drag reduction structure on its surface, and for example, in a convexo-concave resin film 60, as shown in FIGS. 29A to 29B, the convexo-concave portion 2 may be configured as one with the resin substrate 61, and the convexo-concave portion 2 may be configured separately from the resin substrate 61, as shown in FIGS. 29C to 29F. Also, when the convexo-concave portion is configured separately from the resin substrate, for example, the bottom portion of the concave portion 12 of the convexo-concave portion 2 and the flat portion 3 may be the surface of the resin substrate 61 as shown in FIGS. 29C to 29D; and a resin layer 13 may be placed on one surface of the resin substrate 61, and resin layer 13 may include the convexo-concave portion 2 and the flat portion 3 as shown in FIGS. 29E to 29F.

The convexo-concave portion may be transparent, and may be opaque.

As the material of the convexo-concave portion, resin may be used. When the convexo-concave portion is configured as one with the resin substrate, the material of the convexo-concave portion is similar to the material of the resin substrate described below. Also, when the convexo-concave portion is configured separately from the resin substrate, examples of the material of the convexo-concave portion may include a cured product of a curable resin composition such as an ionizing radiation curable resin composition such as an ultraviolet ray curable resin composition and an electron beam curable resin composition, or thermally curable resin composition; and thermoplastic resins.

Also, the convexo-concave portion may include an additive such as ultraviolet ray absorbers, antioxidants, plasticizers, stabilizers, lubricants, fillers, colorants, processing aids, antistatic agents, and flame retardants, if necessary. When the convexo-concave portion includes an ultraviolet ray absorber, the weather resistance may be improved.

Examples of the method for forming the convexo-concave portion may be a method wherein the convexo-concave portion is formed on a resin substrate; and may be a method wherein a convexo-concave shape is shaped on one surface of a resin substrate.

Examples of a method for forming the convexo-concave portion on a resin substrate may include a method wherein, using a curable resin composition, a resin substrate is coated with a curable resin composition in a predetermined pattern, and then cured; a so-called photopolymer method (2P method) wherein, using an ultraviolet ray curable resin composition, a resin substrate is coated with an ultraviolet ray curable resin composition, a mold is pressed to the coating film, the ultraviolet ray curable resin composition is cured by irradiating ultraviolet rays, and then removed from the mold; a so-called lithography method wherein, using an ionizing radiation curable resin composition, a resin substrate is coated with the ionizing radiation curable resin composition, irradiated with ionizing radiation such as ultraviolet rays and electron beams in a pattern, and developed; and a method wherein a resin layer is formed on a resin substrate, and the surface of the resin layer is embossed. Also, a resin layer with an embossed surface may be produced separately, and the resin layer may be laminated on a resin substrate.

In the case of a method wherein, a resin substrate is coated with a curable resin composition in a predetermined pattern, and then cured, the method for applying the curable resin composition is not particularly limited as long as it is a method capable of applying in a desired pattern, and examples thereof may include an inkjet method and the screen printing method. Also, in the case of the 2P method or the lithography method, the method for applying the curable resin composition is not particularly limited as long as it is a method capable of applying uniformly, and known application methods may be applied.

Also, in the case of the embossing method, the material of the resin layer is not particularly limited as long as it is a material capable of embossing, and thermoplastic resins may be used. In this case, the thickness of the resin layer is not particularly limited as long as it is thicker than the height of the convexo-concave portion, and it is appropriately selected according to the use application and so on. For example, when the resin film is used as a wrapping film or marking film for a moving object such as automobiles, trains and airplanes, the thickness of the resin layer is approximately 30 μm or more and 300 μm or less.

Also, examples the method wherein a convexo-concave shape is shaped on one surface of a resin substrate may include an embossing such as a single-sided embossing and a double-sided embossing; and a laser processing.

When the resin substrate is configured as one with the convexo-concave portion, for example, thermoplastic resin may be used as the material of the resin substrate, and it may be selected from general-purpose plastics and engineering plastics, and used as appropriate. Among them, vinyl chloride resins are preferable in terms of weather resistance and scratch resistance.

Also, the resin substrate may include an additive such as plasticizers, stabilizers, lubricants, fillers, colorants, processing aids, ultraviolet ray absorbers, antioxidants, antistatic agents, and flame retardants, if necessary. When the resin substrate is configures as one with the convexo-concave portion, if the resin substrate includes an ultraviolet ray absorber, the weather resistance may be improved.

The resin substrate may be transparent, and may be opaque.

The thickness of the resin substrate is not particularly limited, and it is appropriately selected according to the use application and so on. For example, when the resin film is used as a wrapping film or a marking film for a moving object such as automobiles, trains and airplanes, the thickness of the resin substrate is approximately 80 μm or more and 350 μm or less.

Also, in the convexo-concave resin film, the stretch in the direction crossing the traveling direction of the moving object is preferably less than the stretch in the traveling direction of the moving object. In other words, in the convexo-concave resin film, the stretch in the direction crossing the traveling direction of the moving object is preferably less than the stretch in any other direction. The effect of the stretch in the direction crossing the traveling direction of the moving object being less than the stretch in the traveling direction of the moving object is similar to the effect of the stretch in the first direction being less than the stretch in the second direction when the drag reduction structure described above is a film, and thus, the explanations are omitted herein.

The stretch in the direction crossing the traveling direction of the moving object and the stretch in the traveling direction of the moving object are respectively similar to the stretch in the first direction and the stretch in the second direction, when the drag reduction structure described above is a film.

(i-1-2) Another Constitution of Resin Film

The resin film may further include other constitutions, besides the convexo-concave resin film.

(Adhesive Layer)

Figure 30A:
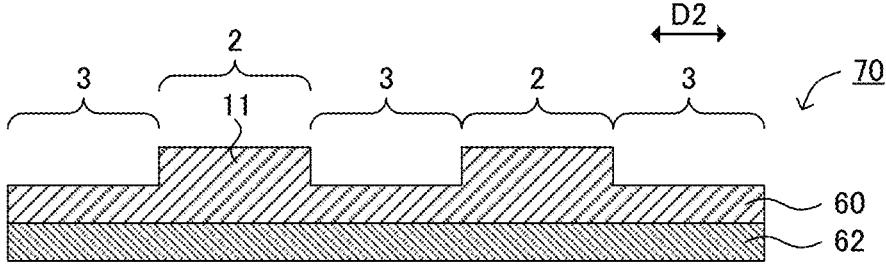
FIGS. 30A and 30B are schematic cross-sectional views illustrating an example of the convexo-concave resin film including the drag reduction structure of the moving object in the present disclosure.

For example, as shown in FIG. 30A, the resin film 70 may include an adhesive layer 62 on the convexo-concave resin film 60, on an opposite side surface to the convexo-concave portion 2. The adhesive layer is a layer configured to adhere a resin film to the surface of the moving object. By the resin film including an adhesive layer, the resin film may be easily adhered to the surface of the moving object.

The adhesive used for the adhesive layer is appropriately selected according to the use application of the resin film, and examples thereof may include acrylic based adhesives, urethane based adhesives, silicone based adhesives, rubber based adhesives, and vinyl ether based adhesives.

Also, the adhesive layer may or may not have a removability, and among them, it is preferable to have a peeling property. When the adhesive layer has a removability, it may be re-applied when the resin film is adhered to the surface of the moving object, or when the resin film is replaced or removed, the resin film may be peeled off from the moving object without causing glue residue.

Incidentally, "removability" refers to the property capable of being peeled off easily without destroying the moving object and without leaving any adhesive on the surface of the moving object after the resin film is adhered to the surface of the moving object.

Also, the adhesive layer may include a colorant. When the adhesive layer includes a colorant, a shielding property may be imparted. For example, when a design is applied to the surface of a moving object, when the adhesive layer includes a colorant, and the resin film further includes a printing layer as described below, the design may be covered by adhering the resin film on the surface of the moving object, and a new design may be applied.

The thickness of the adhesive layer is not particularly limited, and it is appropriately selected according to the use application and so on. For example, when the resin film is used as a wrapping film or a marking film for a moving object such as automobiles, trains and airplanes, the thickness of the adhesive layer is approximately 5 μm or more and 50 μm or less. When the thickness of the adhesive layer is too thin, the adhesiveness to the moving object may be insufficient.

Examples of a method for forming an adhesive layer may include a method wherein an adhesive composition is applied; and a method wherein an adhesive film is adhered.

(Printing Layer)

The resin film may include a printing layer on the convexo-concave resin film, on the opposite side surface to the convexo-concave portion. When the resin film includes a printing layer, a design may be imparted.

The printing layer may show information such as letters, numbers, symbols, pictorial patterns, patterns, and marks.

Figure 30B:
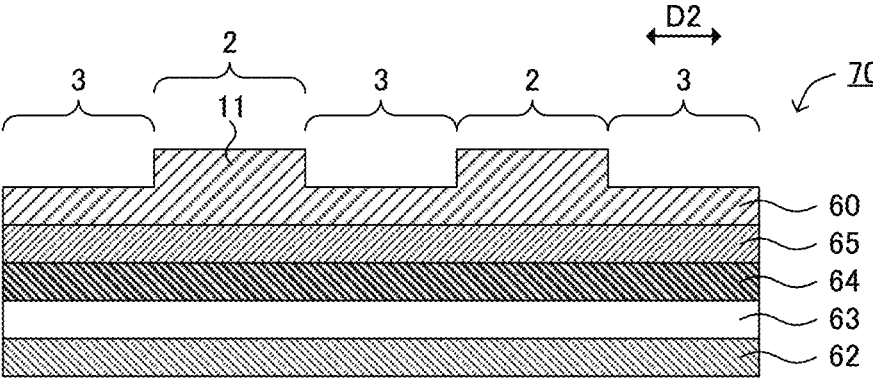

Also, as a method for forming a printing layer, for example, the printing layer may be formed by directly printing on the resin substrate of a convexo-concave resin film; or as shown in FIG. 30B for example, printing layer 64 may be formed by printing on the supporting layer 63. The printing layer may be placed in a pattern on a resin substrate or a supporting layer, and may be placed over the entire surface of a resin substrate or a supporting layer. Also, the printing method is not particularly limited.

The supporting layer is not particularly limited as long as it is capable of applying a print thereon, and for example, a resin substrate may be used.

Also, the supporting layer may include a colorant. When the supporting layer includes a colorant, a shielding property may be imparted. For example, when a design is applied to the surface of a moving object, when the resin film includes a printing layer, and the supporting layer includes a colorant, the design may be covered by adhering the resin film on the surface of the moving object, and a new design may be applied.

The thickness of the supporting layer is not particularly limited, and it is appropriately selected according to the use application and so on.

Also, when the printing layer is formed on the supporting layer by printing thereon, for example, a printing sheet including a supporting layer 63 and a printing layer 64 placed on one surface of the supporting layer 63 may be formed separately and this printing sheet may be adhered to a convexo-concave resin film 60 via a second adhesive layer 65, as shown in FIG. 30B; or a printing layer, a resin substrate, and a resin layer may be formed on the supporting layer in sequence.

(Protection Layer)

The resin film may include a protection layer on the convexo-concave portion side surface of the convexo-concave resin film. The protection layer may protect the convexo-concave portion, and improve the scratch resistance.

When a protection layer is placed on the convexo-concave portion side surface of the convexo-concave resin film, the dimensions of the convexo-concave on the protection layer side surface of the resin film preferably satisfy the dimensions of the convexo-concave structure of the convexo-concave resin film described above.

As the material of the protection layer, for example, a resin may be used. Among them, electron beam curable resins and fluorine resins are preferable in terms of weather resistance and scratch resistance.

Also, the protection layer may include an additive such as ultraviolet ray absorbers, antioxidants, plasticizers, stabilizers, lubricants, fillers, colorants, processing aids, antistatic agents, and flame retardants, if necessary. When the protection layer includes an ultraviolet ray absorber, the weather resistance may be improved.

The thickness of the protection layer is preferably, for example, 0.01 μm or more and 10 μm or less.

(i-1-3) Method for Placing Resin Film

Examples of the method for placing a resin film on the surface of a moving object may include a method of adhering using a pressure-sensitive adhesive or an adhesive.

(i-2) Resin Molded Product

The resin molded product includes the drag reduction structure on its surface.

Thermoplastic resins may be used as the material for the resin molded product, and for example, general-purpose plastics or engineering plastics may be appropriately selected and used. Among them, acrylic resin and polycarbonate are preferable in terms of weather resistance and scratch resistance.

The method for producing a resin molded product is not particularly limited as long as it is a method capable of producing a resin molded product including a drag reduction structure on its surface, and examples thereof may include an injection molding method and an extrusion molding method.

Examples of the method for placing a resin molded product on the surface of a moving object may include a method of adhering using a pressure-sensitive adhesive or an adhesive; a swaging process; and screwing.

(ii) Metal Member

Examples of the metal member including the drag reduction structure on its surface may include a metal sheet including the drag reduction structure on its surface; and a metal part including the drag reduction structure on its surface.

(ii-1) Metal Sheet

The metal sheet may include at least a metal layer including the drag reduction structure on its surface.

The material of the metal layer is not particularly limited as long as it is a material capable of obtaining a metal layer including a drag reduction structure on its surface, and examples thereof may include aluminum, aluminum alloy, titanium, titanium alloy, copper, iron, and stainless steel.

Examples of the method for forming a convexo-concave portion on the surface of a metal layer may include a stamping (embossing), a rolling, an end milling, a laser processing, and a lithography method.

The thickness of the metal layer is not particularly limited, and it is appropriately selected according to the use application and so on.

(ii-1-2) Another Constitution of Metal Sheet

The metal sheet may further include other constitutions, besides the metal layer.

(Adhesive Layer)

The metal sheet may include an adhesive layer on the metal layer, on the opposite side surface to the convexo-concave portion. The adhesive layer is a layer configured to adhere a metal sheet to the surface of the moving object. By the metal sheet including an adhesive layer, the metal sheet may be easily adhered to the surface of the moving object.

The adhesive layer is similar to the adhesive layer used for the resin film described above.

(ii-1-3) Method for Placing Metal Sheet

Examples of the method for placing a metal sheet on the surface of a moving object may include a method of adhering using a pressure-sensitive adhesive or an adhesive.

(ii-2) Metal Part

The metal part includes a drag reduction structure on its surface.

The material of the metal part is not particularly limited as long as it is a material capable of obtaining a metal part including a drag reduction structure on its surface, and examples thereof may include aluminum, aluminum alloy, titanium, titanium alloy, copper, iron, and stainless steel.

Examples of the method for forming a convexo-concave portion on the surface of a metal part may include a stamping (embossing), an end milling, a laser processing, and a shaping with a metal 3D printer.

Examples of the method for placing a metal part on the surface of a moving object may include a welding method; a method of adhering using a pressure-sensitive adhesive or an adhesive; a swaging process; and screwing.

(iii) Ceramic Member

Examples of the ceramic member including the drag reduction structure on its surface may include a ceramic molded product including the drag reduction structure on its surface.

As the material of the ceramic molded product, for example, fine ceramics may be used.

The method for producing a ceramic molded product is not particularly limited as long as it is a method capable of producing a ceramic molded product including a drag reduction structure on its surface, and examples thereof may include an injection molding method and an extrusion molding method.

Examples of the method for placing a ceramic molded product on the surface of a moving object may include a method of adhering using a pressure-sensitive adhesive or an adhesive; a swaging process; and screwing.

(b) Case where Drag Reduction Structure is Configured as One with Moving Object

When the drag reduction structure is configured as one with the moving object, the drag reduction structure is formed directly on the surface of the moving object. When the drag reduction structure is formed directly on the surface of the moving object, for example, a drag reduction structure may be formed directly on the surface of a body or a part of automobiles, railway vehicles bicycles, aircraft and so on.

The material constituting the drag reduction structure is appropriately selected according to the body or the part on which the drag reduction structure is formed, and examples thereof may include metal materials such as metal and metal alloy; resin materials such as resins and fiber-reinforced resins; and ceramics such as glass and fine ceramics.

The method to form a drag reduction structure directly on the surface of the moving object is appropriately selected according to the material and so on.

For example, in the case of metal material, examples thereof may include an end milling, a laser processing, and a shaping with a metal 3D printer. Also, in the case of metal material, the following method may be used: firstly, using the convexo-concave resin film described above as an original plate, the convexo-concave structure side surface of the convexo-concave resin film (original plate) is coated with a water-soluble resin composition; after drying solidification, the coating film is peeled off from the convexo-concave resin film (original plate) to produce a stamper formed of a water-soluble resin film; and then, the surface of a moving object is coated with a surface coating agent; a water-soluble resin film (stamper) is pressed to the coating film; and after the surface coating agent is cured, the water-soluble resin film (stamper) is dissolved and removed with water. In this case, as the surface coating agent, for example, a commonly used paint used for painting automobiles, railway vehicles, aircraft, bicycles and so on may be used. Also, in the case of metal material, the following method may also be used: the surface of a moving object is coated with an ultraviolet ray curable paint; a stamper is pressed against the coating film; after irradiating ultraviolet rays to the ultraviolet ray curable paint to cure thereof, the stamper is peeled off to shape the convexo-concave shape. For this method, the stamper may be any stamper which transmits ultraviolet rays, and for example, a resin stamper may be used.

Also, in the case of resin material, examples thereof may include an embossing such as a single-sided embossing and a double-sided embossing; and a laser processing. Also, for example, in the case of ceramic material, a laser processing may be used.

(4) Arrangement of Drag Reduction Structure

In the moving object in the present disclosure, the drag reduction structure is preferably placed and used so that the angle between the boundary line between the convexo-concave portion and the flat portion and the traveling direction of a moving object, that is, the gas flow direction is, for example, $0°±15°$, that is, $-15°$ or more and $15°$ or less.

Among them, in the moving object in the present disclosure, the drag reduction structure is preferably placed and used in such a way that the boundary line between the convexo-concave portion 2 and flat portion 3 is approximately parallel to the traveling direction D1 of a moving object, that is, the flow direction D3 of gas F, for example, as shown in FIG. 28A. Thereby, the vortex may be easily generated near the boundary between the convexo-concave portion and the flat portion so that the flow separation may be suppressed.

Here, the boundary line between the convexo-concave portion and the flat portion being approximately parallel to the traveling direction of a moving object, that is, the gas flow direction means that the angle between the boundary line between the convexo-concave portion and the flat portion and the traveling direction of a moving object, that is, the gas flow direction is $0°±5°$, that is, $-5°$ or more and $5°$ or less.

Therefore, in the moving object in the present disclosure, the drag reduction structure is preferably placed and used so that the angle between the boundary line between the convexo-concave portion and the flat portion and the traveling direction of a moving object, that is, the gas flow direction is, for example, $-15°$ or more and $15°$ or less, preferably $-10°$ or more and $10°$ or less, and particularly $-5°$ or more and $5°$ or less.

Also, in the moving object in the present disclosure, the drag reduction structure may be placed over the entire surface of the moving object, and may be placed on a part of the surface of the moving object.

In particular, the drag reduction structure is preferably placed at a position where the flow separation is likely to occur. The position where the flow separation is likely to occur varies depending on the type, shape and so on of the moving object.

Figure 31:
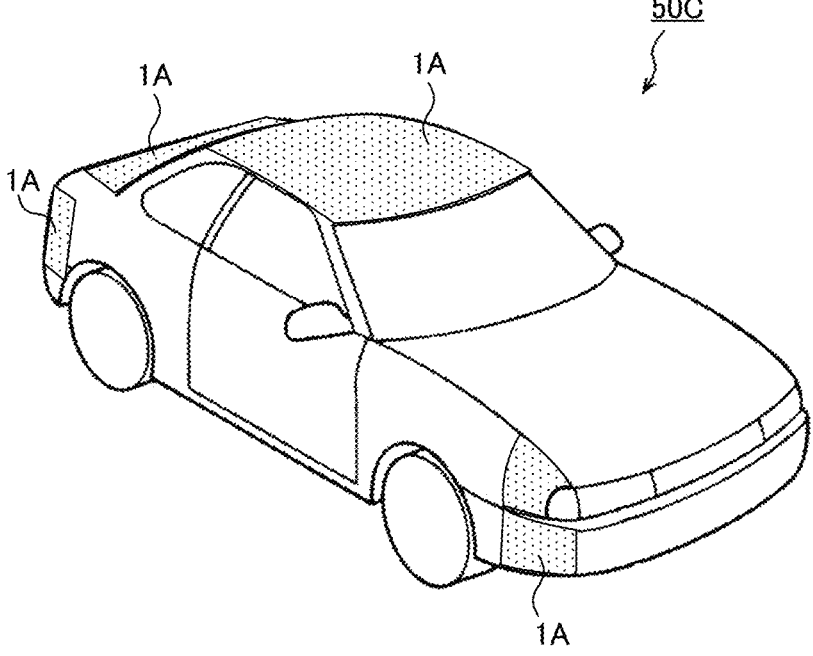
FIG. 31 is a schematic perspective view illustrating an example of the moving object in the present disclosure.

For example, when the moving object is an automobile, examples of the position where the flow separation is likely to occur may include the front side, the rear side, the roof, the upper part of the front, the upper part of the rear and so on of the automobile. Specifically, when the moving object is a passenger car, examples of the position where the flow separation is likely to occur may include the front side, the rear side, the roof, the upper part of the rear and so on of the passenger car. For example, FIG. 31 shows an example where the moving object is a sedan-type passenger car 50C; and in the sedan-type passenger car 50C, the drag reduction structures 1A are placed on the surface of front side, the rear side, the roof, and the upper part of the rear. Also, when the moving object is a truck, examples of the position where the flow separation is likely to occur may include the front side, the rear side, the upper part of the front, the upper part of the rear and so on. For example, FIGS. 25A and 25B are examples where the moving object is a truck 50B, and in the truck 50B, the drag reduction structures 1A are placed on the surface of the front side of cabin 51, on the rear side of cargo bed 52, and on the air deflector 53 placed above the cabin 51. Also, when the moving object is a bus, examples of the position where the flow separation is likely to occur may include the front side, the rear side, the upper part of the front, the upper part of the rear and so on. Among them, the drag reduction structure is preferably placed on the front of the automobile, specifically, the front side or the upper part of the front of the automobile. This is because the suppressing effect of the flow separation is remarkably exhibited.

Also, for example, when the moving object is a railway vehicle, examples of the position where the flow separation is likely to occur may include the front side, the rear side, the roof, the upper part of the front, the upper part of the rear and so on of the railway vehicle. Among them, the drag reduction structure is preferably placed on the front of the railway vehicle, specifically, the front side or the upper part of the front of the railway vehicle. This is because the suppressing effect of the flow separation is remarkably exhibited.

Also, when the moving object is an aircraft, examples of the position where the flow separation is likely to occur may include a wing.

2. Moving Object moving object in the present disclosure is similar to the moving object described in the section of the use application of the drag reduction structure described above.

Also, in the moving object in the present disclosure, the surface on which the drag reduction structure is placed may be a flat surface, and may be a curved surface.

Also, the gas is similar to the gas described in the section of the use application of the drag reduction structure described above.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure is hereinafter explained in further details with reference to Examples and Comparative Examples.

Examples 1-1 to 1-6 and Comparative Examples 1-2 to 1-4

An image was printed on a printing original plate (MPI1105) from Avery Dennison Japan, and a laminate film (DOL1460) from Avery Dennison Japan was laminated thereto. (Specifically, firstly, using a printing original plate ("MPI1105" from Avery Dennison Japan) including a vinyl chloride resin film, an adhesive layer and a releasing paper in this order, a printing layer was formed on the vinyl chloride resin film of the printing original plate by printing an image. Then, using a laminate film ("DOL1460" from Avery Dennison Japan including a vinyl chloride resin film, an adhesive layer and a releasing paper in this order, after peeling the releasing paper off from the laminate film, the laminate film was laminated on the printing layer.)

Then, using a UV inkjet device, UV-curable ink (Seika-Beam HT509 from Dainichiseika Color & Chemicals Mfg. Co., Ltd.) was discharged and cured on the laminate film, that is, on the vinyl chloride resin film of the laminate film, to form a convexo-concave portion including a plurality of straight line-shaped convex portions and concave portions. Also, as shown in FIG. 1A, the convexo-concave portion was formed so that the convexo-concave portions and flat portions were placed alternately in a stripe-shaped pattern. The dimensions of the convexo-concave portion (cc ptn) and flat portion were as shown in Table 1. Thereby, a wrapping film was produced. The wrapping film was A4 size (210 mm×297 mm).

[Evaluation 1]

The wrapping film in Examples 1-1 to 1-6 and Comparative Examples 1-2 to 1-4 was adhered to a truck-shaped model (length of 1250 mm, width of 260 mm, height of 387 mm), and a wind tunnel experiment was carried out, and the drag coefficient (Cd value) was measured under the condition of wind velocity of 25 m/s. FIGS. 32A to 32C show a truck-shaped model. FIG. 32A is a top view of the model, FIG. 32B is a side view of the model, and FIG. 32C is a rear view of the model. This truck-shaped model is a 1/10 scale schematic model of a 10-ton truck. Also, the wrapping film was adhered to the front side and the upper part of the front of the truck-shaped model. Also, the wind tunnel experiment was carried out under the following conditions.

(Wind Tunnel Experimental Conditions)

Air vent dimensions: rectangular shape with a width of 1.0 m and a height of 0.7 m Measurement portion length: 1.45 m Wind velocity: 25 m/s Film size: 210 mm×297 mm Adhered positions: the front side and upper part of the front of the truck-shaped model.

Adhering method: a film was adhered to the truck-shaped model so that the front edge of the film was placed on the beginning portion of R in the front of the model, and the rest of the film was adhered toward the rear side.

Incidentally, the Cd value was determined from the following formula.

$$Cd = D/(\rho U^2 S \times 1/2)$$

(In the formula, D: drag (N), ρ: density (kg/m$^3$), U: representative velocity (m/s) and S: representative area (m$^2$))

In this experiment, drag D was measured from a load cell provided with to a wire attached to the truck-shaped model. The density p was 1.124 kg/m$^3$, the representative velocity U was the same as the wind velocity, and the representative area S was 0.101 m$^2$.

Also, Comparative Example 1-1 was a case where the wrapping film was not adhered.

TABLE 1

| | Comp. Ex. 1-1 | Example 1-1 | Example 1-2 | Example 1-3 | Example 1-4 | Example 1-5 | Example 1-6 | Comp. Ex. 1-2 | Comp. Ex. 1-3 | Comp. Ex. 1-4 |
|---|---|---|---|---|---|---|---|---|---|---|
| Convexo-concave ptn height (μm) | — | 140 | 110 | 140 | 140 | 140 | 140 | 140 | 140 | 140 |
| Convexo-concave ptn width (mm) | — | 5 | 5 | 1 | 10 | 5 | 5 | 0.1 | 100 | 5 |
| Flat portion width (mm) | — | 5 | 5 | 1 | 10 | 5 | 5 | 0.1 | 100 | 5 |

TABLE 1-continued

| | Comp. Ex. 1-1 | Example 1-1 | Example 1-2 | Example 1-3 | Example 1-4 | Example 1-5 | Example 1-6 | Comp. Ex. 1-2 | Comp. Ex. 1-3 | Comp. Ex. 1-4 |
|---|---|---|---|---|---|---|---|---|---|---|
| Convexo-concave ptn length (mm) | — | 210 | 210 | 210 | 210 | 105 | 53 | 210 | 210 | 10 |
| Convex ptn width of cc ptn (μm) | — | 140 | 140 | 140 | 140 | 140 | 140 | 140 | 140 | 140 |
| Concave ptn width of cc ptn (μm) | — | 660 | 660 | 660 | 660 | 660 | 660 | 660 | 660 | 660 |
| Cd value | 0.646 | 0.529 | 0.571 | 0.534 | 0.539 | 0.526 | 0.592 | 0.631 | 0.635 | 0.634 |

It was confirmed that, since all of the height of the convexo-concave portion, the length of the convexo-concave portion in the second direction, the width of the convexo-concave portion and the width of the flat portion in the first direction were in the predetermined range in Examples 1-1 to 1-6, the Cd value was decreased and the drag was decreased, compared to Comparative Example 1-1. Meanwhile, in Comparative Example 1-2, the drag reducing effect was low, since the width of the convexo-concave portion and the width of the flat portion in the first direction were short. Also, in Comparative Example 1-3, the drag reducing effect was low, since the width of the convexo-concave portion and the width of the flat portion in the first direction were long. Also, in Comparative Example 1-4, the drag reducing effect was low, since the length of the convexo-concave portion in the second direction was short.

Examples 2-1 to 2-6 and Comparative Examples 2-1 to 2-3

Firstly, a mold for injection molding including a cavity mold and a core mold was produced. Then, on the surface of the cavity mold, by a laser processing, a convexo-concave portion including a plurality of the straight line-shaped convex portions and the concave portions was formed. Also, as shown in FIG. 21A, convexo-concave portions and flat portions were formed so as to be placed alternately in a stripe-shaped pattern. In the cavity mold, the dimensions of the convexo-concave portion and flat portion were as shown in Table 2 below.

Then, acrylic resin was injection molded using the mold for an injection molding, and a plate-shaped resin molded product with a thickness of 2 mm was produced. In the resin molded product, the dimensions of the convexo-concave portion and flat portion were as shown in Table 3 below.

Then, the resin molded product was adhered to the front side and the upper part of the front of a truck-shaped model (length: 1250 mm, width: 260 mm, height: 387 mm) via a double-sided adhesive tape to produce a truck-shaped model. For the truck-shaped model, the model shown in FIGS. 32A to 32C was used.

[Evaluation 2]

A wind tunnel experiment was carried out to the truck-shaped model in Examples and Comparative Examples, and the drag coefficient (Cd value) was measured under the condition of wind velocity of 25 m/s. The conditions of the wind tunnel experiment and the method for determining the Cd value were similar to those in Evaluation 1.

TABLE 2

| Mold for injection molding | Example 2-1 | Example 2-2 | Example 2-3 | Example 2-4 | Example 2-5 | Example 2-6 | Comp. Ex. 2-1 | Comp. Ex. 2-2 | Comp. Ex. 2-3 |
|---|---|---|---|---|---|---|---|---|---|
| Convexo-concave ptn height (μm) | 126 | 99 | 126 | 126 | 126 | 126 | 126 | 126 | 126 |
| Convexo-concave ptn width (mm) | 5 | 5 | 1 | 10 | 5 | 5 | 0.1 | 100 | 5 |
| Flat portion width (mm) | 5 | 5 | 1 | 10 | 5 | 5 | 0.1 | 100 | 5 |
| Convexo-concave ptn length (mm) | 210 | 210 | 210 | 210 | 105 | 53 | 210 | 210 | 10 |
| Concave ptn width of cc ptn (μm) | 140 | 140 | 140 | 140 | 140 | 140 | 140 | 140 | 140 |
| Convex ptn width of cc ptn (μm) | 660 | 660 | 660 | 660 | 660 | 660 | 660 | 660 | 660 |

TABLE 3

| Resin molded product | Comp. Ex. 1-1 | Example 2-1 | Example 2-2 | Example 2-3 | Example 2-4 | Example 2-5 | Example 2-6 | Comp. Ex. 2-1 | Comp. Ex. 2-2 | Comp. Ex. 2-3 |
|---|---|---|---|---|---|---|---|---|---|---|
| Convexo-concave ptn height (μm) | — | 126 | 99 | 126 | 126 | 126 | 126 | 126 | 126 | 126 |
| Convexo-concave ptn width (mm) | — | 5 | 5 | 1 | 10 | 5 | 5 | 0.1 | 100 | 5 |
| Flat portion width (mm) | — | 5 | 5 | 1 | 10 | 5 | 5 | 0.1 | 100 | 5 |

TABLE 3-continued

| Resin molded product | Comp. Ex. 1-1 | Example 2-1 | Example 2-2 | Example 2-3 | Example 2-4 | Example 2-5 | Example 2-6 | Comp. Ex. 2-1 | Comp. Ex. 2-2 | Comp. Ex. 2-3 |
|---|---|---|---|---|---|---|---|---|---|---|
| Convexo-concave ptn length (mm) | — | 210 | 210 | 210 | 210 | 105 | 53 | 210 | 210 | 10 |
| Convex ptn width of cc ptn (μm) | — | 140 | 140 | 140 | 140 | 140 | 140 | 140 | 140 | 140 |
| Concave ptn width of cc ptn (μm) | — | 660 | 660 | 660 | 660 | 660 | 660 | 660 | 660 | 660 |
| Cd value | 0.646 | 0.524 | 0.565 | 0.529 | 0.534 | 0.521 | 0.586 | 0.625 | 0.629 | 0.628 |

It was confirmed that, since all of the height of the convexo-concave portion, the length of the convexo-concave portion in the second direction, the width of the convexo-concave portion and the width of the flat portion in the first direction were in the predetermined range in Examples 2-1 to 2-6, the Cd value was decreased and the drag was decreased, compared to Comparative Example 1-1. Meanwhile, in Comparative Example 2-1, the drag reducing effect was low, since the width of the convexo-concave portion and the width of the flat portion in the first direction were short. Also, in Comparative Example 2-2, the drag reducing effect was low, since the width of the convexo-concave portion and the width of the flat portion in the first direction were long. Also, in Comparative Example 2-3, the drag reducing effect was low, since the length of the convexo-concave portion in the second direction was short.

Examples 3-1 to 3-6 and Comparative Examples 3-1 to 3-3

Firstly, using a UV inkjet device, UV-curable ink (Seika-Beam HT509 from Dainichiseika Color & Chemicals Mfg. Co., Ltd.) was discharged and cured on a PET film ("Cosmoshine A4360" from Toyobo Co., Ltd.) with a thickness of 75 μm, to form a convexo-concave portion including a plurality of straight line-shaped convex portions and concave portions. Also, the convexo-concave portions and flat portions were formed so as to be placed alternately in a stripe-shaped pattern. The dimensions of the convexo-concave portion and flat portion were as shown in Table 4 below. Thereby, a PET film with a convexo-concave structure was obtained.

Then, a water-soluble resin composition including polyvinyl alcohol was applied to the convexo-concave portion side surface of the PET film with a convexo-concave structure, and dried solidified to form a water-soluble resin layer with a thickness of 200 μm. After that, by peeling the water-soluble resin layer off, a water-soluble resin film formed from a water-soluble resin layer with a convexo-concave structure wherein the shape of the convexo-concave structure of the PET film with a convexo-concave structure was inverted, was obtained.

Then, the surface of the front side and upper part of the front of the truck-shaped model used in Evaluation 1 was coated with a surface coating agent including urethane resin, the convexo-concave portion side surface of the water-soluble resin film was closely adhered to the coating film, and the surface coating agent was cured in such condition. Then, the water-soluble resin film was removed by flushing with water. Thereby, a coating agent layer wherein the convexo-concave structure of the water-soluble resin film was transferred, was formed on the surface of the truck-shaped model. In the convexo-concave structure of the surface of the truck-shaped model, the dimensions of the convexo-concave portion and flat portion were as shown in Table 4 below.

Examples 4-1 to 4-6 and Comparative Examples 4-1 to 4-3

Firstly, a mold for an injection molding was produced. Then, on the surface of the mold for an injection molding, by a carving process, a convexo-concave portion including a plurality of the straight line-shaped convex portions and the concave portions was formed. Also, the convexo-concave portions and flat portions were formed so as to be placed alternately in a stripe-shaped pattern. The dimensions of the convexo-concave portion were those of the convexo-concave portion wherein the shape of the convexo-concave portion shown in Table 5 below was inverted. Also, the dimensions of the flat portion were as shown in Table 5 below.

Then, acrylic resin was injection molded using the mold for an injection molding, and a plate-shaped resin molded product with a thickness of 2 mm was produced. In the resin molded product, the dimensions of the convexo-concave portion and flat portion were as shown in Table 5 below.

Then, the resin molded product was adhered to the front side and the upper part of the front of the truck-shaped model used in Evaluation 1, via a double-sided adhesive tape to produce a truck-shaped model.

[Evaluation 3]

A wind tunnel experiment was carried out to the truck-shaped model in Examples and Comparative Examples, and the drag coefficient (Cd value) was measured under the condition of wind velocity of 25 m/s. The conditions of the wind tunnel experiment and the method for determining the Cd value were similar to those in Evaluation 1.

TABLE 4

| | Example 3-1 | Example 3-2 | Example 3-3 | Example 3-4 | Example 3-5 | Example 3-6 | Comp. Ex. 3-1 | Comp. Ex. 3-2 | Comp. Ex. 3-3 |
|---|---|---|---|---|---|---|---|---|---|
| Convexo-concave ptn height (μm) | 137 | 108 | 137 | 137 | 137 | 137 | 137 | 137 | 137 |
| Convexo-concave ptn width (mm) | 5 | 5 | 1 | 10 | 5 | 5 | 0.1 | 100 | 5 |
| Flat portion width (mm) | 5 | 5 | 1 | 10 | 5 | 5 | 0.1 | 100 | 5 |

TABLE 4-continued

| | Example 3-1 | Example 3-2 | Example 3-3 | Example 3-4 | Example 3-5 | Example 3-6 | Comp. Ex. 3-1 | Comp. Ex. 3-2 | Comp. Ex. 3-3 |
|---|---|---|---|---|---|---|---|---|---|
| Convexo-concave ptn length (mm) | 210 | 210 | 210 | 210 | 105 | 53 | 210 | 210 | 10 |
| Convex ptn width of cc ptn (μm) | 140 | 140 | 140 | 140 | 140 | 140 | 140 | 140 | 140 |
| Concave ptn width of cc ptn (μm) | 660 | 660 | 660 | 660 | 660 | 660 | 660 | 660 | 660 |
| Cd value | 0.526 | 0.568 | 0.531 | 0.536 | 0.523 | 0.589 | 0.628 | 0.632 | 0.631 |

TABLE 5

| | Example 4-1 | Example 4-2 | Example 4-3 | Example 4-4 | Example 4-5 | Example 4-6 | Comp. Ex. 4-1 | Comp. Ex. 4-2 | Comp. Ex. 4-3 |
|---|---|---|---|---|---|---|---|---|---|
| Convexo-concave ptn height (μm) | 126 | 99 | 126 | 126 | 126 | 126 | 126 | 126 | 126 |
| Convexo-concave ptn width (mm) | 5 | 5 | 1 | 10 | 5 | 5 | 0.1 | 100 | 5 |
| Flat portion width (mm) | 5 | 5 | 1 | 10 | 5 | 5 | 0.1 | 100 | 5 |
| Convexo-concave ptn length (mm) | 210 | 210 | 210 | 210 | 105 | 53 | 210 | 210 | 10 |
| Convex ptn width of cc ptn (μm) | 140 | 140 | 140 | 140 | 140 | 140 | 140 | 140 | 140 |
| Concave ptn width of cc ptn (μm) | 660 | 660 | 660 | 660 | 660 | 660 | 660 | 660 | 660 |
| Cd value | 0.524 | 0.565 | 0.529 | 0.534 | 0.521 | 0.586 | 0.625 | 0.629 | 0.628 |

It was confirmed that, since all of the height of the convexo-concave portion, the length of the convexo-concave portion in the traveling direction of the moving object, the width of the convexo-concave portion and the width of the flat portion in the direction perpendicular to the traveling direction of the moving object were in the predetermined range in Examples 1-1 to 1-6, 3-1 to 3-6 and 4-1 to 4-6, the Cd value was decreased and the drag was decreased, compared to Comparative Example 1-1. Meanwhile, in Comparative Examples 1-2, 3-1 and 4-1, the drag reducing effect was low, since the width of the convexo-concave portion and the width of the flat portion in the direction perpendicular to the traveling direction of the moving object were short. Also, in Comparative Examples 1-3, 3-2 and 4-2, the drag reducing effect was low, since the width of the convexo-concave portion and the width of the flat portion in the direction perpendicular to the traveling direction of the moving object were long. Also, in Comparative Examples 1-4, 3-3 and 4-3, the drag reducing effect was low, since the length of the convexo-concave portion in the traveling direction of the moving object was short.

Examples 5-1 to 5-6 and Comparative Example 5-2

A printing original plate including a transparent substrate ("IJ180 mc-114" from 3M Japan Limited) was used. Also, a laminate film ("DOL1460Z" from Avery Dennison Japan) including a vinyl chloride resin film, an adhesive layer and a releasing paper in this order was used. After peeling the releasing paper from the laminate film, the laminate film was laminated on the printing original plate. Then, using a UV inkjet device, UV-curable ink (SeikaBeam HT509 from Dainichiseika Color & Chemicals Mfg. Co., Ltd.) was discharged and cured on the vinyl chloride resin film of the laminate film to form a convexo-concave portion including a plurality of straight line-shaped convex portions and concave portions. Also, as shown in FIG. 1A, the convexo-concave portion was formed so that the convexo-concave portions and flat portions were placed alternately in a stripe-shaped pattern. The dimensions of the convexo-concave portion and flat portion were as shown in Table 6 below. Thereby, an A4 sized wrapping film was produced.

[Evaluation 4]

The wrapping film in Examples 5-1 to 5-6 and Comparative Example 5-2 was adhered to the front side and the upper part of the front of the truck-shaped model used in Evaluation 1. Then, a wind tunnel experiment was carried out under the following conditions, and the drag coefficient (Cd value) was measured. The method for determining the Cd value was similar to that in Evaluation 1.

(Wind Tunnel Experimental Conditions)

Air vent dimensions: rectangular shape with a width of 1.0 m and a height of 0.7 m Measurement portion length: 1.45 m Wind velocity: 5 levels of 10 m/s, 15 m/s, 20 m/s, 25 m/s and 30 m/s Film size: 210 mm×297 mm Adhered positions: the front side and upper part of the front of the truck-shaped model.

Adhering method: a film was adhered to the truck-shaped model so that the front edge of the film was placed on the beginning portion of R in the front of the model, and the rest of the film was adhered toward the rear side.

Also, Comparative Example 5-1 was a case where the wrapping film was not adhered.

TABLE 6

| | Comp. Ex. 5-1 | Example 5-1 | Example 5-2 | Example 5-3 | Example 5-4 | Example 5-5 | Example 5-6 | Comp. Ex. 5-2 |
|---|---|---|---|---|---|---|---|---|
| Convexo-concave ptn height (μm) | — | 20 | 70 | 160 | 220 | 310 | 510 | 2100 |
| Convexo-concave ptn width (mm) | — | 7 | 7 | 7 | 7 | 7 | 7 | 7 |
| Flat portion width (mm) | — | 7 | 7 | 7 | 7 | 7 | 7 | 7 |
| Convexo-concave ptn length (mm) | — | 210 | 210 | 210 | 210 | 210 | 210 | 210 |
| Convex ptn width of cc ptn (μm) | — | 20 | 80 | 160 | 240 | 320 | 500 | 2000 |
| Concave ptn width of cc ptn (μm) | — | 140 | 560 | 1120 | 1680 | 2240 | 3500 | 14000 |
| Cd value    Wind v. 10 m/s | 0.657 | 0.657 | 0.642 | 0.654 | 0.587 | 0.580 | 0.595 | 0.707 |
| Wind v. 15 m/s | 0.649 | 0.644 | 0.623 | 0.574 | 0.580 | 0.589 | 0.597 | 0.702 |
| Wind v. 20 m/s | 0.645 | 0.631 | 0.602 | 0.568 | 0.587 | 0.594 | 0.601 | 0.703 |
| Wind v. 25 m/s | 0.639 | 0.616 | 0.575 | 0.569 | 0.585 | 0.593 | 0.601 | 0.703 |
| Wind v. 30 m/s | 0.635 | 0.574 | 0.532 | 0.561 | 0.578 | 0.591 | 0.600 | 0.714 |

It was confirmed that, since all of the height of the convexo-concave portion, the length of the convexo-concave portion in the second direction, the width of the convexo-concave portion and the width of the flat portion in the first direction were in the predetermined range in Examples 5-1 to 5-6, the Cd value was decreased and the drag was decreased, compared to Comparative Example 5-1. Meanwhile, in Comparative Example 5-2, since the height of the convexo-concave portion was high, so that the Cd value was higher than that in Comparative Example 5-1, and the drag reducing effect was not obtained.

Also, in Examples 5-1 to 5-6, when the height of the convexo-concave portion was low, the Cd value decreased as the wind velocity increased. From this, it was shown that, when the height of the convexo-concave was low, it was effective when the wind velocity was high.

Example 6-1

The film was produced in the same manner as in Examples 5-1 to 5-6, except that the height of the convexo-concave portion was 140 μm, the width of the convexo-concave portion and the width of the flat portion were 7 mm respectively, and the pitch of the convex portion of the convexo-concave portion was 1120 μm.

Example 6-2

A printing original plate including a transparent substrate ("IJ180 mc-114" from 3M Japan Limited) was used. Also, a laminate film ("DOL1460Z" from Avery Dennison Japan) including a vinyl chloride resin film, an adhesive layer and a releasing paper in this order was used. After peeling the releasing paper from the laminate film, the laminate film was laminated on the printing original plate. Then, UV curable resin composition (SeikaBeam HT509 from Dainichiseika Color & Chemicals Mfg. Co., Ltd.) was applied on the vinyl chloride resin film of the laminate film. Then, a mold with an inverted shape of a desired convexo-concave structure shape was pressed onto the film of the UV curable resin composition, and the film of the UV curable resin composition was cured by UV irradiation. Thereby, a convexo-concave portion including a plurality of the straight line-shaped convex portions and the concave portions was formed. The height of the convexo-concave portion was 140 μm, the width of the convexo-concave portion and the width of the flat portion were 7 mm respectively, and the pitch of the convex portion of the convexo-concave portion was 1120 μm.

Comparative Example 6-1

A printing original plate including a transparent substrate ("IJ180 mc-114" from 3M Japan Limited) was used. Also, a laminate film ("DOL1460Z" from Avery Dennison Japan) including a vinyl chloride resin film, an adhesive layer and a releasing paper in this order was used. After peeling the releasing paper from the laminate film, the laminate film was laminated on the printing original plate to obtain a film.

[Evaluation 5]

For the film in Examples 6-1 to 6-2 and Comparative Example 6-1, the tensile elastic modulus in each direction was measured under the following conditions in accordance with JIS K7161-1:2014, using "Instron 5565" from Instron Japan Company Limited as a tensile tester.

(Measurement Conditions)

Test piece: length of 150 mm, width of 25 mm
Distance between gauge lines: 75 mm
Drawing rate: 50 mm/min
Load cell: 1 kN
Number of measurements: 3

TABLE 7

| | Tensile elastic modulus (MPa) | |
|---|---|---|
| | MD (2nd direction) | TD (1st direction) |
| Comp. Ex. 6-1 | 10.7 | 10.4 |
| Example 6-1 | 39.8 | 20.3 |
| Example 6-2 | 29.8 | 21.1 |

Comparing Examples 6-1 to 6-2 with Comparative Example 6-1, it was shown that, when the drag reduction structure including the convexo-concave portions and the flat portions was provided, the tensile elastic modulus in the MD direction tended to be higher than that in the TD direction, and not likely to be stretched in the MD direction.

The present disclosure provides the following [1] to [30].

[1]

A drag reduction structure wherein a first portion including a plurality of convex portions and concave portions, and a second portion are placed on a first surface;

a height from a bottom portion of the concave portion to a top portion of the convex portion, of the first portion, is 10 μm or more and 1000 μm or less;

a length of the first portion in a second direction is 30 mm or more; and a width of the first portion and a width of the second portion, in a first direction crossing the second direction, is 0.2 mm or more and 50 mm or less.

[2]

The drag reduction structure according to [1], wherein the first portion and the second portion are placed alternately in the first direction.

[3]

The drag reduction structure according to [1] or [2], wherein the first portion includes a plurality of the convex portions and the concave portions extending in a straight line along the first direction.

[4]

The drag reduction structure according to [3], wherein a width of the straight line-shaped concave portion is 1 time or more and 12 times or less of the height of the first portion.

[5]

The drag reduction structure according to [3] or [4], wherein a width of the straight line-shaped convex portion is 1 time or more and 2 times or less of the height of the first portion.

[6]

The drag reduction structure according to any one of [1] to [5], wherein the convex portion of the first portion projects with respect to a surface of the second portion.

[7]

The drag reduction structure according to any one of [1] to [6], wherein the convex portion includes a curved surface with a radius of curvature of 10 μm or more and 400 μm or less, at a portion reaching from a top portion to a side portion of the convex portion that is a portion linking to the top portion.

[8]

The drag reduction structure according to any one of [1] to [7], wherein the drag reduction structure is a film; and a stretch in the first direction is less than a stretch in the second direction.

[9]

A resin molded product comprising a convexo-concave structure on its surface, wherein, in the convexo-concave structure, a first portion including a plurality of convex portions and concave portions, and a second portion are placed;

a height from a bottom portion of the concave portion to a top portion of the convex portion, of the first portion, is 10 μm or more and 1000 μm or less;
  a length of the first portion in a second direction is 30 mm or more; and
  a width of the first portion and a width of the second portion, in a first direction crossing the second direction, is 0.2 mm or more and 50 mm or less.

The resin molded product according to [9], wherein, in the convexo-concave structure, the first portion and the second portion are placed alternately in the first direction.

The resin molded product according to [9] or [10], wherein the first portion includes a plurality of the convex portions and the concave portions extending in a straight line along the first direction.

The resin molded product according to [11], wherein a width of the straight line-shaped concave portion is 1 time or more and 12 times or less of the height of the first portion.

The resin molded product according to or [12], wherein a width of the straight line-shaped convex portion is 1 time or more and 2 times or less of the height of the first portion.

The resin molded product according to any one of [9] to [13], wherein the convex portion of the first portion projects with respect to a surface of the second portion.

The resin molded product according to any one of [9] to [14], wherein the convex portion includes a curved surface with a radius of curvature of 10 μm or more and 400 μm or less, at a portion reaching from a top portion to a side portion of the convex portion that is a portion linking to the top portion.

A shaping mold comprising a convexo-concave structure on its surface, wherein, in the convexo-concave structure, a first portion including a plurality of convex portions and concave portions, and a second portion are placed;
  a height from a bottom portion of the concave portion to a top portion of the convex portion, of the first portion, is 10 μm or more and 1000 μm or less;
  a length of the first portion in a fourth direction is 30 mm or more; and
  a width of the first portion and a width of the second portion, in a third direction crossing the fourth direction, is 0.2 mm or more and 50 mm or less.

The shaping mold according to [16], wherein, in the convexo-concave structure, the first portion and the second portion are placed alternately in the third direction.

The shaping mold according to or [17], wherein the first portion includes a plurality of the convex portions and the concave portions extending in a straight line along the third direction.

The shaping mold according to [18], wherein a width of the straight line-shaped convex portion is 1 time or more and 12 times or less of the height of the first portion.

The shaping mold according to or [19], wherein a width of the straight line-shaped concave portion is 1 time or more and 2 times or less of the height of the first portion.

The shaping mold according to any one of to [20], wherein the concave portion of the first portion sags with respect to a surface of the second portion.

The shaping mold according to any one of to [21], wherein the concave portion incudes a curved surface with a radius of curvature of 10 μm or more and 400 μm or less, at a portion reaching from a bottom portion to a side portion of the concave portion that is a portion linking to the bottom portion.

A moving object comprising a drag reduction structure on its surface, wherein, in the drag reduction structure, a first portion including a plurality of convex portions and concave portions, and a second portion are placed;
  a height from a bottom portion of the concave portion to a top portion of the convex portion, of the first portion, is 10 μm or more and 1000 μm or less;
  a length of the first portion in a traveling direction of the moving object is 30 mm or more; and
  a width of the first portion and a width of the second portion, in a direction crossing the traveling direction of the moving object, is 0.2 mm or more and 50 mm or less.

The moving object according to wherein, in the drag reduction structure, the first portion and the second portion are placed alternately in the direction crossing the traveling direction of the moving object.

The moving object according to or [24], wherein the first portion includes a plurality of the convex portions and the concave portions extending in a straight line along the direction crossing the traveling direction of the moving object.

The moving object according to [25], wherein a width of the straight line-shaped concave portion is 1 time or more and 12 times or less of the height of the first portion.

The moving object according to or [26], wherein a width of the straight line-shaped convex portion is 1 time or more and 2 times or less of the height of the first portion.

The moving object according to any one of to [27], wherein the convex portion of the first portion projects with respect to a surface of the second portion.

The moving object according to any one of to [28], wherein the convex portion incudes a curved surface with a radius of curvature of 10 μm or more and 400 μm or less, at a portion reaching from a top portion to a side portion of the convex portion that is a portion linking to the top portion.

The moving object according to any one of to [29], wherein the moving object includes a resin film including the drag reduction structure on its surface;

the resin film includes at least a convexo-concave resin film including the drag reduction structure on its surface; and in the convexo-concave resin film, a stretch in the direction crossing the traveling direction of the moving object is less than a stretch in the traveling direction of the moving object.

The present disclosure provides the following [1-1] to [1-5].

[1-1]

A drag reduction structure wherein a convexo-concave portion including a plurality of convex portions and concave portions, and a flat portion are placed alternately in a first direction;

a height of the convexo-concave portion is 20 μm or more and 200 μm or less;

a length of the convexo-concave portion, in a second direction perpendicular to the first direction, is 30 mm or more; and a width of the convexo-concave portion and a width of the flat portion, in a first direction, is 0.2 mm or more and 50 mm or less.

[1-2]

The drag reduction structure according to [1-1], wherein the convexo-concave portion includes a plurality of the convex portions and the concave portions extending in a straight line along the first direction.

[1-3]

The drag reduction structure according to [1-2], wherein a width of the straight line-shaped concave portion is 1 time or more and 12 times or less of the height of the convexo-concave portion.

[1-4]

The drag reduction structure according to [1-2] or [1-3], wherein a width of the straight line-shaped convex portion is 1 time or more and 2 times or less of the height of the convexo-concave portion.

[1-5]

The drag reduction structure according to any one of [1-1] to [1-4], wherein the convex portion of the convexo-concave portion projects with respect to a surface of the flat portion.

The present disclosure provides the following [2-1] to [2-10].

[2-1]

A resin molded product comprising a convexo-concave structure on its surface, wherein, in the convexo-concave structure, a convexo-concave portion including a plurality of convex portions and concave portions, and a flat portion are placed alternately in a first direction;

a height of the convexo-concave portion is 20 μm or more and 200 μm or less;

a length of the convexo-concave portion, in a second direction perpendicular to the first direction, is 30 mm or more; and a width of the convexo-concave portion and a width of the flat portion, in a first direction, is 0.2 mm or more and 50 mm or less.

[2-2]

The resin molded product according to [2-1], wherein the convexo-concave portion includes a plurality of the convex portions and the concave portions extending in a straight line along the first direction.

[2-3]

The resin molded product according to [2-2], wherein a width of the straight line-shaped concave portion is 1 time or more and 12 times or less of the height of the convexo-concave portion.

[2-4]

The resin molded product according to [2-2] or [2-3], wherein a width of the straight line-shaped convex portion is 1 time or more and 2 times or less of the height of the convexo-concave portion.

[2-5]

The resin molded product according to any one of [2-1] to [2-4], wherein the convex portion of the convexo-concave portion projects with respect to a surface of the flat portion.

[2-6]

A shaping mold comprising a convexo-concave structure on its surface, wherein, in the convexo-concave structure, a convexo-concave portion including a plurality of convex portions and concave portions, and a flat portion are placed alternately in a third direction;

a height of the convexo-concave portion is 20 μm or more and 200 μm or less;

a length of the convexo-concave portion, in a fourth direction perpendicular to the third direction, is 30 mm or more; and a width of the convexo-concave portion and a width of the flat portion, in a third direction, is 0.2 mm or more and 50 mm or less.

[2-7]

The shaping mold according to [2-6], wherein the convexo-concave portion includes a plurality of the convex portions and the concave portions extending in a straight line along the third direction.

[2-8]

The shaping mold according to [2-7], wherein a width of the straight line-shaped convex portion is 1 time or more and 12 times or less of the height of the convexo-concave portion.

[2-9]

The shaping mold according to [2-7] or [2-8], wherein a width of the straight line-shaped concave portion is 1 time or more and 2 times or less of the height of the convexo-concave portion.

[2-10]

The shaping mold according to any one of [2-6] to [2-9], wherein the concave portion of the convexo-concave portion sags with respect to a surface of the flat portion.

The present disclosure provides the following [3-1] to [3-5].

[3-1]

A moving object comprising a drag reduction structure on its surface, wherein, in the drag reduction structure, a convexo-concave portion including a plurality of convex portions and concave portions, and a flat portion are placed alternately in a direction perpendicular to the traveling direction of the moving object;

a height of the convexo-concave portion is 20 μm or more and 200 μm or less;

a length of the convexo-concave portion in a traveling direction of the moving object is 30 mm or more; and

a width of the convexo-concave portion and a width of the flat portion, in a direction perpendicular to the traveling direction of the moving object, is 0.2 mm or more and 50 mm or less.

[3-2]

The moving object according to [3-1], wherein the convexo-concave portion includes a plurality of the convex portions and the concave portions extending in a straight line along the direction perpendicular to the traveling direction of the moving object.

[3-3]

The moving object according to [3-2], wherein a width of the straight line-shaped concave portion is 1 time or more and 12 times or less of the height of the convexo-concave portion.

[3-4]

The moving object according to [3-2] or [3-3], wherein a width of the straight line-shaped convex portion is 1 time or more and 2 times or less of the height of the convexo-concave portion.

[3-5]

The moving object according to any one of [3-1] to [3-4], wherein the convex portion of the convexo-concave portion projects with respect to a surface of the flat portion.

REFERENCE SIGNS LIST

1, 1A: drag reduction structure
2: convexo-concave portion
3: flat portion
4: convexo-concave structure
11: convex portion
12: concave portion
10: resin molded product
20: mold for injection molding
32: convexo-concave portion
33: flat portion
34: convexo-concave structure
41: convex portion
42: concave portion
50A, 50B: truck (moving object)
50C: passenger car (moving object)
60: convexo-concave resin film
70: resin film
d1: first direction
d2: second direction
d3: third direction
d4: fourth direction
D1: traveling direction of a moving object
D2: direction perpendicular to the traveling direction of the moving object
H1: convexo-concave portion height
H11: convexo-concave portion height
L1: convexo-concave portion length in the second direction
L11: convexo-concave portion length in the fourth direction
L21: convexo-concave portion length in the traveling direction of the moving object
W1: convexo-concave portion width in the first direction
W2: flat portion width in the first direction
W11: convexo-concave portion width in the third direction
W12: flat portion width in the third direction
W21: convexo-concave portion width in the direction perpendicular to the traveling direction of the moving object

W22: flat portion width in the direction perpendicular to the traveling direction of the moving object

The invention claimed is:

1. A drag reduction structure comprising:
a first portion including a plurality of convex portions and concave portions alternately arranged in a second direction, each of the convex portions and each of the concave portions having a line shape extending along a first direction intersecting with the second direction, wherein
an angle between the first direction and the second direction is 85° or more and 95° or less, and
an angle between a longitudinal direction of the line shape and the first direction is between −5° and 5°; and
a second portion placed on a first surface and extending in the second direction, wherein:
the first portion and the second portion are arranged in the first direction;
a height from a bottom portion of the concave portion to a top portion of the convex portion, of the first portion, is 10 μm or more and 1000 μm or less;
a length of the first portion in the second direction is 30 mm or more;
a width of the first portion in the first direction and a width of the second portion in the first direction are both 0.2 mm or more and 50 mm or less; and
the width of the second portion in the first direction is equal to or greater than the width of the first portion in the first direction.

2. The drag reduction structure according to claim 1, wherein a plurality of the first portion and a plurality of the second portion are alternately arranged in the first direction.

3. The drag reduction structure according to claim 1, wherein a width of the line-shaped concave portion in the second direction is 1 time or more and 12 times or less of the height of the first portion.

4. The drag reduction structure according to claim 1, wherein a width of the line-shaped convex portion in the second direction is 1 time or more and 2 times or less of the height of the first portion.

5. The drag reduction structure according to claim 1, wherein the convex portion of the first portion projects with respect to a surface of the second portion.

6. The drag reduction structure according to claim 1, wherein the convex portion includes a curved surface with a radius of curvature of 10 μm or more and 400 μm or less, at a portion reaching from a top portion to a side portion of the convex portion, the portion linking the top portion and the side portion.

7. The drag reduction structure according to claim 1, wherein the drag reduction structure is a film; and
a stretch of the first surface in the first direction is less than a stretch of the first surface in the second direction.

8. A resin molded product comprising a convexo-concave structure on its surface,
wherein, the convexo-concave structure includes:
a first portion including a plurality of convex portions and concave portions alternately arranged in a second direction, each of the convex portions and each of the concave portions having a line shape extending along a first direction intersecting with the second direction, wherein
an angle between the first direction and the second direction is 85° or more and 95° or less, and an angle between a longitudinal direction of the line shape and the first direction is between −5° and 5°; and a second portion placed on a first surface and extending in the second direction, wherein:

the first portion and the second portion are arranged in the first direction;

a height from a bottom portion of the concave portion to a top portion of the convex portion, of the first portion, is 10 μm or more and 1000 μm or less;

a length of the first portion in the second direction is 30 mm or more;

a width of the first portion in the first direction and a width of the second portion in the first direction are both 0.2 mm or more and 50 mm or less; and the width of the second portion in the first direction is equal to or greater than the width of the first portion in the first direction.

9. The resin molded product according to claim 8, wherein, in the convexo-concave structure, a plurality of the first portion and a plurality of the second portion are alternately arranged in the first direction.

10. The resin molded product according to claim 8, wherein a width of the line-shaped concave portion in the second direction is 1 time or more and 12 times or less of the height of the first portion.

11. The resin molded product according to claim 8, wherein a width of the line-shaped convex portion in the second direction is 1 time or more and 2 times or less of the height of the first portion.

12. The resin molded product according to claim 8, wherein the convex portion of the first portion projects with respect to a surface of the second portion.

13. The resin molded product according to claim 8, wherein the convex portion includes a curved surface with a radius of curvature of 10 μm or more and 400 μm or less, at a portion reaching from a top portion to a side portion of the convex portion, the portion linking the top portion and the side portion.

14. A shaping mold comprising a convexo-concave structure on its surface, wherein, the convexo-concave structure includes:

a first portion including a plurality of convex portions and concave portions alternately arranged in a fourth direction, each of the convex portions and each of the concave portions having a line shape extending along a third direction intersecting with the fourth direction, wherein an angle between the third direction and the fourth direction is 85° or more and 95° or less, and an angle between a longitudinal direction of the line shape and the third direction is between −5° and 5°; and a second portion placed on a first surface and extending in the fourth direction, wherein:

the first portion and the second portion are arranged in the third direction;

a height from a bottom portion of the concave portion to a top portion of the convex portion, of the first portion, is 10 μm or more and 1000 μm or less;

a length of the first portion in the fourth direction is 30 mm or more;

a width of the first portion in the third direction and a width of the second portion in the third direction are both 0.2 mm or more and 50 mm or less; and the width of the second portion in the third direction is equal to or greater than the width of the first portion in the third direction.

15. The shaping mold according to claim 14, wherein, in the convexo-concave structure, a plurality of the first portion and a plurality of the second portion are alternately arranged in the third direction.

16. The shaping mold according to claim 14, wherein a width of the line-shaped convex portion in the fourth direction is 1 time or more and 12 times or less of the height of the first portion.

17. The shaping mold according to claim 14, wherein a width of the line-shaped concave portion in the fourth direction is 1 time or more and 2 times or less of the height of the first portion.

18. The shaping mold according to claim 14, wherein the concave portion of the first portion sags with respect to a surface of the second portion.

19. The shaping mold according to claim 14, wherein the concave portion incudes a curved surface with a radius of curvature of 10 μm or more and 400 μm or less, at a portion reaching from a bottom portion to a side portion of the concave portion, the portion linking the top portion and the side portion.

20. A moving object comprising a drag reduction structure on its surface, wherein, the drag reduction structure includes:

a first portion including a plurality of convex portions and concave portions alternately arranged in a second direction, each of the convex portions and each of the concave portions having a line shape extending along a first direction intersecting with the second direction, wherein an angle between the first direction and the second direction is 85° or more and 95° or less, and an angle between a longitudinal direction of the line shape and the first direction is between −5° and 5°; and a second portion placed on a first surface and extending in the second direction, wherein:

the first portion and the second portion are arranged in the first direction;

a height from a bottom portion of the concave portion to a top portion of the convex portion, of the first portion, is 10 μm or more and 1000 μm or less;

a length of the first portion in the traveling direction of the moving object is 30 mm or more;

a width of the first portion in the first direction and a width of the second portion in the first direction are both 0.2 mm or more and 50 mm or less; and the width of the second portion in the first direction is equal to or greater than the width of the first portion in the first direction.

21. The moving object according to claim 20 wherein, in the drag reduction structure, a plurality of the first portion and a plurality of the second portion are alternately arranged in the direction crossing the traveling direction of the moving object.

22. The moving object according to claim 20, wherein a width of the line-shaped concave portion in the second direction is 1 time or more and 12 times or less of the height of the first portion.

23. The moving object according to claim 20, wherein a width of the line-shaped convex portion in the second direction is 1 time or more and 2 times or less of the height of the first portion.

24. The moving object according to claim 20, wherein the convex portion of the first portion projects with respect to a surface of the second portion.

25. The moving object according to claim 20, wherein the convex portion incudes a curved surface with a radius of curvature of 10 μm or more and 400 μm or less, at a portion reaching from a top portion to a side portion of the convex portion, the portion linking the top portion and the side portion.

26. The moving object according to claim 20, wherein the moving object includes a resin film including the drag reduction structure on its surface;

the resin film includes at least a convexo-concave resin film including the drag reduction structure on its surface; and in the convexo-concave resin film, a stretch in the direction crossing the traveling direction of the moving object is less than a stretch in the traveling direction of the moving object.

\*    \*    \*    \*    \*